United States Patent [19]
Fuyama

[11] Patent Number: 5,995,944
[45] Date of Patent: Nov. 30, 1999

[54] ELECTRONIC REGISTER WITH A LEARNING FUNCTION

[75] Inventor: Seiji Fuyama, Yokohama, Japan

[73] Assignee: Matsushita Electric Industrial Co., Ltd., Osaka, Japan

[21] Appl. No.: 08/979,800

[22] Filed: Nov. 26, 1997

Related U.S. Application Data

[62] Division of application No. 08/105,914, Aug. 12, 1993, Pat. No. 5,805,831.

[30] Foreign Application Priority Data

Aug. 19, 1992 [JP] Japan .................................... 4-219895

[51] Int. Cl.[6] ............................. G07G 1/12; G06F 153/00
[52] U.S. Cl. ................................ 705/21; 705/16; 235/375
[58] Field of Search .................................. 705/15, 16, 21; 235/375

[56] References Cited

U.S. PATENT DOCUMENTS

| | | | |
|---|---|---|---|
| 4,360,872 | 11/1982 | Suzuki et al. | 705/18 |
| 4,502,120 | 2/1985 | Ohnishi et al. | 705/21 |
| 4,873,631 | 10/1989 | Nathan et al. | 705/21 |
| 4,893,237 | 1/1990 | Unmo | 705/21 |
| 5,018,066 | 5/1991 | Yagi | 705/21 |
| 5,128,862 | 7/1992 | Mueller | 705/15 |
| 5,253,163 | 10/1993 | Yoshida | 364/405 |
| 5,510,979 | 4/1996 | Moderi et al. | 705/18 |
| 5,758,326 | 5/1998 | Ishikawa | 705/16 |

FOREIGN PATENT DOCUMENTS

| | | |
|---|---|---|
| 60-173698 | 9/1985 | Japan . |
| 2135596 | 5/1990 | Japan . |

*Primary Examiner*—Allen R. MacDonald
*Assistant Examiner*—Michele Stuckey Crecca
*Attorney, Agent, or Firm*—Stevens, Davis, Miller & Mosher

[57] ABSTRACT

An electronic cash register with a learning function for registering items of articles on sale in a chit file and performing a transaction settlement processing by computing a total amount of registered items on the basis of data stored in the chit file. As structural constituent factors of the chit file, there are set in the electronic cash register a maximum customer number per chit, a maximum number of items for registration per chit and a maximum number of chit files capable of being disposed by the cash register through manipulation of corresponding keys. The cash register includes a unit for generating chit file suited for configuration of a shop where the cash register is used, and a unit for setting control information for issuing the chit file, provisional closing of the file, recalling thereof, issuance of a bill. Upon registration, issuance of a bill, settlement of transaction or issuance of adjustment report, the control information is referenced to realize functions and controls on the basis of the information as placed in the cash register.

15 Claims, 55 Drawing Sheets

ADDRESS #

5-1 NUMBER OF ITEMS
5-2 NUMBER OF CHIT FILES

TASK MENU

21 MEMORY STRUCTURIZATION
22 CHIT FILE CONTROL INFORMATION

50 PRINT OF SET DATA

INSPECTION/ADJUSTMENT REPORT

1 INSPECTION REPORT
2 ADJUSTMENT REPORT

FIG. 9
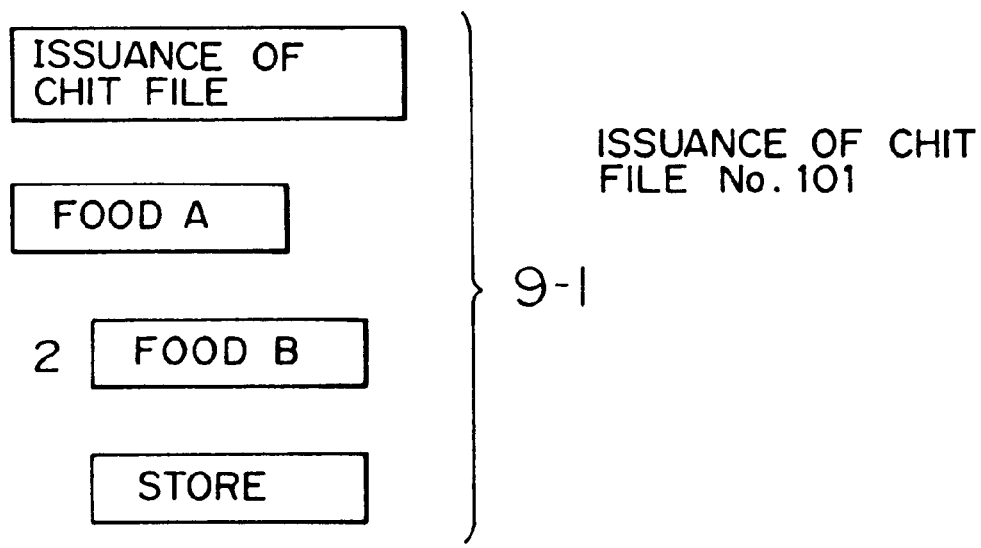
ISSUANCE OF CHIT FILE No. 101
9-1
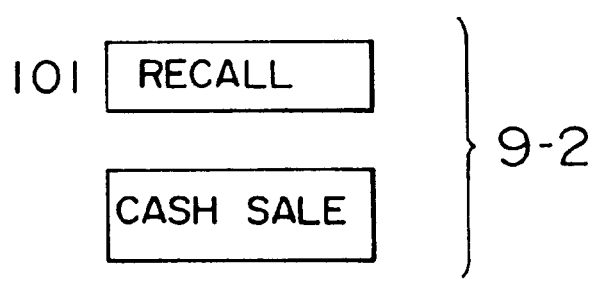
9-2

```
#101
    1  FOOD A    1250
    2  FOOD B     700

TAX        195
       STORE     2145
```

22-1: READ FLAG
22-2: BILL (RECEIPT) ISSUE FLAG

FIG. 24
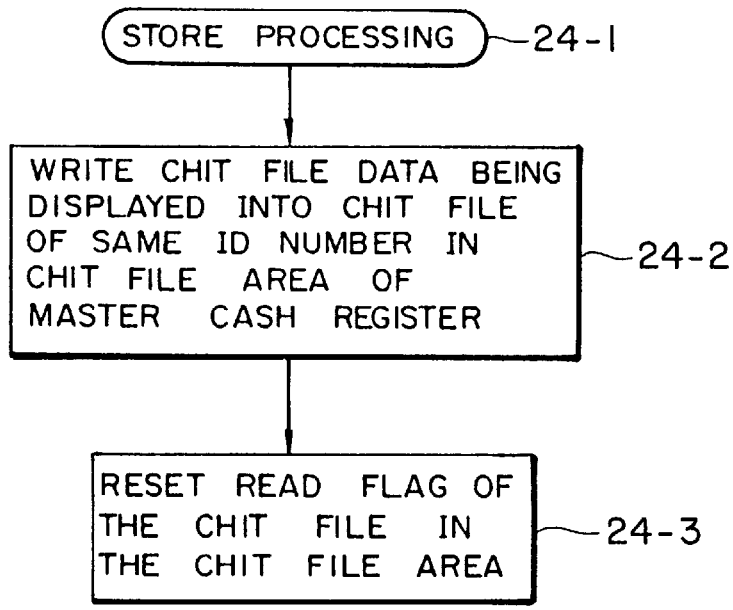
FIG. 25
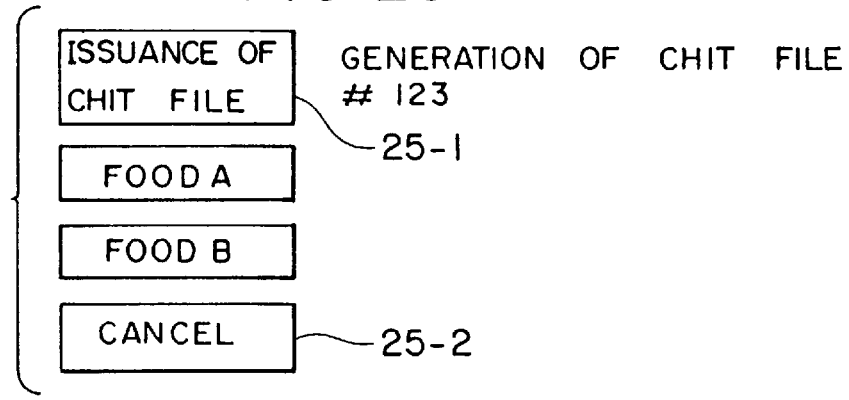
FIG. 26
```
# 123
FOOD A    1250
FOOD B     350
ALL VOID  1600
```

```
OPEN GCK REPORT
#101            JIM
   P/B         1238
   FEB. 18  18:15
#125           HELEN
   P/B          585        }  31-1
   FEB. 18  19:10
     :
     :
VOID#
#123                       }  31-2
```

FIG. 33

```
            #185
              P/B      1850
            2 BEER      700
            1 SCOTCH    550

TAX       310
              TOTL     3410
```

```
*PREVIOUS  ITEM*  | #185
                  |   P/B      1850
1 BEER      350   | 2 BEER      700
1 STEAK    1200   | 1 SCOTCH    550
1 SALAD     300   |
                  |
                  |   TAX       310
                  |   TOTL     3410
```

```
SERVER-BASED SALE REPORT
─────────────────────────
SERVER 1
    :
CASH SALE       12     12305       ─── 43-1
SALE ON CREDIT   3      4118
TRANSFER-OUT     1      1600
─────────────────────────
SERVER 2
    :
CASH SALE        5      6540       ─── 43-2
SALE ON CREDIT   1      1200
TRANSFER-IN      1      1600

:
─────────────────────────
```

```
RESTAURANT ABC··          ~46-1

#185

1 FOOD A   1250
  2 FOOD B    700

TAX       195
    TOTL     2145          ~46-2

FEB. 18 1992

THANK YOU VERY MUCH        ~46-3
```

```
RESTAURANT ABC ...
#101
CUSTOMER #2
  1  FOOD C    1250
  1  FOOD D     350
     TAX        160
     TOTL      1760
  FEB. 18 1992
THANK YOU VERY MUCH
```

FIG. 60

```
#101         PERSON #2

1   FOOD  C    1250
  1   FOOD  D     350

TAX          160
      TOTL        1760
      CASH        1800
      CHNG          40
```

FIG. 61

```
RESTAURANT ABC ...
#101
CUSTOMER #2

1   FOOD  C    1250
  1   FOOD  D     350

TAX          160
      TOTL        1760
      CASH        1800
      CHNG          40

FEB. 18  1992

THANK YOU VERY MUCH
```
⎯ MESSAGE AREA

FIG. 68
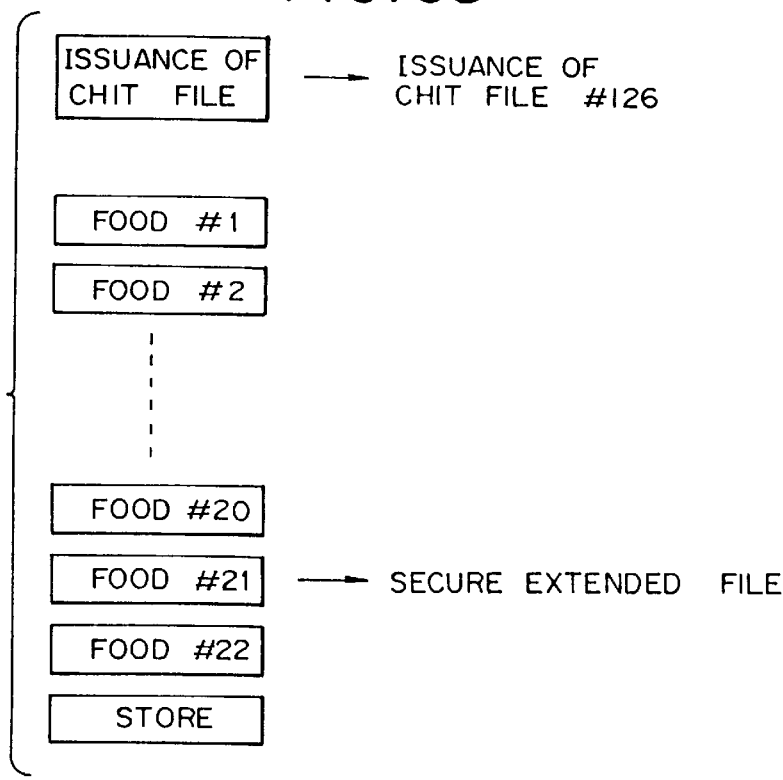
FIG. 69
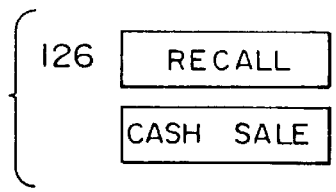
FIG. 70
```
#126
   1   FOOD#1      100
   1   FOOD#2      200
            ⋮
   1   FOOD#22    1500
       TAX         250
       TOTL       2750
```

FIG. 71
```
#126
    1    FOOD#1         100
    1    FOOD#2
              ⋮
    1    FOOD#22       1500
         TAX            250
         TOTL          2750
         CASH          2800
         CHNG            50
```
FIG. 72
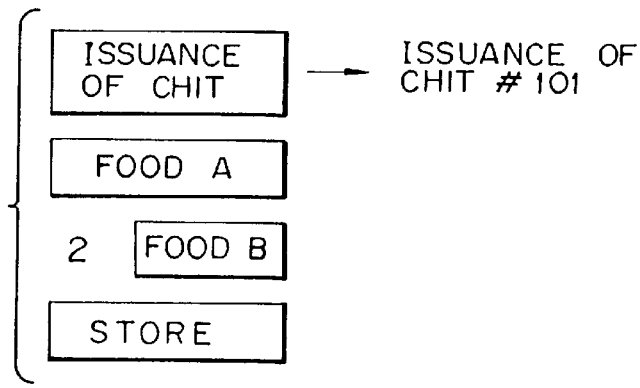
FIG. 73
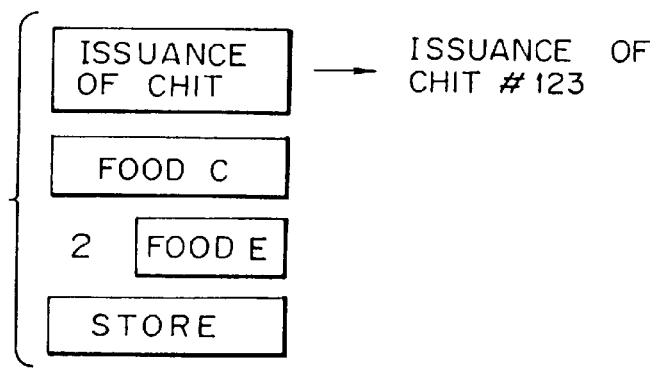

FIG. 74
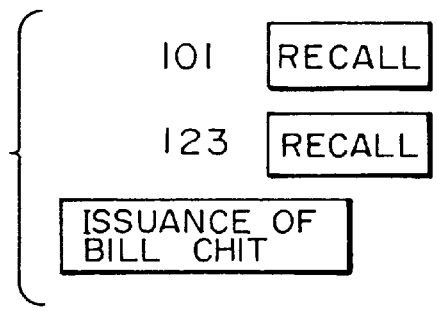
FIG. 75
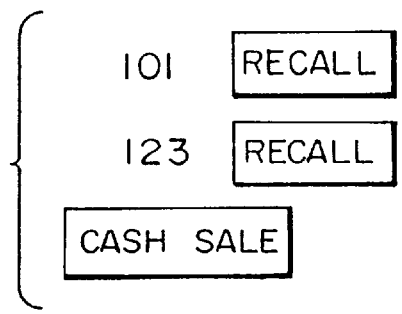
FIG. 76
```
| RESTAURANT ABC···           |
|-----------------------------|
| #101                        |
| 1 FOOD A       1250         |
| 2 FOOD B        700         |
|   SBTL         1950         |
|-----------------------------|
| #123                        |
| 1 FOOD C        600         |
| 3 FOOD E        300         |
|   SBTL          900         |
|-----------------------------|
|   TAX           285         |
|   TOTL         3135         |
| FEB. 18 1992                |
| THANK YOU VERY MUCH         |
```

```
RESTAURANT ABC···
#101
 1 FOOD A      1250
 2 FOOD B       700
   SBTL        1950
#123
 1 FOOD C       600
 3 FOOD E       300
   SBTL         900
   TAX          285
   TOTL        3135
   CASH        3135
FEB. 18 1992
THANK YOU VERY MUCH
```

| TIMES | TOTAL |
|---|---|
| 79-1 | 79-2 |

```
┌─────────────────────────┐
│  OPEN   GCK   REPORT    │
│ ─── ─── ─── ─── ─── ─── │
│  #101          JIM      │
│     P/B       1238      │
│     FEB. 18  18:15      │
│  #125         HELEN     │
│     P/B        585      │
│     FEB. 18  19:10      │
│  #128  TRNG   BOB       │
│     P/B        410      │
│     FEB. 18  19:20      │
│            ⋮            │
└─────────────────────────┘
```

CHIT FILE ISSUED IN LEARNING MODE 81-3

ELECTRONIC REGISTER WITH A LEARNING FUNCTION

This is a division of application Ser. No. 08/105,914 filed Aug. 12, 1993, now U.S. Pat. No. 5,805,831.

BACKGROUND OF THE INVENTION

The present invention generally relates to an electronic cash register utilized primarily in the dining-out service industry such as in restaurants or like shops and more particularly to an electronic cash register for registering customer orders in chit files stored in a memory incorporated in the register, issuing bill chits and performing sales totalization processing (transaction settlement processing).

The electronic cash register of the type mentioned above is known heretofore. However, the known electronic cash register lacks adaptability to various business environments and managements adopted in restaurants or the like shops and can not cope by itself with alterations or changes in the environment promptly by changing or modifying the preset information required for registration of customer orders in chit files, issuance of bill chits or receipts, execution of totalization processing and others.

Under the circumstances, in the shop where the chit processing scheme is frequently changed or altered, programs required to this end have to be down-loaded from a host computer to which the electronic cash register is connected via a communication line, which in turn means that high operation cost is involved.

However, in view of rapid and frequent changes in the conditions in which the cash register is operated as brought about by developments in the dining-out service industry, a variety of customer demands and/or labor environments, there exists a great demand for an electronic cash register having functions or capabilities for handling registration of customer orders in the chit files prepared in the memory incorporated in the cash register, provisional closing of the chit files, additional item registration therein, issuance of bill chits and so forth, wherein by changing or modifying the information preset in the cash register, the structure of the chit file as well as the method of processing the same can easily be altered or modified over a wide range so as to cope promptly and easily with the changes in the business environments of the shops in which the electronic cash registers are installed. More specifically, the electronic cash register known heretofore lacks the capability of realizing the functions mentioned below.

(1) Function capable of setting the number of article items for registration in one chit and the number of chit files as issued (i.e., the number of openable chits) which have to be disposed of by the electronic cash register, thereby to allow the structure or configuration of the chit file to be easily altered in the cash register so as to conform with the business environments of shops promptly and appropriately.

(2) Function for presetting and checking a chit file ID (identification) number reset flag in the memory, thereby to select an automatic issuing of the customer chit file ID number by manipulating a chit file issuing key starting from a starting number of "1" in the registration processing succeeding to the issuance of an adjustment report or starting from a serial number succeeding to the number generated before issuance of the adjustment report.

(3) Function for setting a customer chit file ID number generation mode to a manual generation mode and invalidating the manipulation of a chit file issuing key which is not accompanied with manual inputting of the ID number of the chit file while displaying a corresponding error message when the chit file ID number generation mode is the manual generation mode, while when the chit file issuing key is manipulated after inputting of a chit file ID number, a chit file of the corresponding ID number is issued provided that the chit file of the same ID number is not issued yet.

(4) Function for storing in the memory a first register ID number of the associated cash register and a second register ID number of a master electronic cash register which incorporates a memory shared by a plurality of cash registers in a cash register system which includes a plurality of individual cash registers interconnected via communication line, wherein generation of a customer chit file, provisional closing of the chit file, recalling thereof, additional article item registration therein and sales totalization can be effectuated by making access to the memory of the master cash register via a communication facility.

(5) Function for storing a customer chit file having article item registration data and a chit file ID number written therein and ending temporarily the registration processing for the chit file, and function for recalling the content of a customer chit file closed provisionally in response to actuation of a recall key after inputting the chit ID number to thereby make it possible to register additional article items in the recalled customer chit file, and the function responsive to actuation of the recall key to thereby set in the chit file a flag indicating that data of the chit file is being recalled, for thereby protecting the customer chit file being recalled against access attempted by another cash register.

(6) Function for allotting the ID number of a chit file cancelled by a cancel key after issuance of the chit file to a customer chit file issued subsequently with priority and confirming a drop-out of an ID number of the cancelled chit file from a sequence of the serial ID numbers by printing out a corresponding report.

(7) Function for displaying article items registered in the provisionally closed chit file which is recalled for registration of additional customer orders simultaneously with and distinctively from the additional items being currently registered by using different display regions or by affixing a distinction mark for confirmation.

(8) Function for enforcing inputting by a server in charge upon manipulation of the chit file issuing key in accordance with server control information preset in the memory and storing a server code in the chit file upon storing thereof to thereby allow the manipulation of the recall key to be validated for recalling of the provisionally closed chit file only when the server who closed provisionally the chit file is the same person as the server who manipulated the recall key, for thereby preventing mishandling of the server-allocated chits.

(9) Function for enforcing the server in charge to manipulate the chit file issuing key on the basis of the server control information set in the memory, wherein when the server in charge of the provisionally closed chit file as recalled is not identical with the server who manipulated the recall key, decision is made that the server who is in charge of the provisionally closed and recalled chit file is replaced by the server who manipulated the recall key, to thereby replace the server ID stored in the chit file by the ID of the replacing server who manipulated the recall key so that transfer of transaction information between the servers can be ascertained on the adjustment report.

(10) Function for issuing a bill chit for a chit file provisionally closed after item registration while confirming whether the bill chit has already been issued, to thereby prevent the bill chit from being issued in duplicate.

(11) Function for changing in a manual chit file issuing mode the ID number of the customer chit file undergoing the registration processing to a given chit ID number except for that of the chit being currently issued.

(12) Function for responding to the manipulation of a recall key for recalling the customer chit file closed provisionally to thereby invalidate the manipulation of the recall key and display a corresponding error message when the recall key is manipulated after inputting of a chit file ID number in the automatic recall mode, while when the recall key is manipulated without being accompanied with the inputting of the chit ID number, the content of the customer chit file having a smallest file ID number of all the issued chit files stored in the memory is recalled on the display device, i.e. the function suited to a shop (e.g., drive-through shop) in which the customer order chits sequentially undergo the totalization processing.

(13) Function for setting in the cash register as factors determining the structure of the chit file a number of customers registered per chit (a number of divisions of one chit file corresponding to different customers, respectively), a number of article items for registration per chit file, a number of chit files to be issued (a number of openable chit files) which have to be disposed of by the cash register, to thereby realize appropriately a chit file structure suited for the business environment of a shop in which the cash register is installed, so that the article items can be registered distinctively on a customer-by-customer basis with a plurality of customer orders being registered in a same chit file, while bill chits are issued separately on a customer-by-customer basis.

(14) Function for setting in the cash register as factors determining the structure of the chit file a number of customers to be registered per chit (a number of divisions of one chit file corresponding to different customers, respectively), a number of article items for registration per chit file, a number of chit files to be issued (a number of openable chit files) which can be disposed of by the cash register, to thereby realize appropriately the chit file structure suited for the business environment of the shop in which the cash register is installed, so that the article items can be registered distinctively on a customer-by-customer basis with a plurality of customer orders being registered in a same chit file and that the transaction end processing (transaction settlement processing) is performed separately from one to another customer.

(15) Function for inputting a number of customers capable of being handled with a chit file upon generation thereof, and when a number of customers as inputted exceeds the preset customer number per chit mentioned in the paragraph (13), another chit file area is additionally secured to be linked as an extended file of which link address is stored at an area provided in the chit file, so that a number of customers which exceeds the preset per-chit customer number can be disposed of by the cash register.

(16) Function for storing in a link address area an address information of other empty chit file for using the linked file as an extended file when number of items to be registered in a chit file as issued exceeds a preset per-chit number of items to be registered, so that a number of items which exceeds a preset number of items for registration per chit can be disposed of by the cash register.

(17) Function for performing recall processings sequentially for a plurality of chit files closed provisionally to thereby issue a bill chit by totalizing the data of the plural chit files, and a function for performing transaction settlement processing by totalizing the chit data.

(18) Function for setting the electronic cash register to a learning mode, wherein the chit file which is issued in the learning mode is enabled to undergo a recall processing and a transaction settlement processing only in the learning mode, while totalization data resulting from the chit registration processing performed on the chit file in the learning mode is added to only a learning totalizator of a totalization file, so that the chit registration processing in the registration mode (REG) can be distinguished from the chit registration processing in the learning mode, and the status of the chit registration processing in the learning mode can be confirmed by printing out data of the learning totalizator in the form of a report.

(19) Function for setting in the memory a learner code identifying a person in charge of learning, so that the chit file issued after the inputting of the learner code is enabled to undergo the recall processing and the transaction settlement processing only after the inputting of the learner code while totalization data resulting from the chit registration processing performed on the chit file is added to only a learning totalizator of a totalization file without being added to the ordinary sales totalization file, that the chit registration processing effected by a learner can be distinguished from the chit registration processing performed by other servers, and that the chit registration processing in the learning mode can be confirmed by printing out Data of the learning totalizator in the form of a report.

(20) Function for setting in the register a maximum customer number per chit (corresponding to a number of divisions of a chit, a maximum number of chit files as issued which have to be handled by the cash register as structural factors for the chit file, so that a structure of the chit file can be made suitable for the business environment in a shop or restaurant and the function for changing the preset control data to thereby modify the issuance of a chit file, storing (provisional closing), and recalling thereof as well as issuance of a bill chit so that chit file functions suited for business environments of various shops such as restaurants can be selected easily, promptly and conveniently from wide varieties of functions.

SUMMARY OF THE INVENTION

In the light of the state of the art, it is an object of the present invention to solve various problems from which the prior art electronic cash registers suffer and to provide an electronic cash register which by itself can promptly cope with various management schemes adopted in shops such as restaurants by virtue of a capability of changing the information set previously (preset) in the register over a wide range while facilitating the processing required to this end.

In view of the above and other objects which will become more apparent as description proceeds, there is provided according to an aspect of the present invention an electronic cash register which comprises a chit file constituent data setting unit for setting in the cash register a maximum customer number per chit (a number of divisions of a chit file corresponding to customers ID numbers to be registered), a maximum item number which can be registered per chit and a maximum number of chit files as issued (a number of openable chits) which can be handled by the electronic cash register to thereby make available the chit file of a structure suited for the shop in which the cash register is installed, chit issuance control unit for setting control information concerning issuance, storing (provisional closing) and recalling of the chit file and control information for issuing a bill chit, wherein controls are performed for registration, chit issuance, transaction settlement and/or issuance of adjustment report in accordance with respective set data by referencing the control information so that the chit file functions can be altered or changed easily, promptly and conveniently over a wide range in conformance with changes in the business environment in the shops such as restaurants.

In the electronic cash register of the structure mentioned above, owing to the function or capability of setting in the cash register a maximum customer number per chit (corresponding to a number of divisions of a chit file allocated to different customers, respectively), a maximum item number which can be registered in one chit and a maximum number of chit files as issued (a number of openable chits) which can be handled by the cash register as structural factors for the chit file, there can be obtained a chit file of the structure optimally suitable for the business environment in a shop or restaurant. Further, a function can be ensured for changing the preset control data to thereby modify the issuance of a chit file, storing (provisional closing), and recalling thereof as well as issuance of a bill chit so that chit file functions suited for business environments of various shops such as restaurants can be selected easily, promptly and conveniently from wide varieties of functions.

BRIEF DESCRIPTION OF THE DRAWINGS

FIG. 9 is a diagram illustrating exemplarily key manipulations for issuance of a chit file and for cash transaction in the register according to the first embodiment;

FIG. 24 is a flow chart for illustrating a store processing according to the fifth embodiment;

FIG. 25 is a diagram showing an exemplary key manipulation cancel processing performed in an electronic cash register according to a sixth embodiment of the invention;

FIG. 26 is a view showing an example of display generated in the chit file cancel processing according to the sixth embodiment;

FIG. 33 is a view illustrating an example of display of additional customer order registration in the cash register according to the seventh embodiment;

FIG. 34 is a view showing an example of display of registered article items in the cash register according to the seventh embodiment;

FIG. 60 is a view showing an example of display generated in the transaction settlement processing executed by using the customer ID number input key according to the fourteenth embodiment;

FIG. 61 is a view showing an example of a receipt or bill chit generated through the transaction settlement processing according to the fourteenth embodiment;

FIG. 68 is a view showing exemplary key manipulation for using an extended chit file according to the sixteenth embodiment;

FIG. 69 is a view showing exemplary recall key manipulation when an extended file is used according to the sixteenth embodiment;

FIG. 70 is a view showing an example of display generated upon item registration in the cash register according to the sixteenth embodiment;

FIG. 71 is a view showing an example of display generated upon settlement of cash sale transaction according to the sixteenth embodiment;

FIG. 72 is a view showing an exemplary key manipulation for issuing a bill chit in a cash register according to a seventeenth embodiment of the invention;

FIG. 73 is a view showing another exemplary key manipulation for issuing a bill chit according to the seventeenth embodiment;

FIG. 74 is a view showing yet another key manipulations for issuing a bill chit through a chit file combining processing according to the seventeenth embodiment;

FIG. 75 is a view showing another exemplary key manipulation for effectuating a cash sale settlement processing by combining chit files according to the seventeenth embodiment;

FIG. 76 is a view showing an example of a bill chit (receipt) printed out through the combining processing according to the seventeenth embodiment;

DESCRIPTION OF THE PREFERRED EMBODIMENTS

Now, the present invention will be described in conjunction with exemplary or preferred embodiments of the electronic cash register according to the invention by reference to the accompanying drawings.

Embodiment 1

Figure 1:
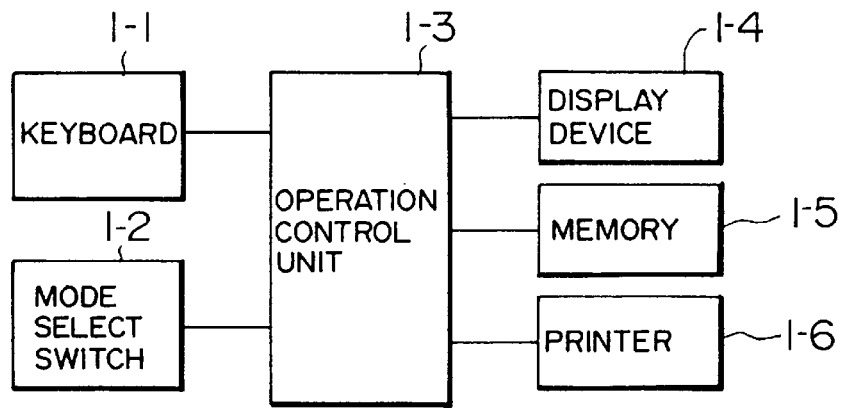
FIG. 1 is a block diagram showing a general arrangement of an electronic cash register according to a first embodiment of the present invention.

FIG. 1 shows a general arrangement of an electronic cash register according to a first embodiment of the present invention. In this figure, a reference numeral 1—1 denotes a keyboard which includes a chit issuing key, numeral inputting keys, ordered article item registering keys, a totalizing key and others as required, wherein upon operation of these keys, corresponding key codes are generated and supplied to an operation control unit 1-3 which incorporates a read-only memory (hereinafter referred to as ROM) adapted for storing processing programs for performing various tasks or functions imposed on the electronic cash register. In addition to the keyboard 1—1, there are connected to the operation control unit 1-3 a mode select switch 1-2, a display device 1-4, a memory 1-5 and a printer 1-6.

Figure 2:
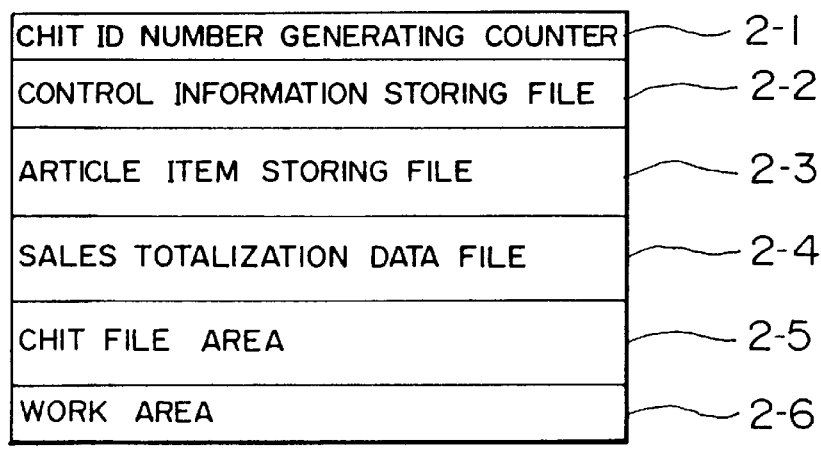
FIG. 2 is a diagram showing a structure of a memory incorporated in the electronic cash register according to the first embodiment.
Figure 3:
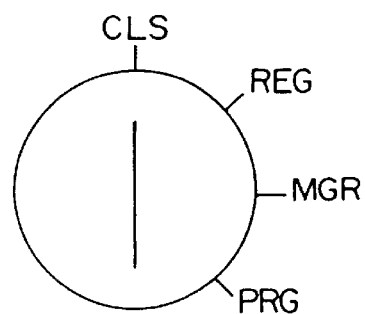
FIG. 3 is a view showing an outer appearance of a mode select switch employed in the electronic cash register according to the first embodiment.

The mode select switch 1-2 serves for designating selectively operation modes of the electronic cash register such as close (CLS) mode, manager (MGR) mode, presetting (P) mode, etc., wherein operation mode data inputted by manipulating the mode select switch 1-2 are fetched by the operation control unit 1-3 in precedence to the activation of the task processing program to thereby determine the processing to be performed. An outer appearance of the mode select switch 1-2 is shown in FIG. 3. The display device 1-4 is adapted to display the contents of the registered customer orders as well as contents of reports generated upon inspection and adjustment which are executed by the operation control unit 1-3. The memory 1-5 serves to store data required for the registration processing and totalization processings as well as data generated in accompanying these processings and includes internally a chit ID number generating counter 2-1, a control information storing file 2—2, an article item setting file 2-3, a sales totalization data file 2-4 and a chit file area 2-5, as shown in FIG. 2. Additionally, the memory 1-5 has a work area which is used by the operation control unit 1-3 for execution of the processings/computations involved in the registration, totalization and other operations. The printer 1-6 serves for printing out the results of the processings performed by the operation control unit 1-3 such as the registered contents of customer orders, inspection, contents of the reports issued upon adjustment.

Operation of the electronic cash register according to the instant embodiment of the invention will now be described.

Figure 5:
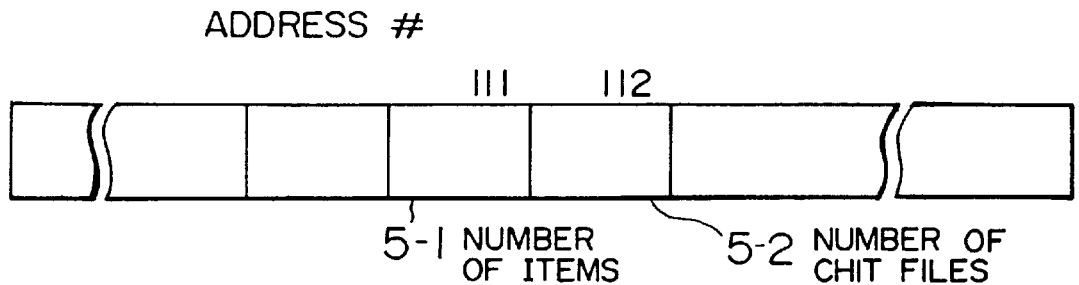
FIG. 5 is a diagram showing a structure of a chit file constituent factor setting area in a control information storing file in the cash register according to the first embodiment.
Figure 6:
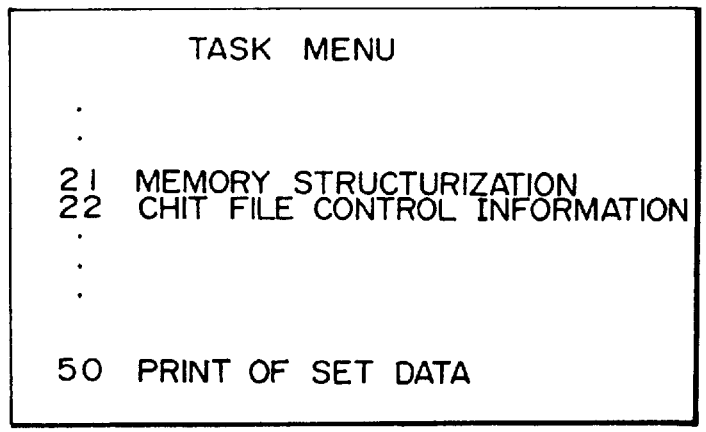
FIG. 6 is a view for illustrating a display of a task menu generated in the cash register according to the first embodiment.
Figure 8:
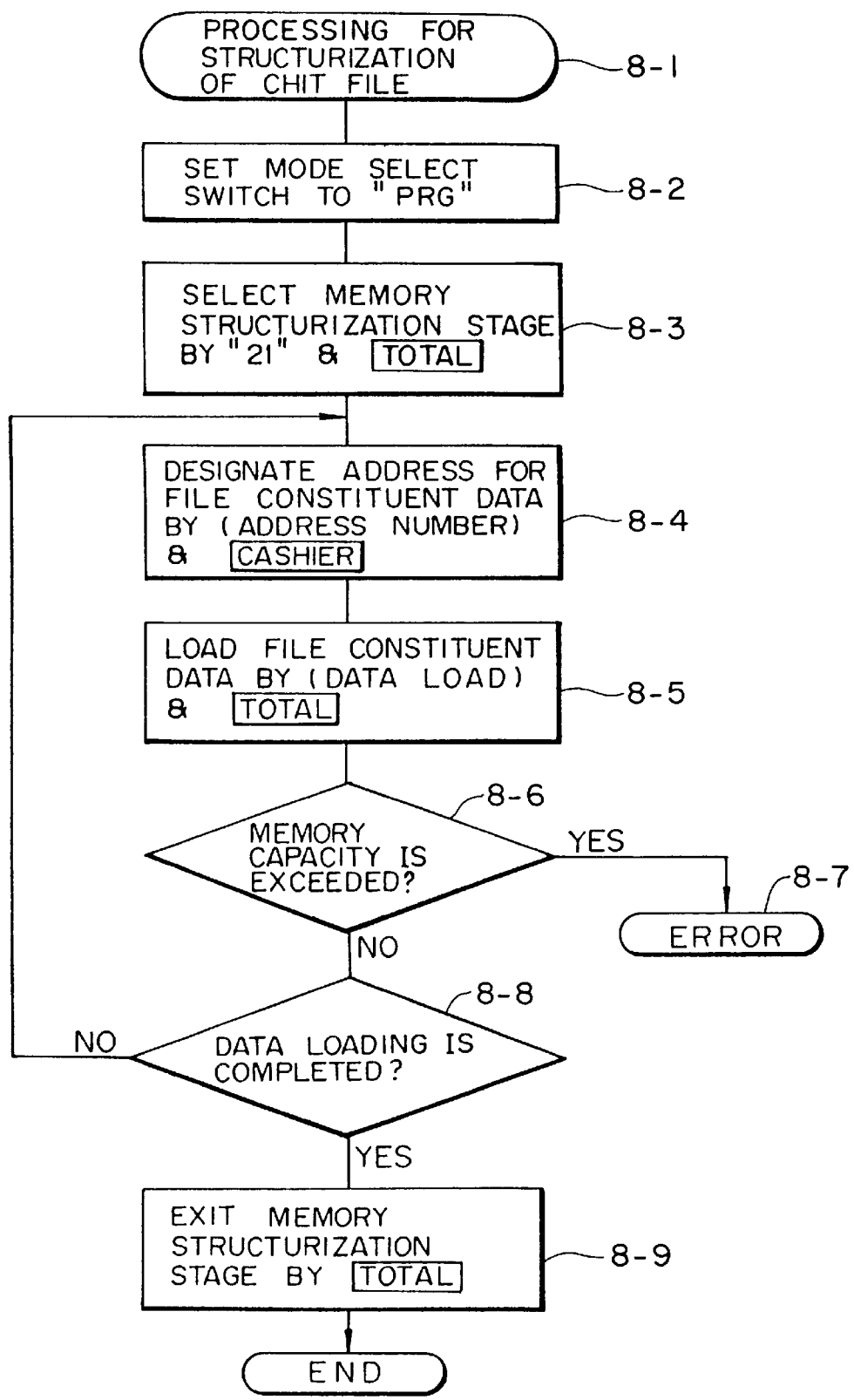
FIG. 8 is a flow chart for illustrating operation involved for setting chit file constituent factors in a memory of the cash register according to the first embodiment.

FIG. 8 is a flow chart for illustrating the operation involved for setting or structurizing a chit file (step 8-1) in the memory 1-5 of the electronic cash register. In the control information storing file 2—2 of the memory 1-5, there is secured an area for setting constituent data for the chit file, the area having a structure shown in FIG. 5. As can be seen in the figure, the number of items for registration in one chit (per chit) is placed at an address #111 while a number of chit files as issued (the number of openable chits) which can be disposed of by the electronic cash register is placed at an address #112. When the operation mode of the electronic cash register is set to the presetting mode (PRG) by means of the mode select switch 1-2 (step 8-2), a task menu for the presetting mode is displayed, as is illustrated in FIG. 6. At this time point, by inputting "21" and "TOTAL" (step 8-3) through manipulation of the corresponding keys (e.g., keys labelled "2" and "1" and a key labelled "TOTAL") of the keyboard 1—1, a memory structurization stage 21 is selected. Subsequently, by inputting "111" and "CASHIER" (step 8-4) through the corresponding key manipulations, the address #111 of the chit file constituent data setting area shown in FIG. 5 is designated. In succession, through the input operation of the keys labelled "SET DATA" and "TOTAL" (step 8-5), the number of the items for registration per chit is placed. By repeating the key manipulation mentioned above while changing the addresses ID number (#), the number of the files for the chits as issued (i.e., the number of the opened chits) which can be disposed of by the electronic cash register is set at the address #112. In the presetting operation described above, the capacity of the chit file area 2-5 is arithmetically determined on the basis of the numbers of the setting operations, whereon the total capacity for the memory structure shown in FIG. 2, inclusive of the memory capacity for the chit file area 2-5, is calculated. When the total capacity exceeds the actual capacity of the memory 1-5 (step 8-6), the memory presetting processing results in error (step 8-7), whereby an error message is displayed with the setting processings as performed being invalidated. After successful completion of the data setting or loading operations (step 8-8) described above, the processing procedure exits the setting stage in response to operation of the key labelled "TOTAL" (step 8-9).

Figure 4:
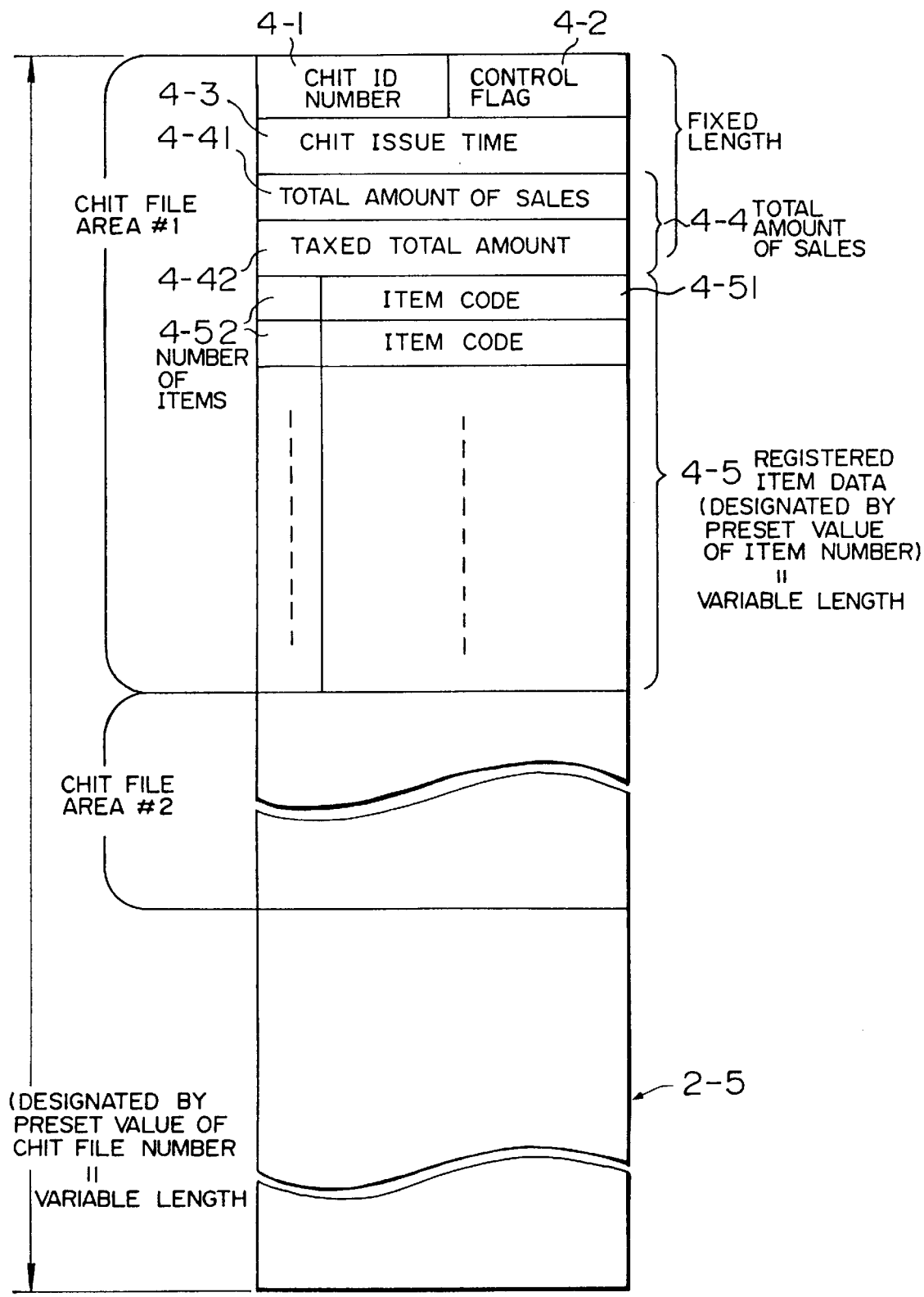
FIG. 4 is a diagram showing an arrangement of chit file areas provided in a memory of the electronic cash register according to the first embodiment.

FIG. 4 is a diagram illustrating a structure of the chit file area 2-5. On the basis of the number as set at the address #111 in the chit file constituent data setting area (i.e., the number of the items registered per chit), the amount of the registered item data 4-5 is determined. On the other hand, on the basis of the numbers as set at the address #112 in the area mentioned above (i.e., the number of the issued chit files which can be handled by the electronic cash register), a total number of all the chit files in the chit file area 2-5 is determined. In this way, the chit file area shown in FIG. 4 is configured.

Next, description will be directed to operations involved in the processings for issuing the chit in the registration mode of the cash register. FIG. 9 is a diagram illustrating exemplarily key manipulations for issuance of a chit and cash transaction. In a key manipulation step 9-1, a chit file #101 is issued, whereon one piece of "FOOD A" and two pieces of "FOOD B" are registered in the chit file as issued. Thereafter, through manipulation of a store key, the chit file #101 is stored in the chit file area 2-5. In a key manipulation step 9-2, the chit file #101 is recalled or read out to the work area 2-6 from the chit file area 2-5, whereon the total of money to be received in cash for the sale recorded in the chit file is determined for settlement of the transaction.

Figure 10:
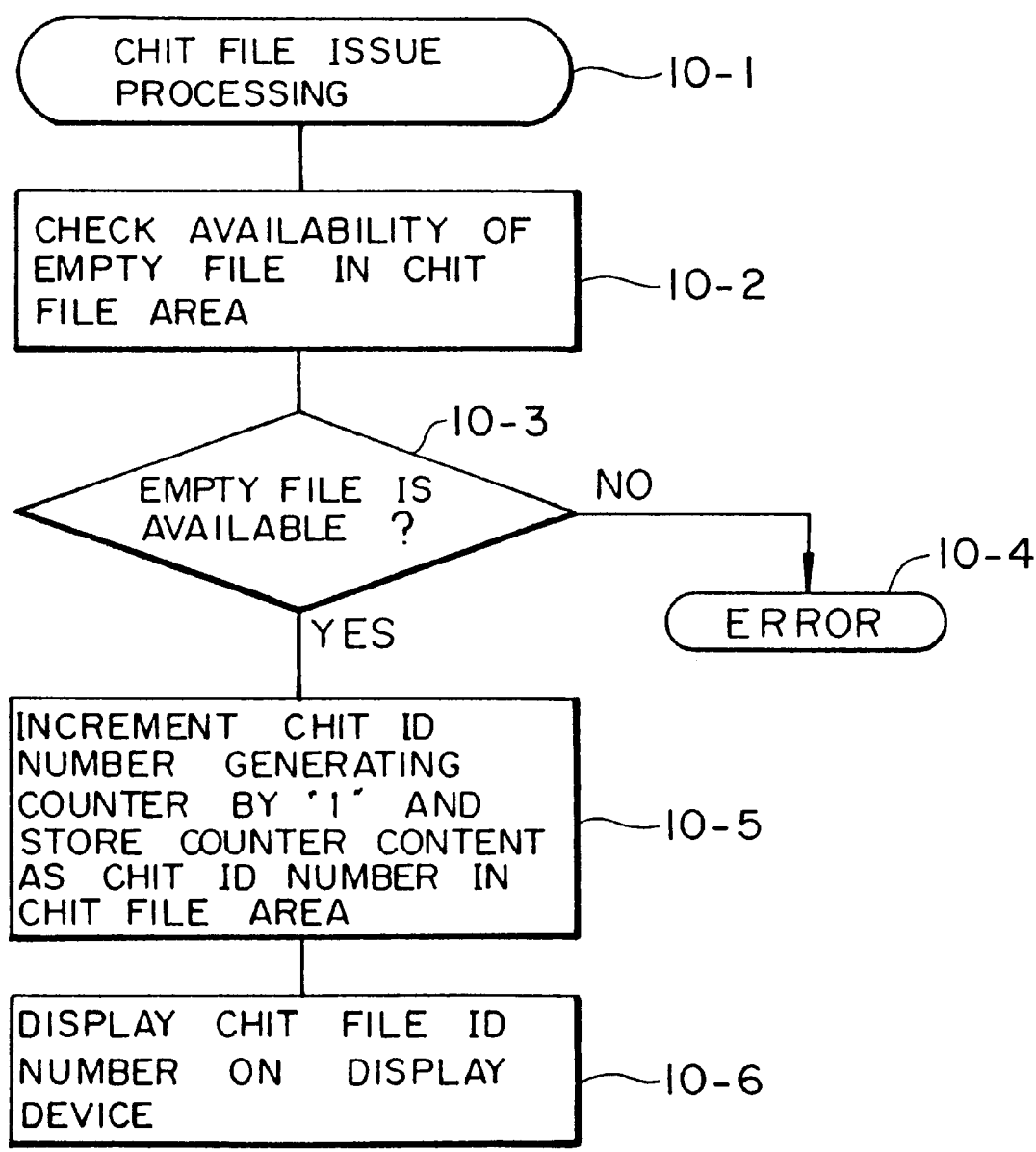
FIG. 10 is a flow chart for illustrating a chit file issuance processing performed in the register according to the first embodiment.

FIG. 10 is a flow chart for illustrating a chit file issuing processing (10-1). By manipulating a key of the keyboard allocated to the issuance of a chit file, the chit file area 2-5 is checked as to whether there exists any unoccupied or empty file which is not assigned with the chit identification (ID) number yet (step 10-2). If no empty chit file is available (step 10-3), the above-mentioned key manipulation for issuance of the chit file is invalidated with a corresponding error message (step 10-4) being displayed. On the other hand, when an empty or unoccupied file exists (step 10-3), the chit ID number generating counter 2-1 is incremented by one, and the ID number outputted from this counter is set in the chit ID number area 4-1 of the above-mentioned empty file (step 10-5). Additionally, the chit ID number is displayed on the display device 1-4 as well (step 10-6).

In the foregoing, description has been made on the assumption that the medium for storing the processing programs to be executed by the operation control unit 1-3 is a read-only memory (ROM). However, it goes without saying that other various recording media inclusive of floppy disks or the like can be used to this end.

Embodiment 2

The second embodiment of the electronic cash register according to the invention is directed to a modification of the chit file ID number generating counter 2-1 employed when a chit file is to be issued through the key manipulation described previously in conjunction with the first embodiment. More specifically, according to the instant embodiment of the invention, the chit file ID number generating counter 2-1 is imparted with an additional control function, which will be described below.

Figure 11:
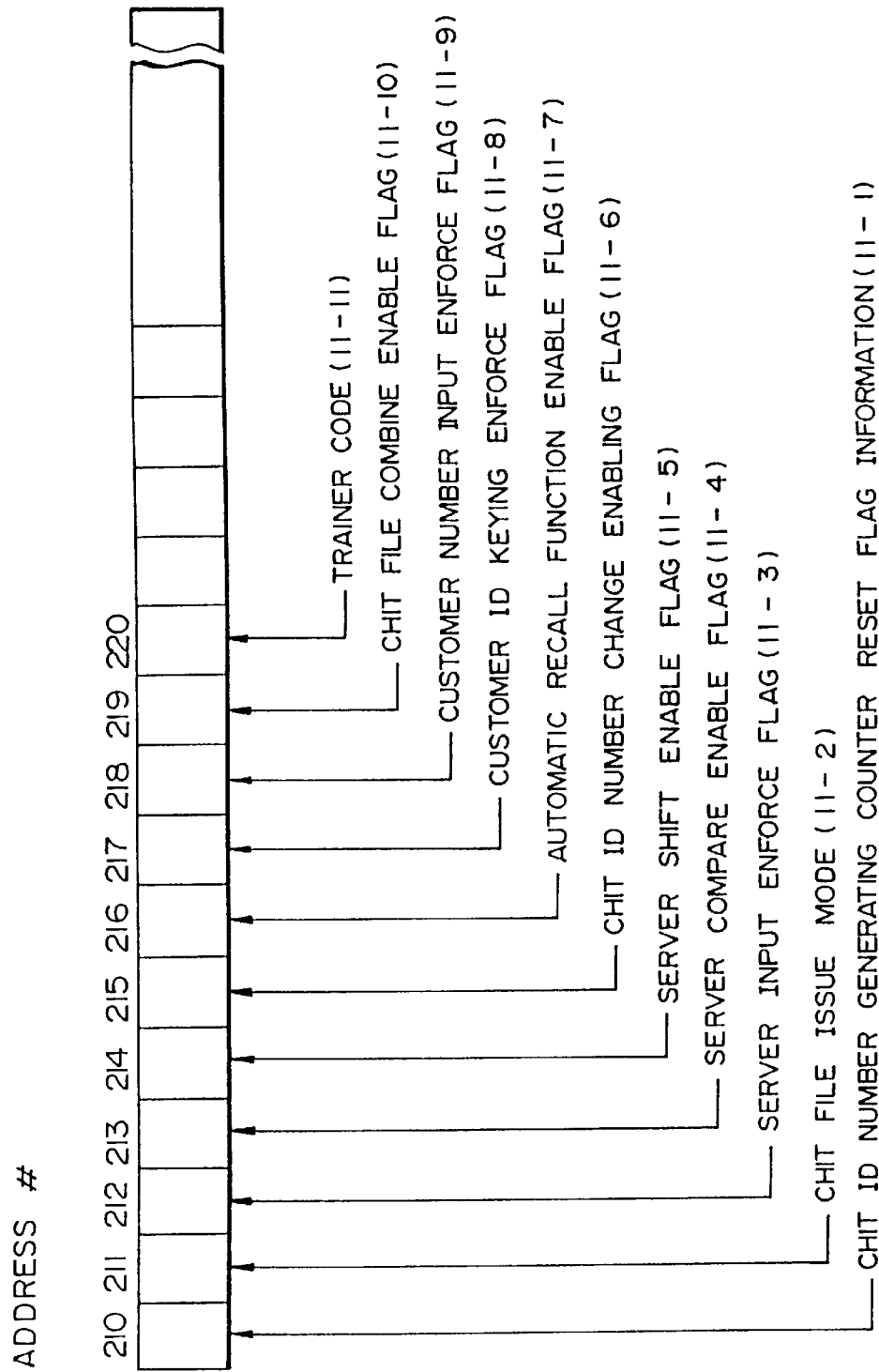
FIG. 11 is a diagram showing a structure of a chit file control information storing area provided in the control information storing area in an electronic cash register according to a second embodiment of the invention.

FIG. 11 is a diagram showing a structure of a chit file control information storing area provided in the control information storing area 2—2 of the memory, wherein an address #210 indicates a location (11-1) where a chit ID number generating counter reset flag information is placed.

Figure 12:
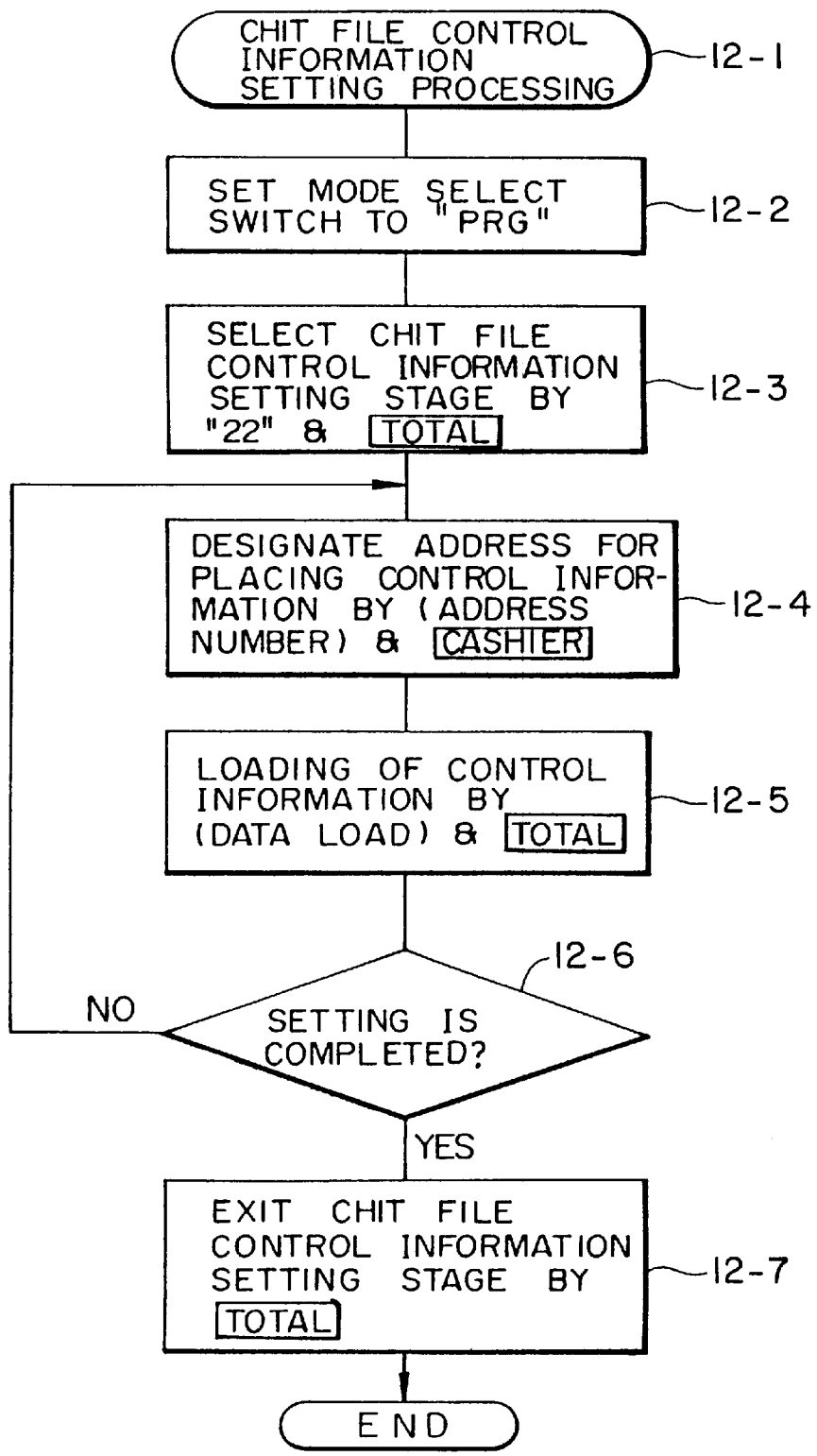
FIG. 12 is a flow chart for illustrating operations involved in setting data in the chit file control information storing area of the register according to the second embodiment.

Further, FIG. 12 is a flow chart illustrating operations involved in loading the data in the chit file control information storing area shown in FIG. 11 (12-1). Referring to FIG. 12, there are secured in the control information storing file 2—2 the areas for a variety of chit file control information in the structure shown in this figure, wherein these areas can be distinctively identified by respective address (ID) numbers #. When the operation mode of the electronic cash register is set to the presetting mode (PRG) (step 12-2), the task menu for the presetting mode is displayed, as illustrated in FIG. 6. Through the key manipulation "22" and "TOTAL" (step 12-3) in the keyboard 1—1, a chit file control information setting stage or routine 22 is selected. Subsequently, through the key manipulation "210" and "CASHIER" (step 12-4), an address number # denoted by 210 (FIG. 11) is designated for the chit file control information storing area shown in FIG. 11. In succession, with the key manipulation "Data Loading" and "TOTAL" (step 12-5), the chit ID number generating counter reset flag information is set. By repeating the key manipulation process mentioned above while changing the address number #, the chit structural data are set at the corresponding address numbers #. Upon completion of the data loading procedure (step 12-6), the processing exits the presetting stage or routine in response to operation of the key labelled "TOTAL" (step 12-7).

Figure 7:
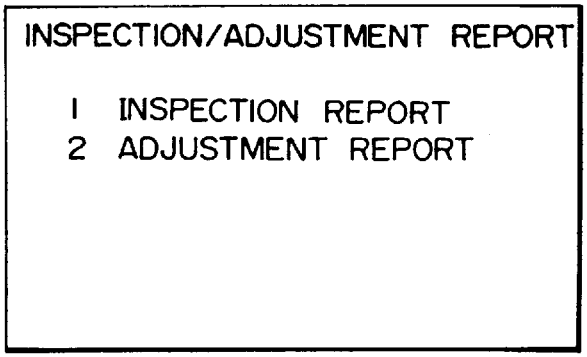
FIG. 7 is a diagram showing a task menu which is displayed for issuing inspection and adjustment reports in the register according to the first embodiment.
Figure 13:
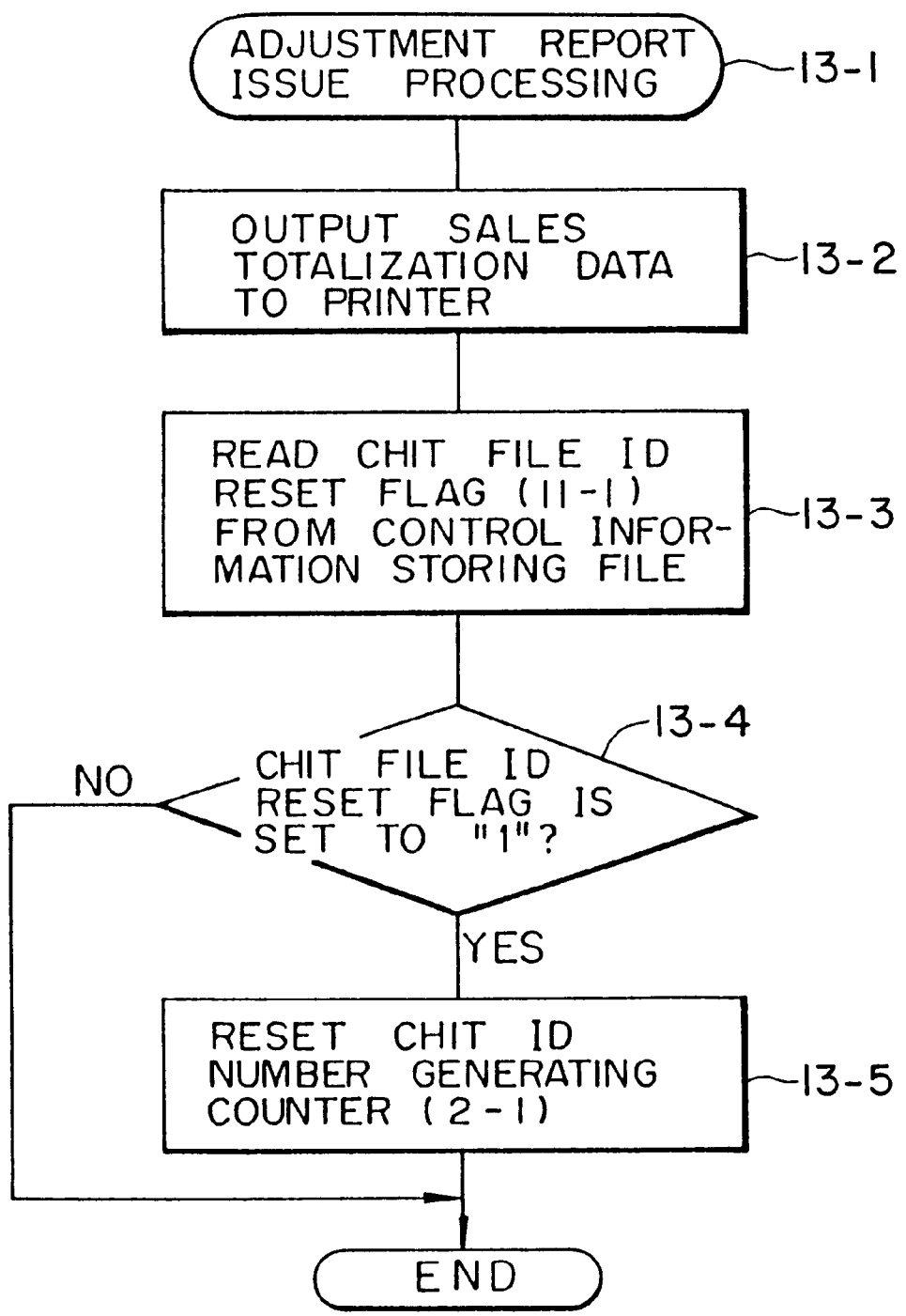
FIG. 13 is a flow chart for illustrating an adjustment report issuing processing performed in the register according to the second embodiment.

Next, description will turn to operations for an adjustment report issuing processing (13-6) in the manager mode (MGR) of the cash register by reference to a flow chart of FIG. 13. When the operation of the electronic cash register is set to the manager (MGR) mode with the mode select switch 1-2, a task menu for issuing an inspection/adjustment report shown in FIG. 7 is displayed. By inputting "2" and "TOTAL" through corresponding key manipulation on the keyboard 1—1, contents of the sales totalization data file 2-4 are sent to the printer 1-6 (step 13-2), which then prints out an adjustment report. After the print-out of the adjustment report, the chit file ID number reset flag information 11-1 set by the setting means mentioned hereinbefore is checked (step 13-3). When the chit file ID number reset flag information 11-1 is set (step 13-4), the chit ID number generating counter 2-1 is reset (step 13-5), while, if otherwise, the counter 2-1 is left as it is.

Owing to the chit file number ID reset flag information 11-1, it is possible in the registration processing succeeding to the issuance of the adjustment report to selectively determine whether an automatic generation of the customer chit file ID numbers through the corresponding chit file generating key manipulation is to be started from "1" or alternatively a serial number succeeding to the customer chit file ID number occurring before issuance of the adjustment report is to be assigned to a subsequent customer chit file.

As a similar function, it is equally possible to set previously an initial value of the chit file ID number in the chit file control information storing area through the similar setting operation as described above, wherein when the chit file ID number reset flag information 11-1 is set, the above-mentioned initial value of the chit file ID number is transferred to the chit ID number generating counter 2-1. In this case, the automatic generation of the customer chit file ID number through the key manipulation for issuing the chit file can be started arbitrarily from a given number.

Embodiment 3

The electronic cash register according to the third embodiment of the invention differs from the first embodiment thereof in that a manual generation mode is additionally provided for the chit ID number issuing mode realized through the key manipulation for issuing the chit. FIG. 11 shows a structure of the chit file control information storing area provided in the control information storing file 2—2, wherein an address number #211 (FIG. 11) indicates a location where the chit ID number generation mode control information is placed. The data loading in this case (11-2) is carried out through the same procedure as described hereinbefore by reference to FIG. 12 in conjunction with the second embodiment.

Figure 14:
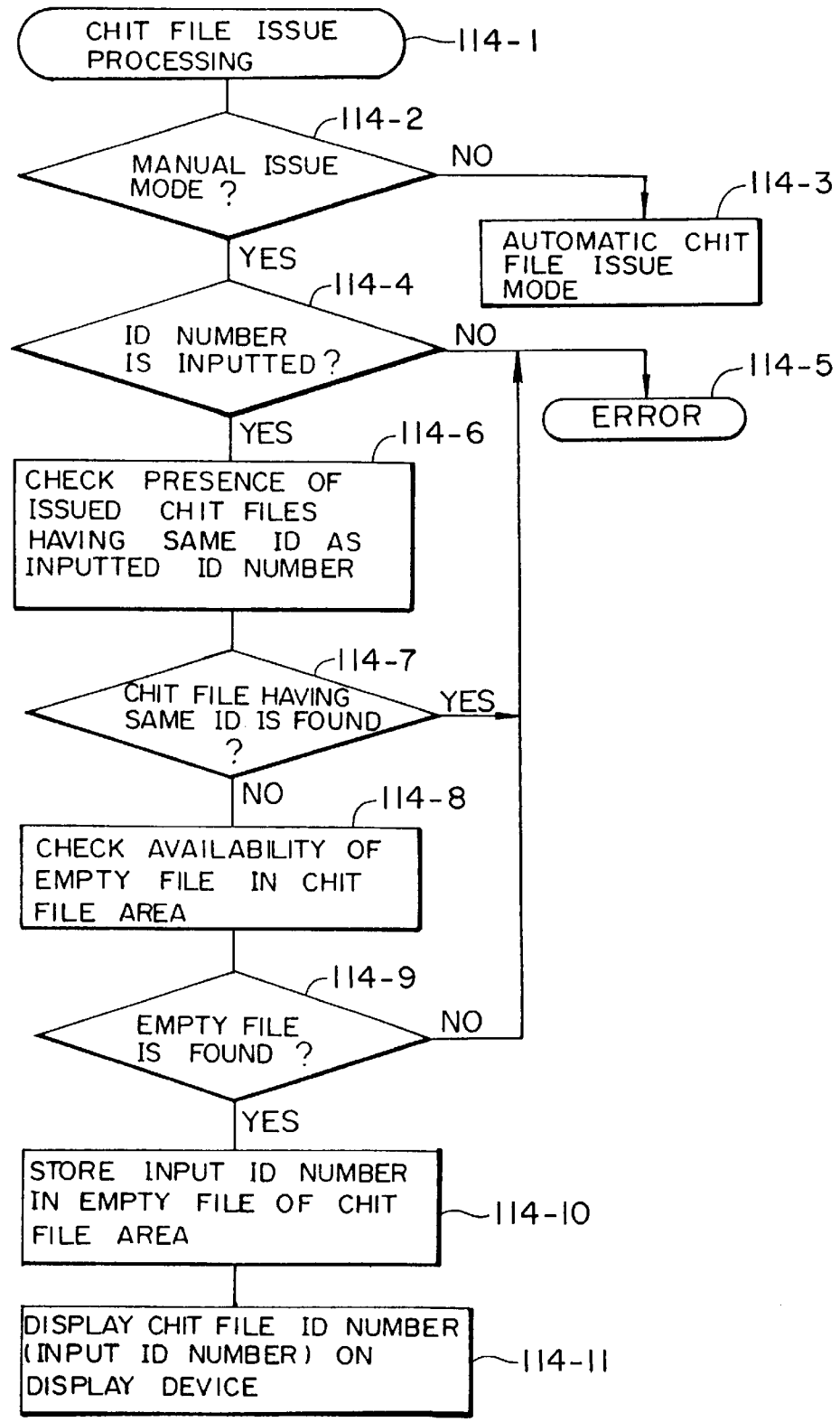
FIG. 14 is a flow chart for illustrating a chit file issuing processing in a manual mode of the cash register according to a third embodiment of the present invention.

FIG. 14 illustrates in a flow chart a procedure for the chit ID number generation processing when the manual mode is set to the address number #211 (11-2) of the chit file control information storing area. At this juncture, it should be mentioned that unless the manual mode is set (step 114-2) at the address #211 (11-2) of the chit file control information storing area upon issuance of a chit file in the registration mode of the operation control unit as designated by the mode select switch, the automated chit issuance mode is validated (step 114-3), whereby serial numbers are allocated sequentially as the chit ID numbers by using the chit ID number generating counter 2-1 as described previously in conjunction with the first embodiment. In contrast, in the case where the manual mode is set (step 114-2) at the address #211 (11-2) of the chit file control information storing area, manipulation of the chit file issuing key without inputting a corresponding chit file ID number (step 114-4) is invalidated with a corresponding error message being displayed (step 114-5). On the other hand, when the chit file issuance key is manipulated after inputting the chit ID number (step 114-4), all the chit files as issued and stored in the chit file area 2-5 shown in FIG. 2 (i.e., all the chit files being opened) are checked as to whether there exists a chit file which has been allocated with the same ID number as the inputted one (step 114-6). When the same file number is found (step 114-7), the issuance or generation of the chit file of the ID number represented by the inputted numerals is inhibited and an error message is displayed. Otherwise, the chit files stored in the chit file area 2-5 are checked as to availability of any unoccupied or empty file which is allocated with no chit ID number (step 114-8). Unless any empty file is available (step 114-9), the chit issuing key manipulation mentioned above is invalidated and an error message is displayed on the display device 1-4. On the contrary, when the empty file is found (step 114-9), the numerical value as inputted is stored in the chit ID number area 4-1 of that empty file (step 114-10), as shown in FIG. 4. Additionally, the chit ID number is also displayed on the display device 1-4 (step 114-11).

Embodiment 4

Figure 16:
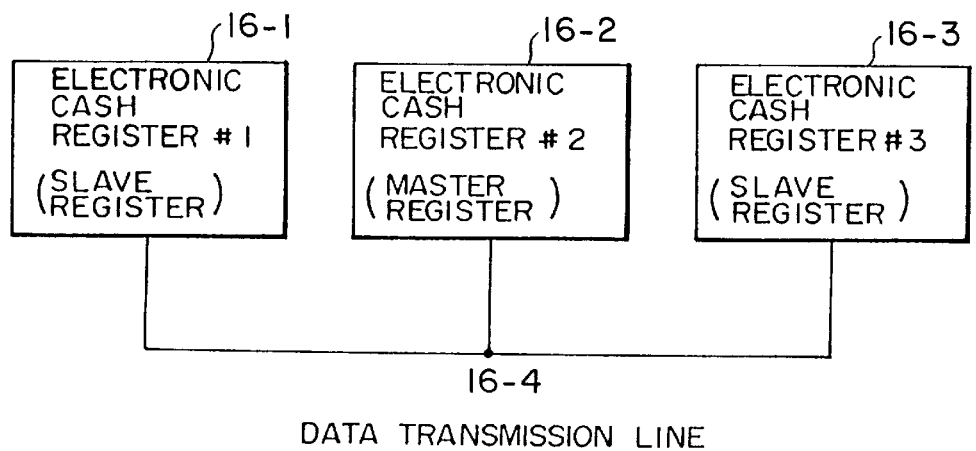
FIG. 16 is a block diagram showing schematically a structure of a register system including a plurality of interconnected electronic cash registers according to the fourth embodiment.

The electronic cash register according to the fourth embodiment of the invention is directed to an electronic cash register system which includes a plurality of electronic cash registers interconnected in a manner as illustrated in FIG. 16, wherein processings for issuance of the customer chit file, provisional file closing (store processing), recalling (recall processing), additional registration of articles for sale and the sales totalization processing can be executed from a given one of the cash registers through mutual communication.

Figure 15:
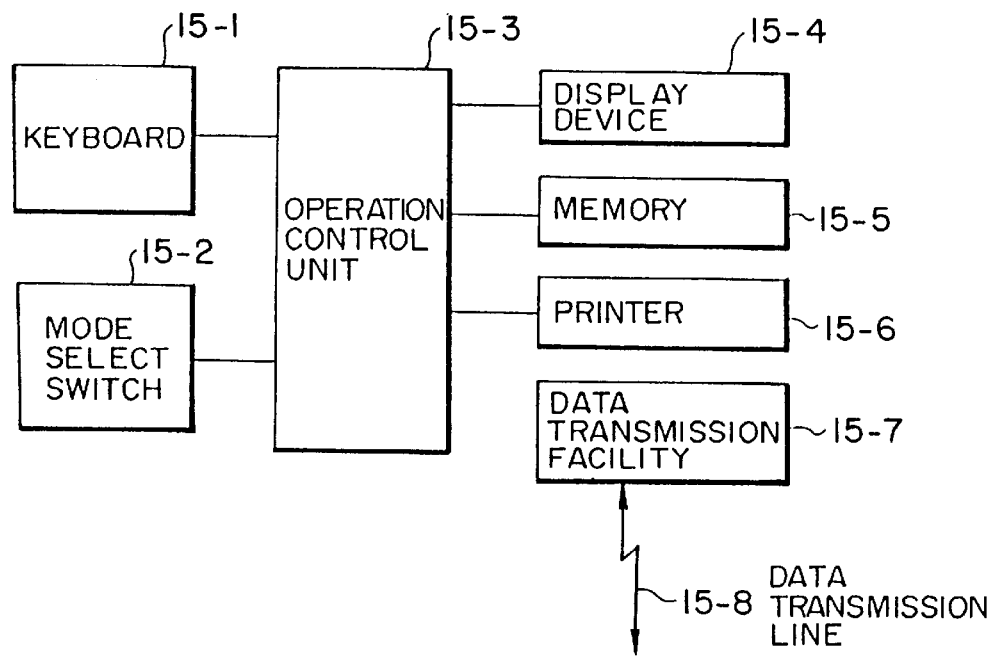
FIG. 15 is a block diagram showing a structure of an electronic cash register according to a fourth embodiment of the present invention.
Figure 87:
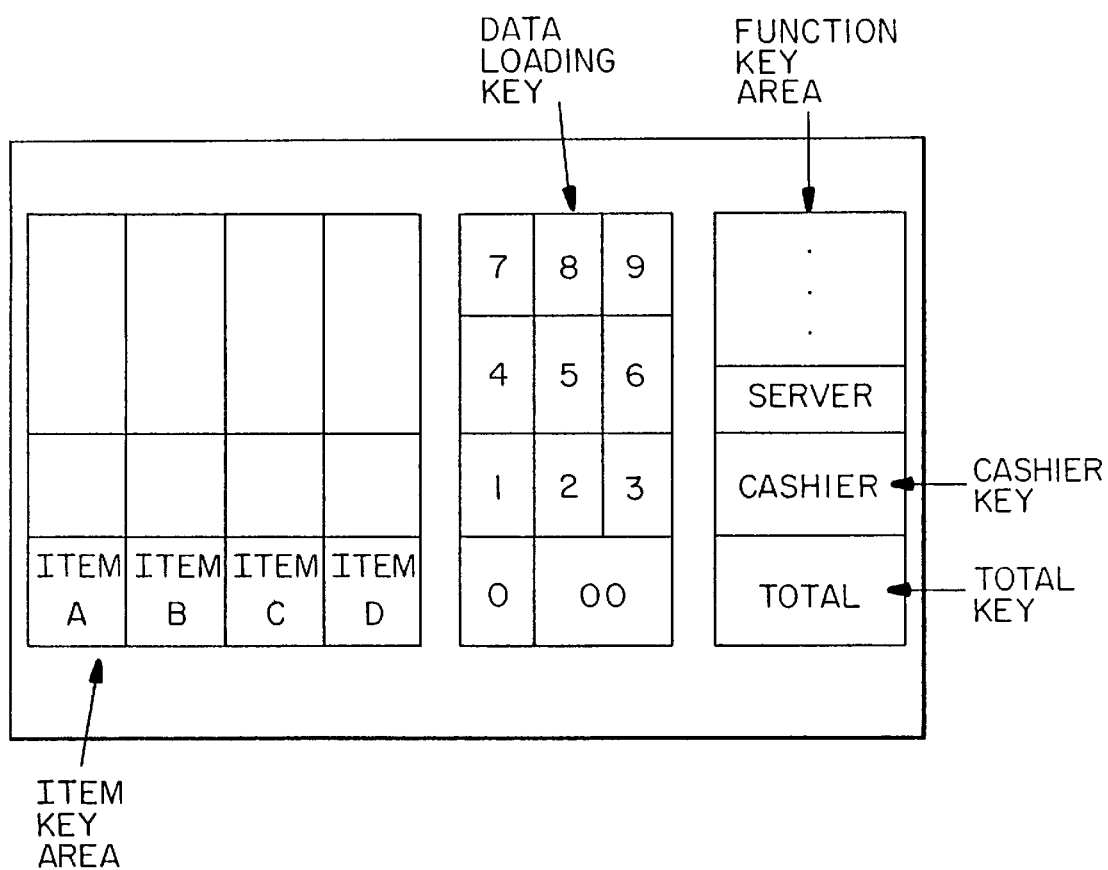
FIG. 87 illustrates the structure of the keyboard of FIG. 15.

FIG. 15 is a block diagram showing a structure of the electronic cash register adapted to be employed in the system shown in FIG. 16. The cash register according to the fourth embodiment of the invention differs from that of the first embodiment in that a communication facility 15-7 is additionally provided for allowing transmission and reception of data of the chit files and others among a plurality of registers. FIG. 87 shows the structure of keyboard 14-1 as including a cashier key, a server key, a total key, data loading keys and an item key area.

Figure 17:
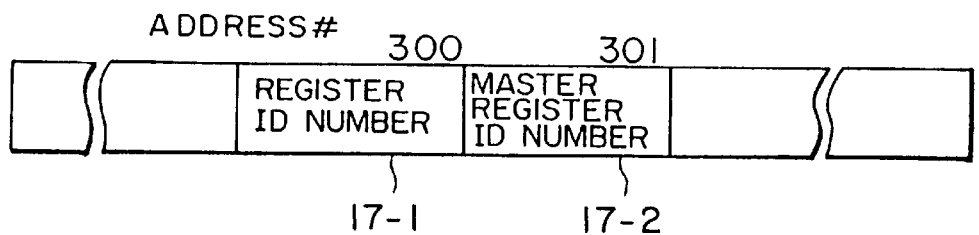
FIG. 17 is a diagram showing an arrangement of register number setting areas for storing slave and master register ID numbers in the register system according to the fourth embodiment.
Figure 18:
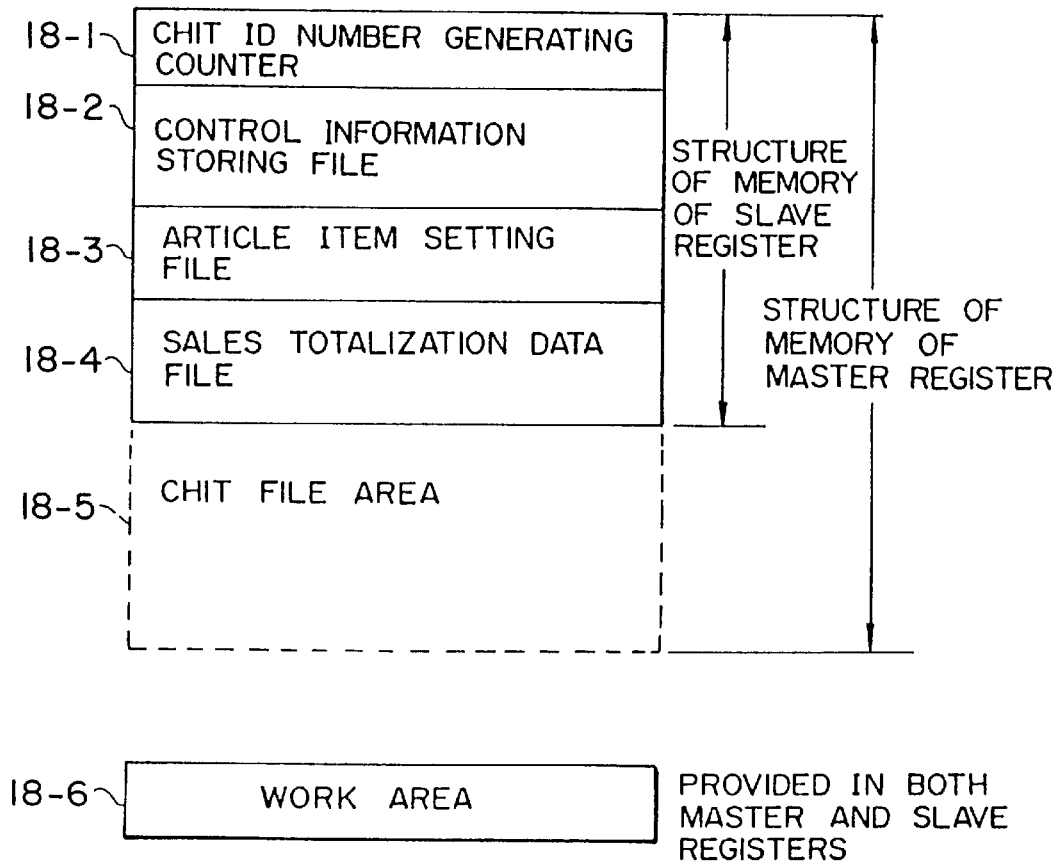
FIG. 18 is a diagram for illustrating structures of the memories for the master register and the slave registers in the system according to the fourth embodiment.

FIG. 17 is a diagram showing an arrangement of register number setting areas provided in the control information storing file 18-2 of each cash register (FIG. 18). More specifically, there are provided a register ID number setting area 17-1 allotted with an address #300 and a master register ID number setting area 17-2 allotted with an address #301. Loading of data in these areas 17-1 and 17-2 is performed through a same procedure as described hereinbefore by reference to the flow chart of FIG. 12 in conjunction with the second embodiment of the invention. At this juncture, it should be mentioned that the master register ID number indicates the ID number of the cash register whose memory is used in sharing by a plurality of cash registers as the customer chit file memory. In the case of the system shown in FIG. 16, it is assumed that the electronic cash register #2 serves as the master cash register.

FIG. 18 is a diagram for illustrating structures of the memories for the master cash register and the other cash registers (referred to as the slave registers) in the system according to the fourth embodiment of the invention. Referring to FIG. 18, the memory destined for use in the master cash register includes a chit file ID number generating counter 18-1, a control information storing file 18-2, an article item setting file 18-3, a sales totalization data file 18-7 and a chit file area 18-5, as in the case of the first embodiment (see FIG. 2). On the other hand, the memory of he slave cash register includes a chit ID number generating counter 18-1, a control information storing file 18-2, an article item setting file 18-3 and a sales totalization data file 18-4. In the figure, a reference numeral 18-6 denotes a work area which is provided in both memories of the master cash register and the slave cash register. In the memory of the master cash register, the number of items for registration per chit is set at the address #111 of the chit file constituent factor or data setting area of the structure shown in FIG. 5, while the number of chit files as issued which can be handled by the master cash register (i.e., the number of openable chit files) is set at the address #112 through the procedure illustrated in the flow chart of FIG. 8. Through this setting procedure which is similar to that described hereinbefore in conjunction with the first embodiment of the invention, the chit file area 18-5 in the memory of the master cash register is configured in such a structure, as illustrated in FIG. 4.

Figure 19:
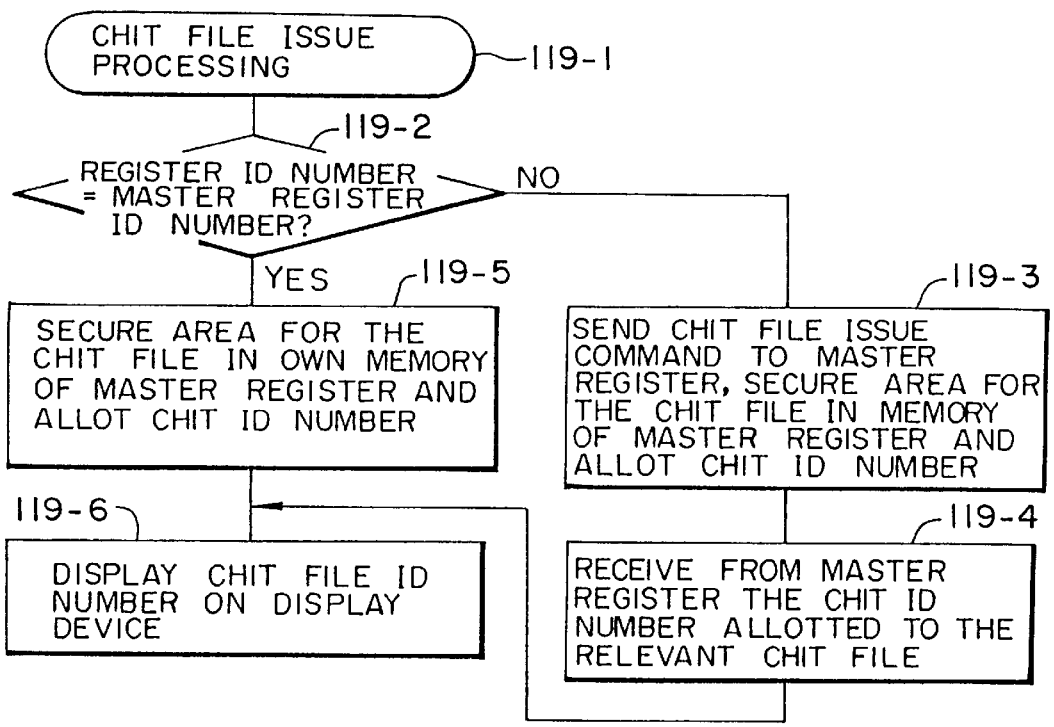
FIG. 19 is a flow chart for illustrating a chit issuing processing performed in the register system according to the fourth embodiment.

Next, description will be directed to operations involved in the chit issuing processing in the registration (REG) mode of the cash register. FIG. 19 is a flow chart for illustrating the chit issuing processing (119-1). Upon manipulation of the chit issuing key on the key board 1—1, the register ID number (address #300) placed in the associated or own control information storing file 17-2 is compared with the master register ID number (address #301) (step 119-2). When the comparison results in coincidence (MATCHING), then the chit files in the chit file area 18-5 of the own memory are checked as to whether there is available any empty file not assigned with the chit ID number yet. Unless an empty file is found, the chit issuing key manipulation described above is invalidated and a corresponding error message is displayed. On the other hand, when an empty file exists, the chit ID number generating counter 18-1 is incremented by "1" and the content of this counter is stored in the chit ID number area 4-1 of the empty file (step 119-5). Additionally, this chit ID number is displayed on the display device 15-4 (step 119-6). In the case where the master cash register ID number at the address #301 does not coincide with the register ID number at the address #300 (MISMATCH), a command for issuing a chit file is sent to the cash register allotted with the master cash register ID number through the communication unit 15-7 (step 119-3). In response to the command, the chit files stored in the chit file area 18-5 of the memory of the master cash register are checked as to whether there exists any empty file which is not yet assigned with the chit ID number. When it is found as a result of the check that no empty file is available, the corresponding information is sent to the slave cash register from the master cash register through the communication facility 17-7. Upon reception of the information about unavailability of the empty file, the key manipulation performed in the slave cash register for issuing the chit file is invalidated and a corresponding error message is displayed. In contrast, when the empty file is available in the memory of the master cash register, the associated chit ID number generating counter 18-1 is incremented by 1, and the content of this counter is set in the chit file ID number area 4-1 of the empty file as the chit ID number, which is also sent to the slave cash register issued the chit issue command from the master cash register through the communication facility (step 119-4). Upon reception of the chit ID number by the slave register, it is displayed on the associated display device 15-4 (step 119-6).

The processions activated in response to actuation of the store key and the recall key are carried out in a similar manner as in the case of the processing executed upon actuation of the chit issuing key. More specifically, in each of these processions, decision is made as to whether the master cash register ID number is identical with the own register ID number. If they are identical, processing is performed for the customer chit file stored in the own memory, and if otherwise, access is made to the customer chit file stored in the memory of the master cash register through the communication facility. In this manner, in the system which includes a plurality of electronic cash registers, the processings for issuance of the customer chit file, the provisional closing (store processing), recall processing, additional article registration and the sales totalization can be carried out.

Embodiment 5

The fifth embodiment of the invention is also directed to the cash register system of such a configuration as shown in FIG. 16 and differs from the fourth embodiment in that a function is additionally provided for inhibiting a chit file which is being called (undergoing the recall processing) by one cash register from being accessed by the other cash register.

Figure 20:
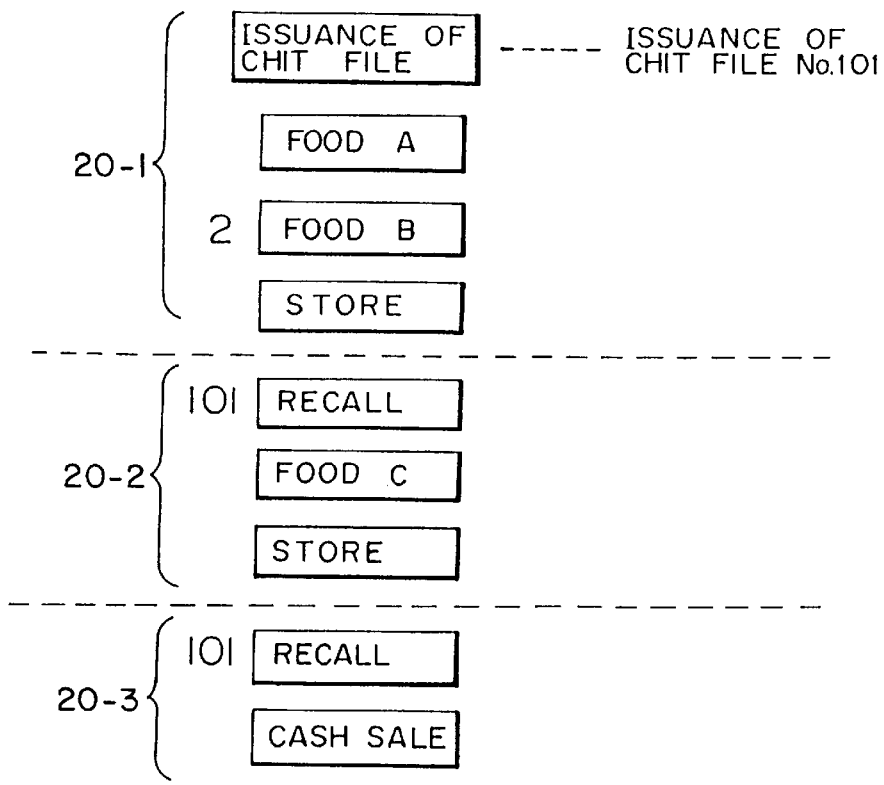
FIG. 20 is a diagram for illustrating exemplary key manipulations for issuance of chit file and registration processing according to a fifth embodiment of the present invention.

FIG. 20 is a diagram for illustrating exemplary key manipulations for the registration processing according to the fifth embodiment of the invention. Referring to the figure, a chit file #101 is created through the corresponding key manipulation in a step 20-1. In this case, it is assumed that one piece of "FOOD A" and two pieces of "FOOD B" are registered in the chit file. Subsequently, the chit file #101 is stored in the chit file area 2-5 in response to the corresponding key manipulation. In a step 20-2, the chit file #101 is recalled through a corresponding key manipulation and an article "FOOD C" is additionally registered. Subsequently, the article-added chit file #101 is stored in the chit file area 2-5 in response to actuation of the store key. Through the key manipulation in a step 20-3, the chit file #101 is recalled for settling the transaction by totalizing the sales recorded on this chit file #101.

Figures 21, 22:
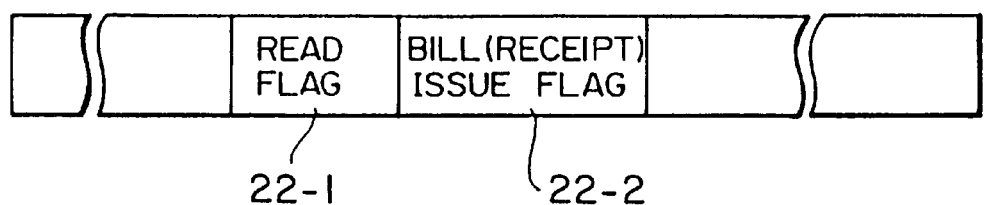
FIG. 21 is a diagram showing examples of display as generated upon issuance of a chit file and registration processing performed in the register according to the fifth embodiment.
FIG. 22 is a diagram showing structures of a read flag and a chit issue flag set in a control flag area (4-2) of a chit file in the register according to the fifth embodiment.

FIG. 21 shows an example of display generated on the display device 1-4 in response to a corresponding key manipulation in the step 20-1.

Further, FIG. 22 shows a read flag 22-1 provided in the control flag area 4-2 of the chit file shown in FIG. 4.

Figure 23:
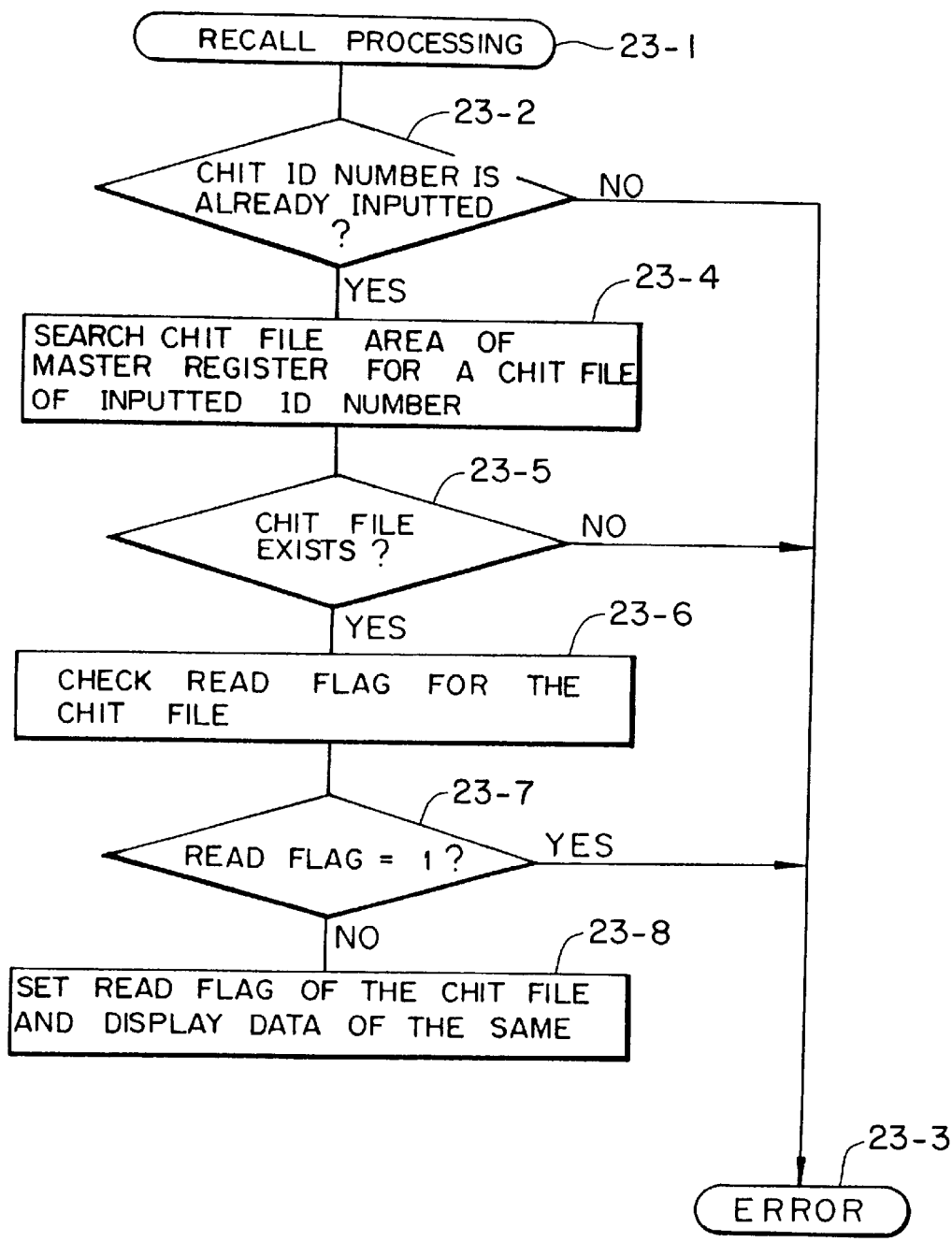
FIG. 23 is a flow chart for illustrating a recall processing performed in the register according to the fifth embodiment.

Now, description will be made of the role of the read flag 22-1 by referring to FIG. 23 which illustrates in a flow chart the recall processing (23-1), together with FIG. 24 which illustrates in a flow chart a store processing (step 24-1). The operation control unit is set to the registration mode by means of the mode select switch. In this mode, when the content of a customer chit file closed provisionally is read out (chit file recalling processing) without inputting the ID number thereof (step 23-2), the recall key manipulation is invalidated and a corresponding error messages (step 23-3) is displayed. On the other hand, when the recall key is pushed after a corresponding chit file II) number has been inputted or entered (step 23-2), the issued chit files (i.e., chit files being opened) in the chit file area 2-5 are checked to search a chit file assigned with the ID number which is same as the entered number (step 23-4). Unless the chit file having the same file ID number as that inputted is found (step 23-5), the recall key manipulation is invalidated with an error message being displayed (step 23-3). On the other hand, when the chit file ID number identical with the inputted one is found (step 23-5), the read flag 22-1 of the corresponding file is checked (step 23-6). When the read flag of concern is set (step 23-7), this means that the corresponding chit file is being recalled. Accordingly, the recall key manipulation is invalidated and a corresponding error message is displayed (step 23-3). Unless the read flag is set (step 23-7), data of the chit file of concern are read out or transferred to the work area 2-6 and at the same time displayed on the display device 1-4 (step 23-8). Through manipulation of the store key, the chit file being recalled in the work area is stored again in the original chit file resident in the chit file area 2-5 (step 24-2). At that time, the read flag 22-1 of the relevant customer chit file is reset (step 24-3).

Embodiment 6

This embodiment of the invention is concerned with a control function performed when a chit file once issued through the key manipulation described in conjunction with the first embodiment is to be cancelled.

FIG. 25 is a flow chart illustrating at cancel processing activated upon actuation of a corresponding key of the keyboard. It is assumed that a chit file #123 is created in which "FOOD A" and "FOOD B" are registered (step 25-1). When the cancel key is actuated (step 25-2), the chit file #123 once issued is cancelled with all the data registered in that file being erased.

FIG. 26 is a view showing an example of display generated on the display device upon actuation of the cancel key.

Figure 27:
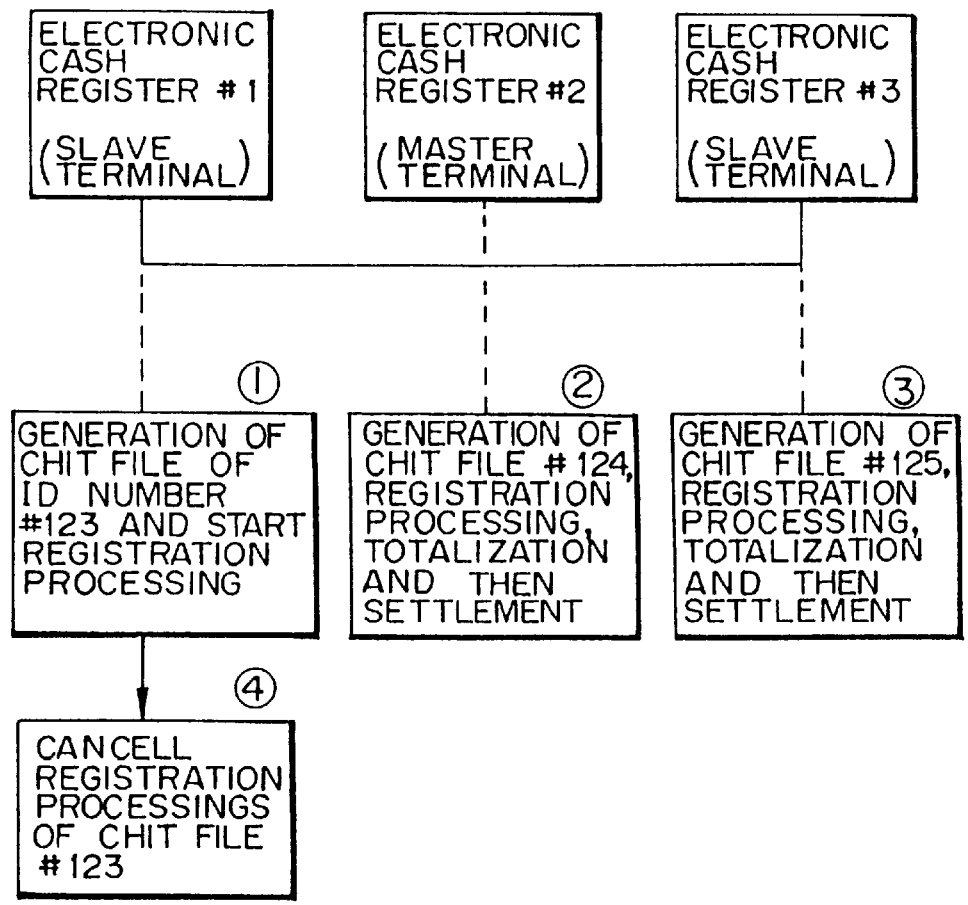
FIG. 27 is a flow chart for illustrating, by way of example, a chit file cancel processing in the cash register system including a plurality of electronic cash registers interconnected to one another according to the sixth embodiment.

FIG. 27 is a flow chart for illustrating, by way of example, a cancel processing in the register system including a plurality of electronic cash registers interconnected to one another. The contents show in FIG. 27 are as follows:

① In the electronic cash register #1, a file ID number 123 is inputted through manipulation of the chit issuing key of the keyboard and registration of the item(s) is started.

② In the electronic cash register #2, the file ID number 124 is issued by manipulating the chit issuing key with the item(s) being registered and then the settlement processing is executed.

③ In the electronic cash register #3, the file ID number 125 is issued by actuating the chit issuing key with the item(s) being registered and then the settlement processing is executed.

④ In the electronic cash register #1, data of the file ID number 123 is cancelled by manipulating the cancel key.

Figure 28:
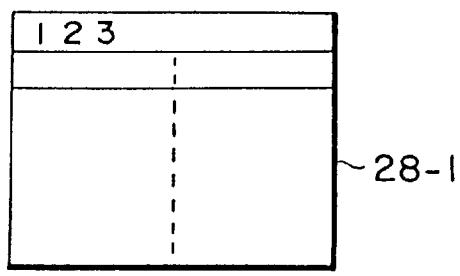
FIG. 28 is a diagram showing a structure of a cancelled-chit ID number file provided according to the sixth embodiment.

FIG. 28 is a diagram showing a structure of a cancelled chit ID number file provided in the memory of the master cash register. The chit ID number 123 cancelled through the cancel processing ④ is stored in the file shown in FIG. 27.

Figure 29:
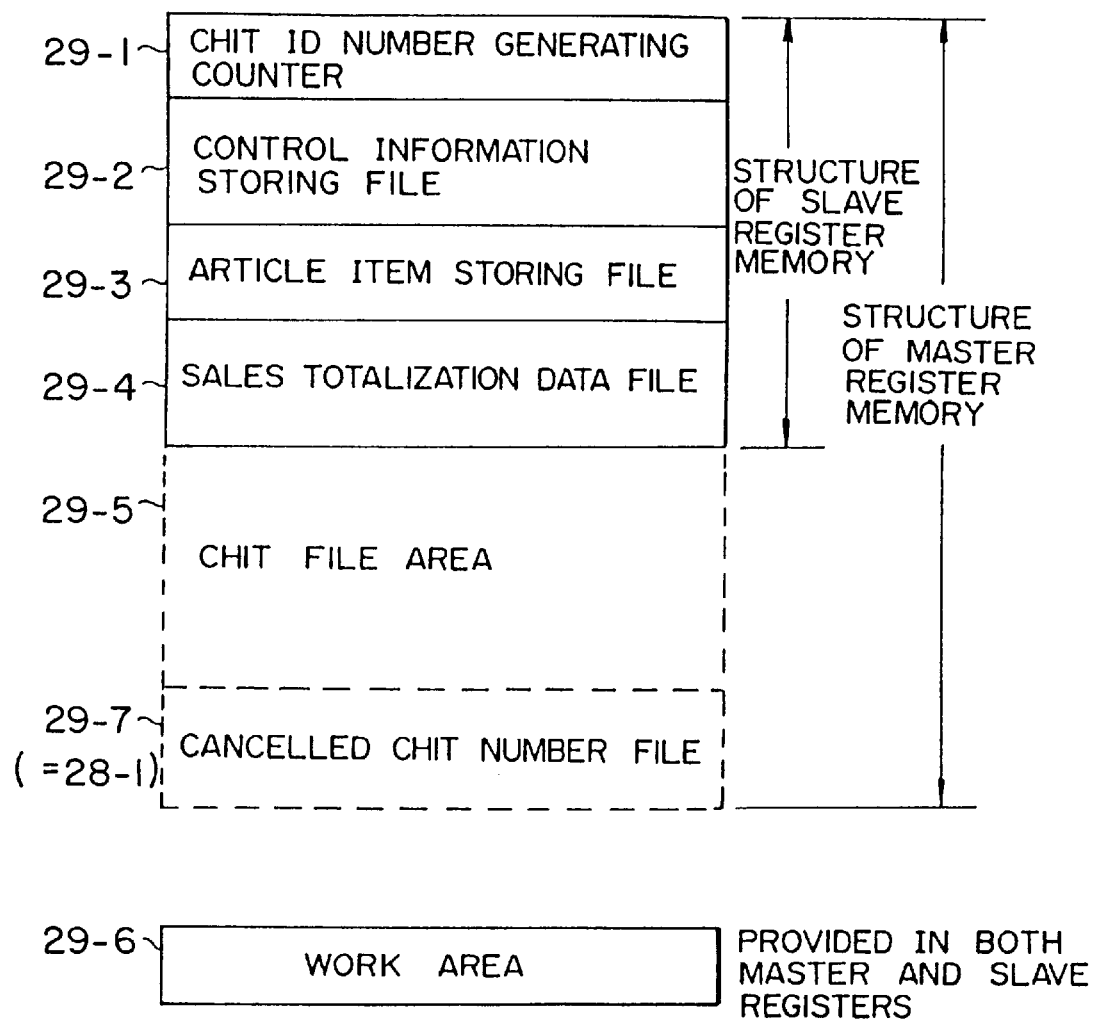
FIG. 29 is a diagram showing memory structures of slave and master registers in the system according to the sixth embodiment.
Figure 30:
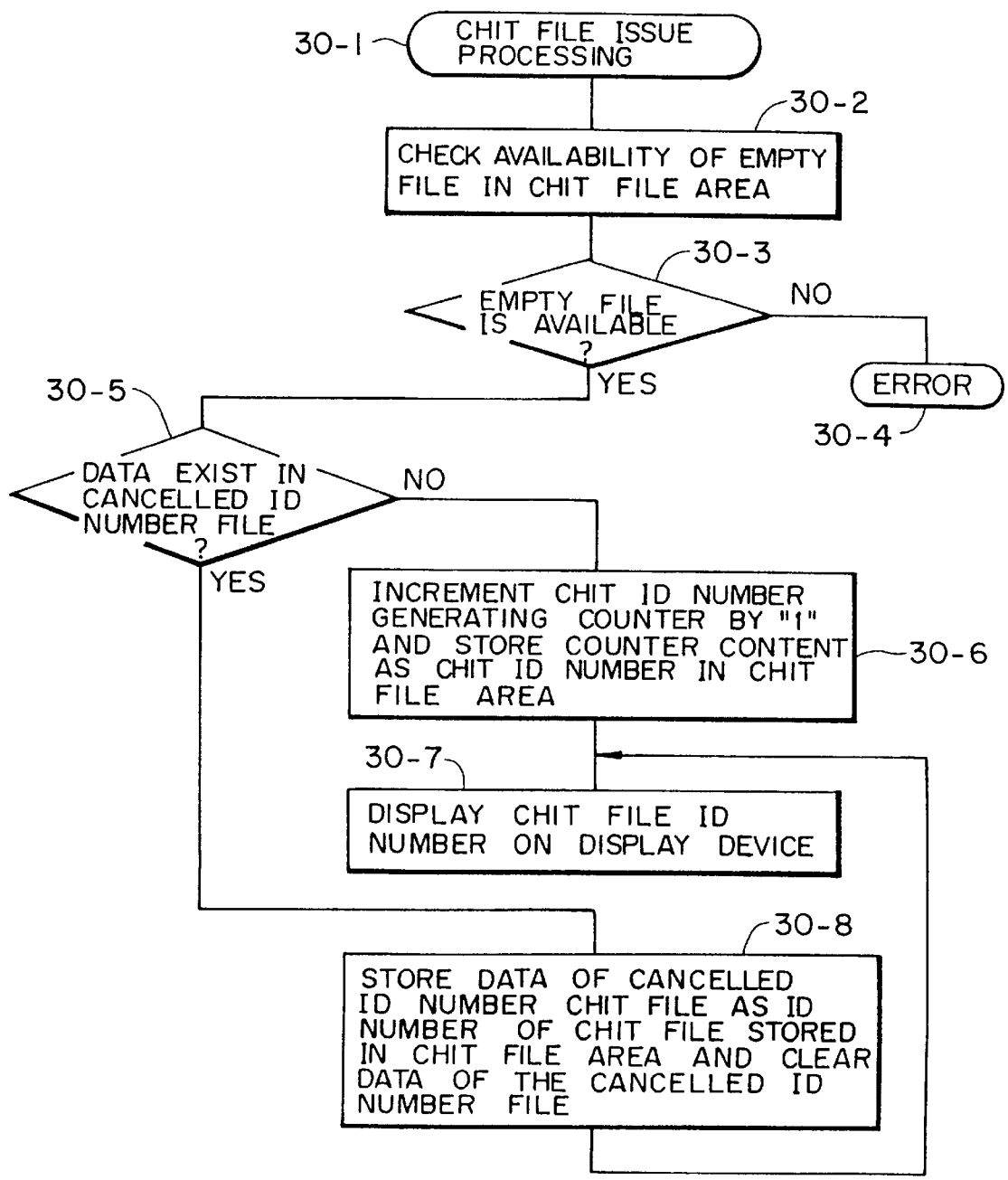
FIG. 30 is a flow chart illustrating a processing for issuing a chit file by using a cancelled-chit ID number file according to the sixth embodiment.

FIG. 30 is a flow chart for illustrating a chit issuing processing (30-1). By actuating the chit issuing key of the keyboard 1—1, the chit files stored in the chit file area 29-5 (FIG. 29) are checked to determine if there exists any empty file which is not allotted with the chit ID number (step 30-2). Unless an empty file exists (step 30-3), the manipulation of the chit issuing key is invalidated with an error message being displayed (step 30-4). On the other hand, when the empty file exists (step 30-3), it is then checked whether or not a chit ID number is stored in the cancelled chit ID number file shown in FIG. 28 (step 30-5). If the chit file ID number is found in this file, the ID number is stored in the chit ID number area 4-1 of the empty file as the chit file ID number thereof, and at the same time cleared from the cancelled chit ID number file 28-1 shown in FIG. 28 (step 30-8). Further, this chit ID number is displayed on the display device 1-4. When no file ID number exists in the cancelled chit ID number file 28-1 shown in FIG. 28, the chit ID number generating counter 2-1 is incremented by "1", and the content of this counter is stored in the chit ID number area 4-1 for the empty file mentioned above (step 30-7), and at the same time displayed on the display device 1-4 (step 30-8).

Figures 31, 32:
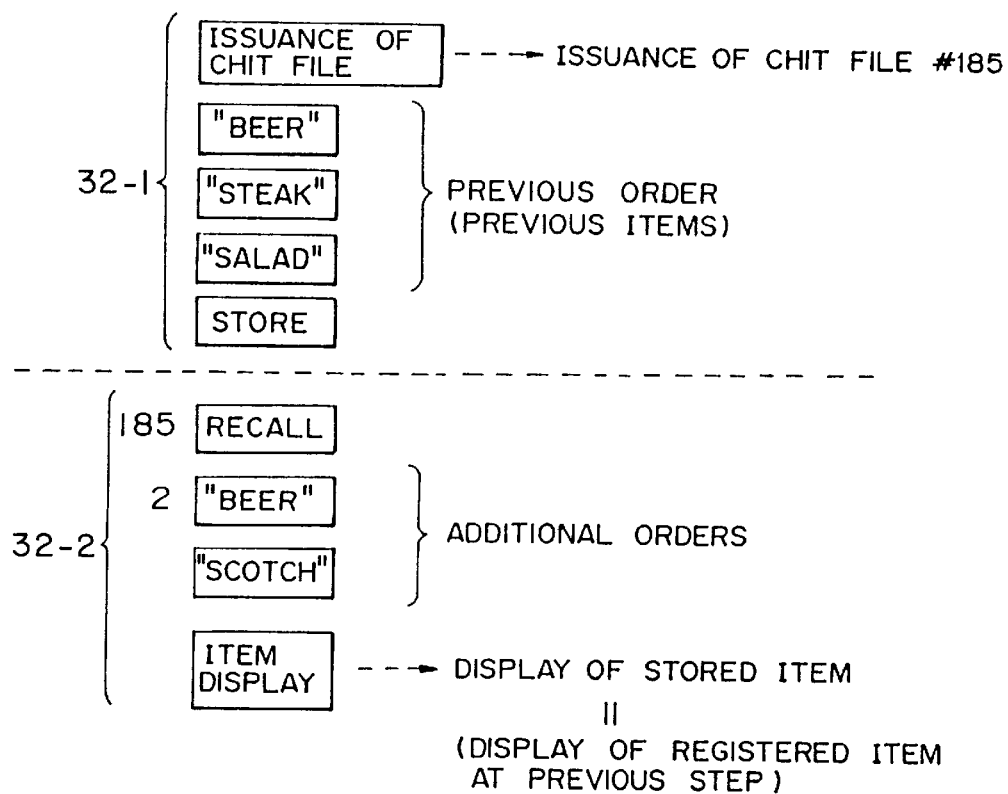
FIG. 31 is a view showing an example of an inspection report printed out by the register according to the sixth embodiment.
FIG. 32 is a diagram for illustrating exemplary key manipulations for displaying registered article items in an electronic cash register according to a seventh embodiment of the invention.

FIG. 31 is a view showing an example of an inspection report printed out for confirming the chit data stored in the chit file area 29-5 (FIG. 29). In FIG. 31, a reference numeral 31-1 designates chit data, and 31-2 designates a chit ID number stored in the cancelled chit ID number file 28-1 shown in FIG. 18.

Through the procedure described above, the chit ID number for the chit whose issuance is cancelled by manipulating the cancel key can be used with priority by the automatic file ID number allotting facility including the ID number generating counter, to thereby diminish such case in which the file ID number as cancelled drops out from the sequence of the serial chit ID numbers, while the chit ID number stored in the cancelled chit ID number file is printed out on the chit file inspection report for confirming the chit ID number unused.

Embodiment 7

The seventh embodiment of the invention is concerned with an electronic cash register which is imparted with a function for displaying the items stored in the provisionally closed chit file distinctively or separately from the items which are currently registered by using a different display area or a distinction mark upon actuation of the recall key.

FIG. 32 is a diagram for illustrating exemplary key manipulations in the registration processing in the electronic cash register according to the instant embodiment of the invention. Through the key manipulation in a step 32-1, a chit file #185 is generated, whereon items "BEER", "STEAK" and "SALAD" are registered in this chit file. Subsequently, by actuating the store key, the chit file #185 is stored in the chit file area 2-5. Next, in a step 32-2, the chit file #185 is recalled in response to actuation of the recall key, whereon two "BEER" and one "SCOTCH" are additionally registered. FIG. 33 is a view showing the state of display on the screen of the display device 1-4 when the additional items "BEER" and "SCOTCH" have been registered after the provisional closing of the chit file. In this figure, a symbol #185 denotes the chit file ID number, and "P/B 1850" indicates that the previous balance is "1850". Further, "2 BEER" and "1 SCOTCH" indicate the items additionally registered after the recall, while "TAX" and "TOTAL" indicate, respectively, the amount of the tax and the total amount of sales for the whole chit #185 inclusive of the previous balance (i.e., total sum of the amounts of the items plus tax) at the current time point. When the item display key is manipulated in this state (in the step 29-2), the items registered (provisionally closed) in the preceding step 32-1 are read out from a registered item data area 4-5 of the relevant chit file and displayed in a left half display area together with a message "PREVIOUS ITEM", as shown in FIG. 34. The display of the items registered previously (provisionally closed) is cleared upon registration of new items or upon sales totalization processing or upon transition to a succeeding processing. Another method of clearing the display of the previously registered (provisionally closed) items may be effectuated by repeated actuation of the item display key.

In the above description, it has been assumed that the previously registered (or provisionally closed) items are displayed distinctively from those being additionally registered currently by using the different display areas. However, such distinction may be realized by affixing appropriate distinction mark (e.g., "*") to the previously registered (provisionally closed) items.

Embodiment 8

The eighth embodiment of the invention is directed to the handling by a server or a person in charge of managing the customer chit files.

FIG. 11 shows a structure of a chit file control information storing area secured in the control information storing file 2—2, wherein an address #212 designates a location where a server input enforcing function flag is set, while an address #213 designates a location where a server comparison function flag is set. The data loading to the areas (11-3) and (11-4) is performed through the same procedure as described hereinbefore in conjunction with the second embodiment by reference to the flow chart of FIG. 11.

Figure 35:
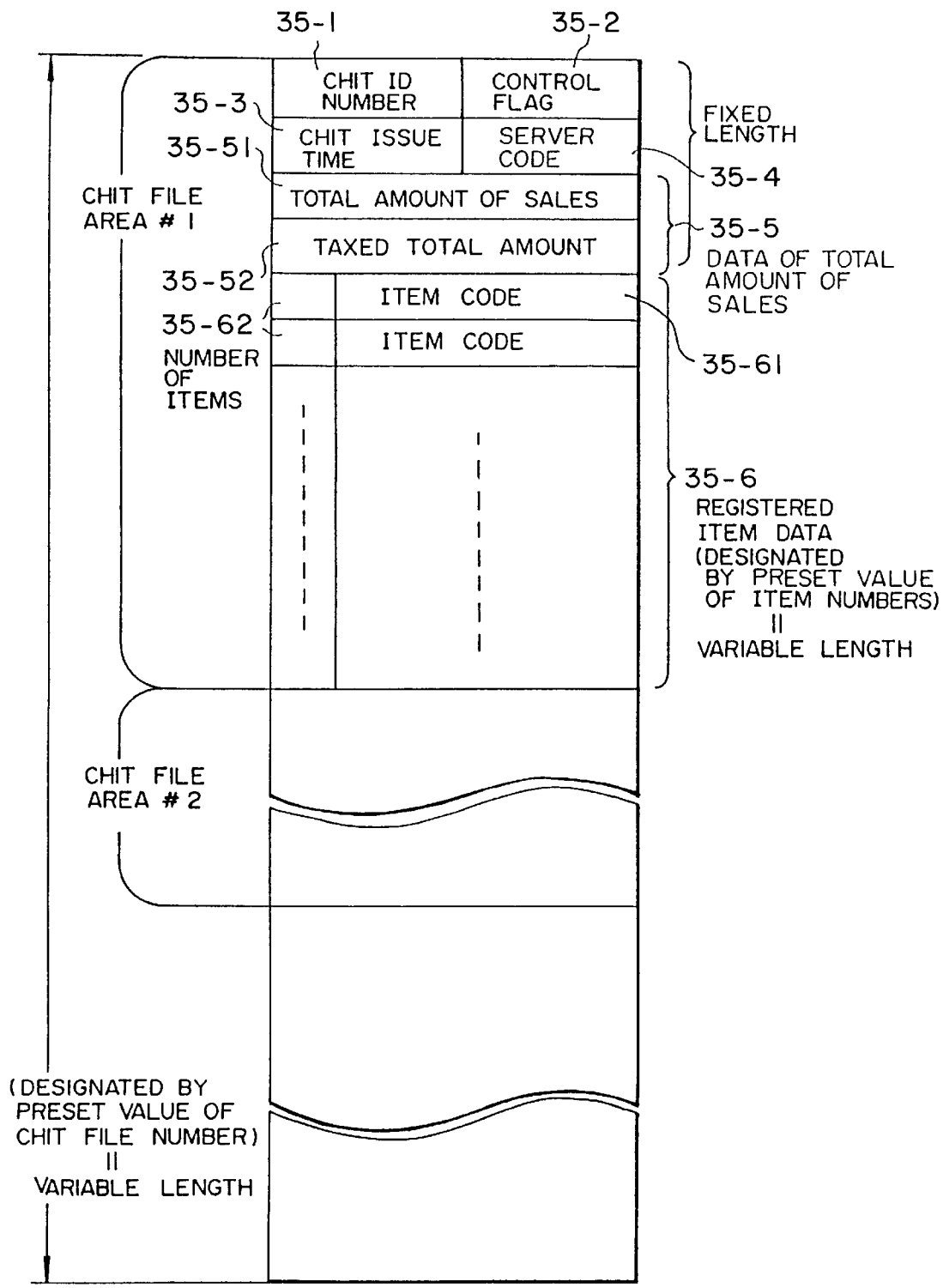
FIG. 35 is a diagram showing an arrangement of chit file areas according to an eighth embodiment of the present invention.
Figure 36:
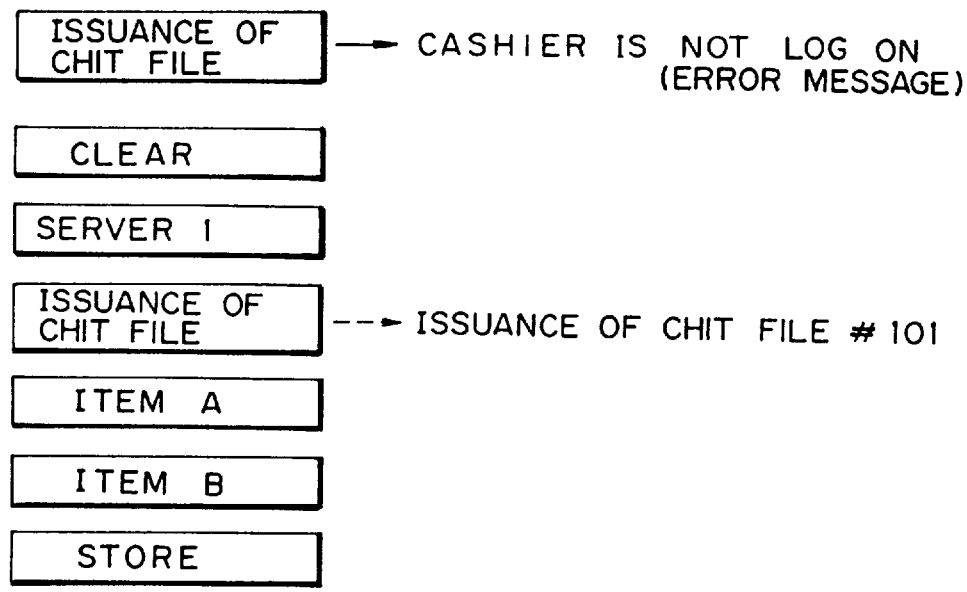
FIG. 36 is a view illustrating examples of input key manipulation performed by a server in charge in the cash register according to the eighth embodiment.

FIG. 35 is a diagram showing a structure of the chit file area 2-5. A server code storage area 35-4 is provided for each of the individual chit files.

Figure 37:
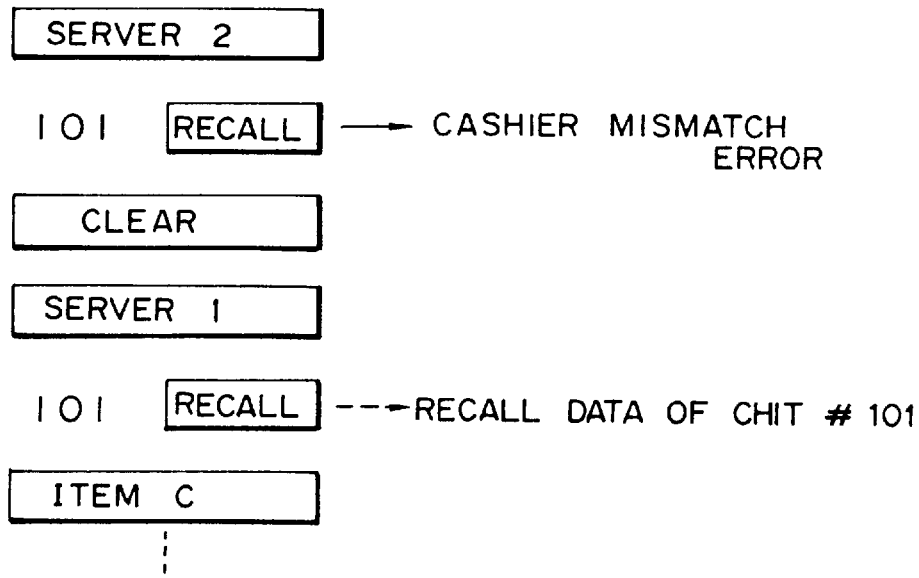
FIG. 37 is a view illustrating examples of key manipulation for inputting a server key, generation of a chit file and a recall processing according to the eighth embodiment.

Now, description will be directed to the chit issuing processing in the registration mode of the electronic cash register according to the instant embodiment. FIG. 37 shows, by way of example, key manipulations for inputting a server key, generation of the chit file and the recall processing. When the server input enforcing function flag (11-3) is set, the chit file generating key is validated for generating the chit file #101 only when the server code is inputted. Unless the server code is inputted, the chit file generating key is invalidated and at the same time an error message which may read "CASHIER IS NOT LOGGED ON" is displayed. Through the store processing, the registered item data and the server code are stored in the relevant chit file of the chit file area 2-5. When it is found that the server input enforcing function flag (11-3) and the server comparison function flag (11-4) are set, the recall key is rendered valid only when the server code is inputted. When the recall key is operated, a server code 1 (i.e., the code of the server in charge at the time of the provisional file closing) stored previously in the chit file #101 is compared with a code of the server or person who actuated the recall key. When the comparison shows discrepancy, the recall key operation is invalidated and an error message "CASHIER MISMATCH ERROR" is displayed. On the other hand, when the above comparison results in coincidence, the relevant provisionally closed chit file #101 is recalled to the work area, and the content thereof is displayed on the display device 1-4.

Figure 38:
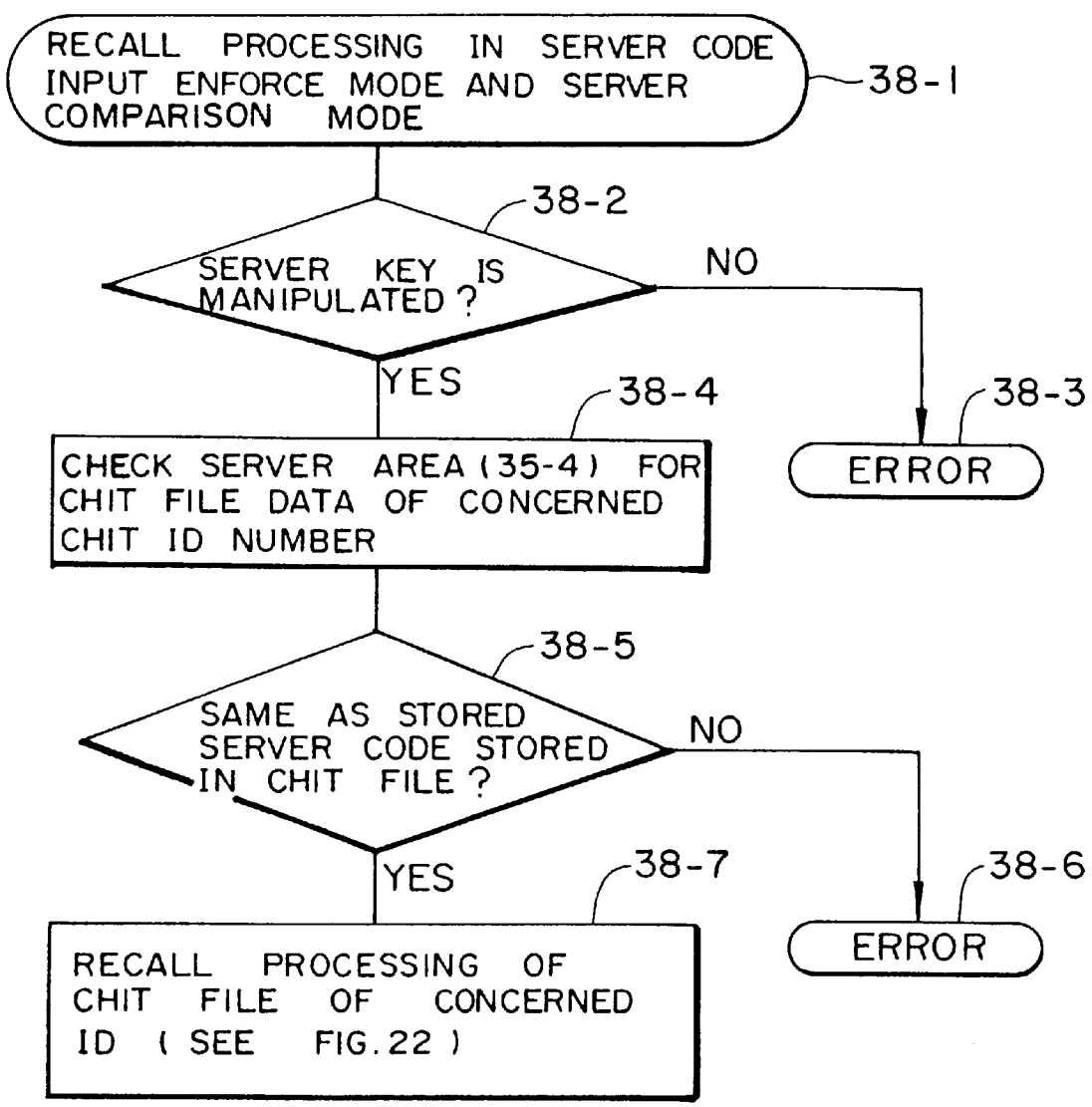
FIG. 38 is a flow chart illustrating a chit file recall processing according to the eighth embodiment.

FIG. 38 is a flow chart illustrating the processing actuation of the recall key.

Embodiment 9

The ninth embodiment of the invention is directed to an electronic cash register imparted with a function for outputting a report concerning transfer of the sales data upon shifting of persons or servers in charge of managing the customer chit files.

FIG. 11 shows a structure of the chit: file control information setting area provided in the control information storing file 2—2, wherein an address #214 designates a location where a flag indicating permission of shift between the persons or servers in change is set. The data loading processing for this area (11-5) is the same as in the case of the second embodiment (see the flow chart of FIG. 12).

Figure 41:
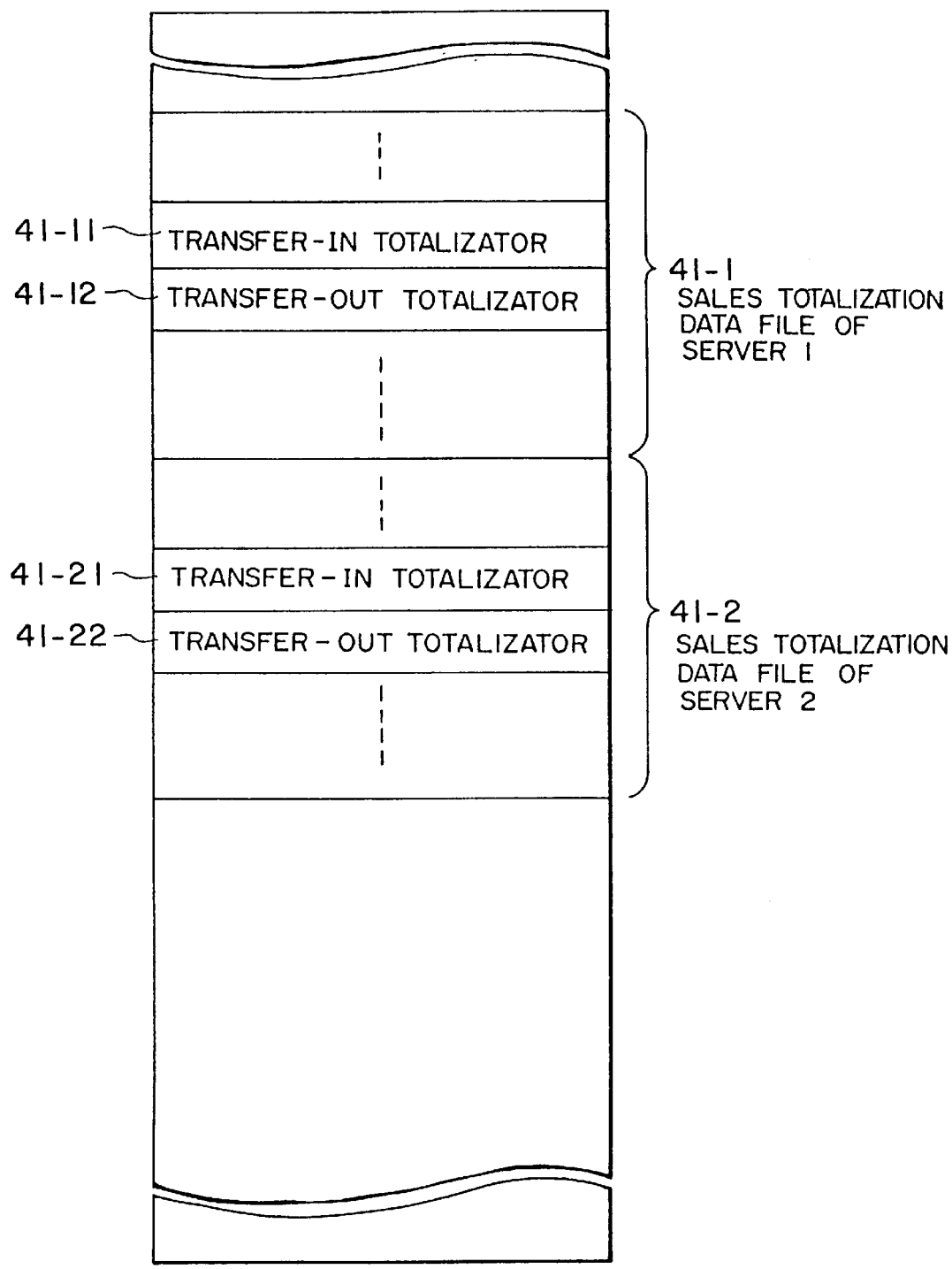
FIG. 41 is a view showing a structure of a sales totalization data file employed in the cash register according to the ninth embodiment.

FIG. 41 shows a structure of a sales totalization data file 2-4. As can be seen in the figure, this file 2-4 is divided into a server-1 sales totalization file (41-1), a server-2 sales totalization file (41-2) and so forth so that the registered data can be totalized on a server-by-server basis. Further, each of the server-based totalization files is provided with "transfer-out totalize" (41-12, 41-22) for totalizing the data when the sales data are transferred to another server upon shifting and "transfer-in totalizator" (41-11, 41-21) for totalizing the data when received from the server leaving the work.

Figure 39:
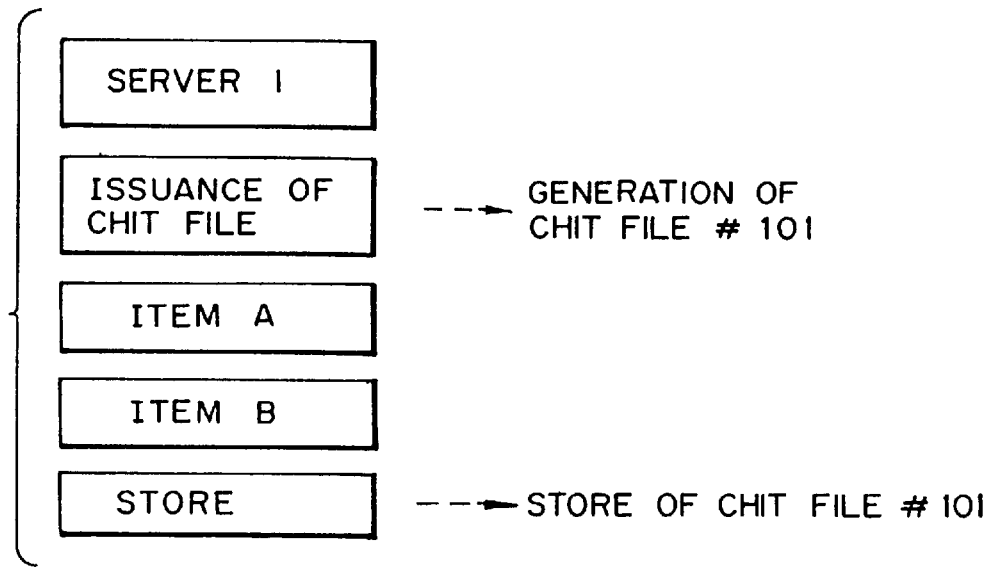
FIG. 39 is a view showing examples of key manipulation for registering additional customer orders in the cash register according to a ninth embodiment of the present invention.
Figure 40:
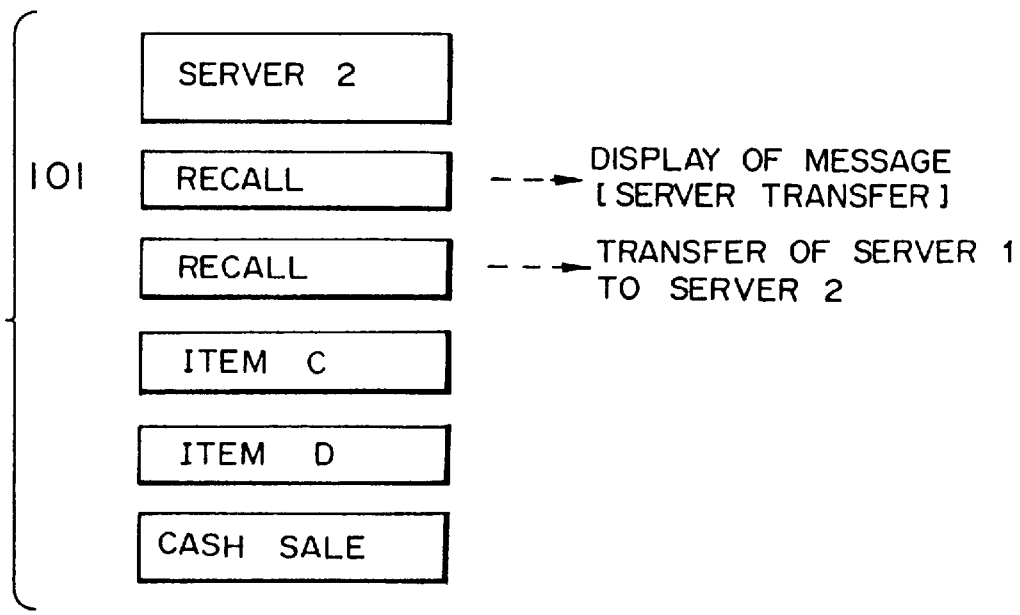
FIG. 40 is a view showing examples of key manipulation upon shift of servers in conjunction with registration of additional orders in the cash register according to the ninth embodiment.

Next, processing executed when the server shift key is actuated will be described in conjunction with operation involved in the registration of additional customer orders in the electronic cash register by reference to FIGS. 39 and 40. Referring to FIG. 39, when the server input enforcing function flag (11-3) is set, the chit file issuing key is validated for issuing the chit file only when the server in charge has been inputted. It is now assumed that "ITEM A" and "ITEM B" are registered. In this case, the registered item data and the code of the server in charge are stored in the relevant area 2-5 through the store processing described hereinbefore. Referring to FIG. 40, when the server input enforcing function flag (11-3) and the server shift enable flag (11-5) are set, the recall key is validated only when the server is inputted. Further, when the recall key is manipulated, the server-1 code (indicating the server in charge when the chit file was provisionally closed) stored in the chit file #101 is compared with the server-2 code indicating the server who has just manipulated the recall key. When the comparison shows coincidence between both codes, the relevant chit file #101 closed provisionally is recalled and the content thereof is displayed on the display device 1-4. In case the above comparison results in discrepancy, a message "SERVER TRANSFER" is displayed in response to actuation of the recall key. When the recall key is actuated again, the relevant chit file #101 closed provisionally is recalled and the content thereof is displayed on the display device 1-4. Additionally, the server registered in the above-mentioned chit file #101 is changed to the server inputted when the recall key was actuated, while the balance registered in the server-based totalization file of the preceding server #1 at the time of provisional closing thereof is loaded in the transfer-out totalizator and at the same time in the transfer-in totalizator for the file of the succeeding server #2 (new server).

Figure 42:
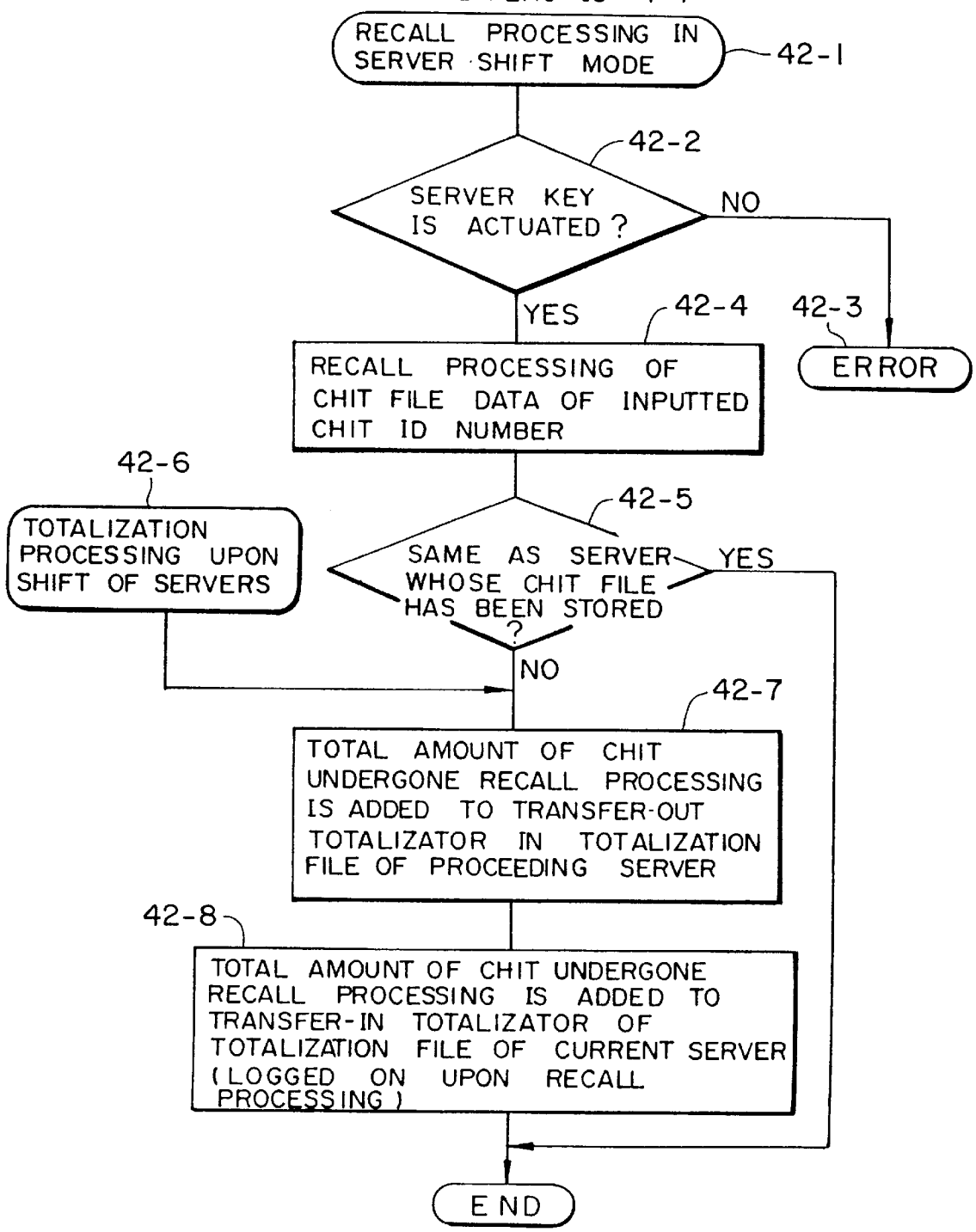
FIG. 42 is a flow chart illustrating shift or transfer of servers in conjunction with a recall processing according to the ninth embodiment.
Figures 43, 44:
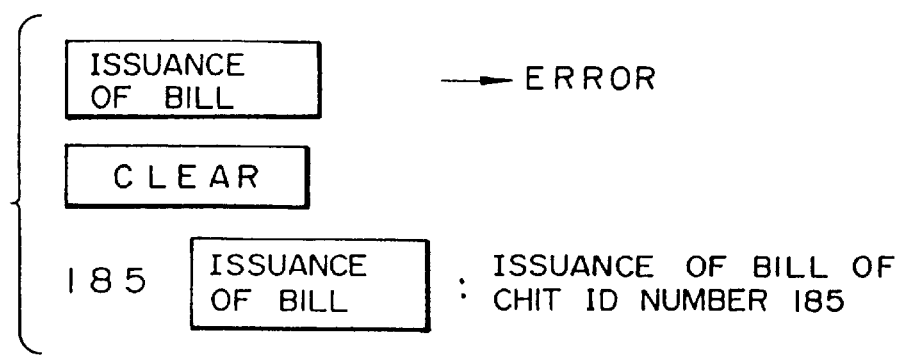
FIG. 43 is a view showing an example of server-based inspection report as printed out by the cash register according to the ninth embodiment.
FIG. 44 is a view showing an example of key manipulation for issuing a bill chit according to a tenth embodiment of the present invention.

FIG. 42 is a flow chart illustrating the shift or transfer of the servers in conjunction with the recall processing, and FIG. 43 shows an example of an adjustment as printed out. As can be seen in FIG. 43, the data of the transfer-in totalizator and the transfer-cut totalizator are printed on a server-by-server basis, from which the information of the balance as transferred in accompanying the shift of the servers can be confirmed.

Embodiment 10

The tenth embodiment of the invention is directed to an electronic cash register imparted with a function for generating or issuing a bill chit (which may also be referred to as a receipt) on the basis of a customer chit file.

FIG. 22 is a diagram showing a bill chit issue flag 22-2 provided in the control flag area 4-2 of a chit file (FIG. 4).

Figures 46, 47:
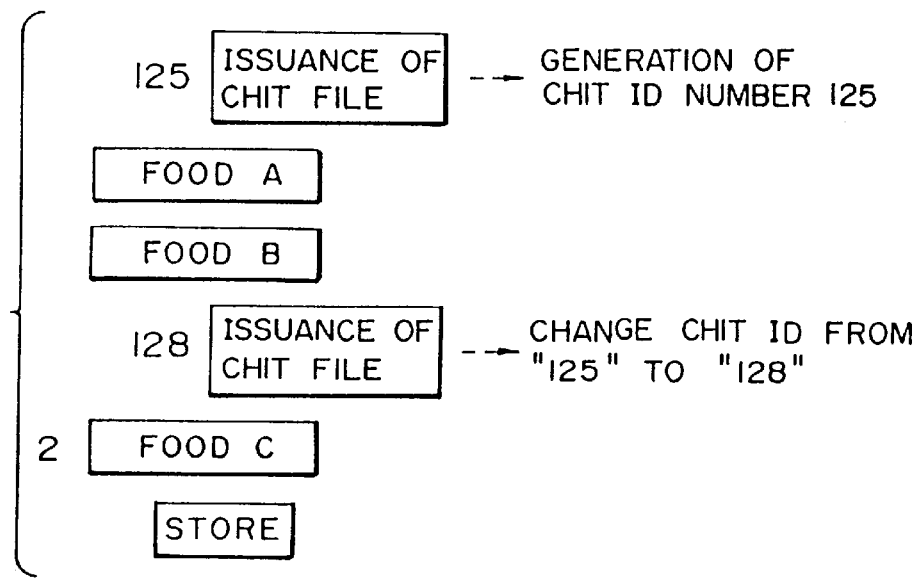
FIG. 46 is a view showing an example of a printed chit according to the tenth embodiment.
FIG. 47 is a view showing an example of key manipulation for changing file ID number of a chit file according to an eleventh embodiment of the present invention.

FIG. 46 shows an example of the bill chit as printed out. In the figure, reference numeral 46-1 denotes a message area where name of a restaurant and the like information are printed, 46-2 denotes area where names, numbers or quantities and unit prices of items, tax, total amount inclusive of the tax and the date are printed, and 46-3 denotes a message print area.

Figure 45:
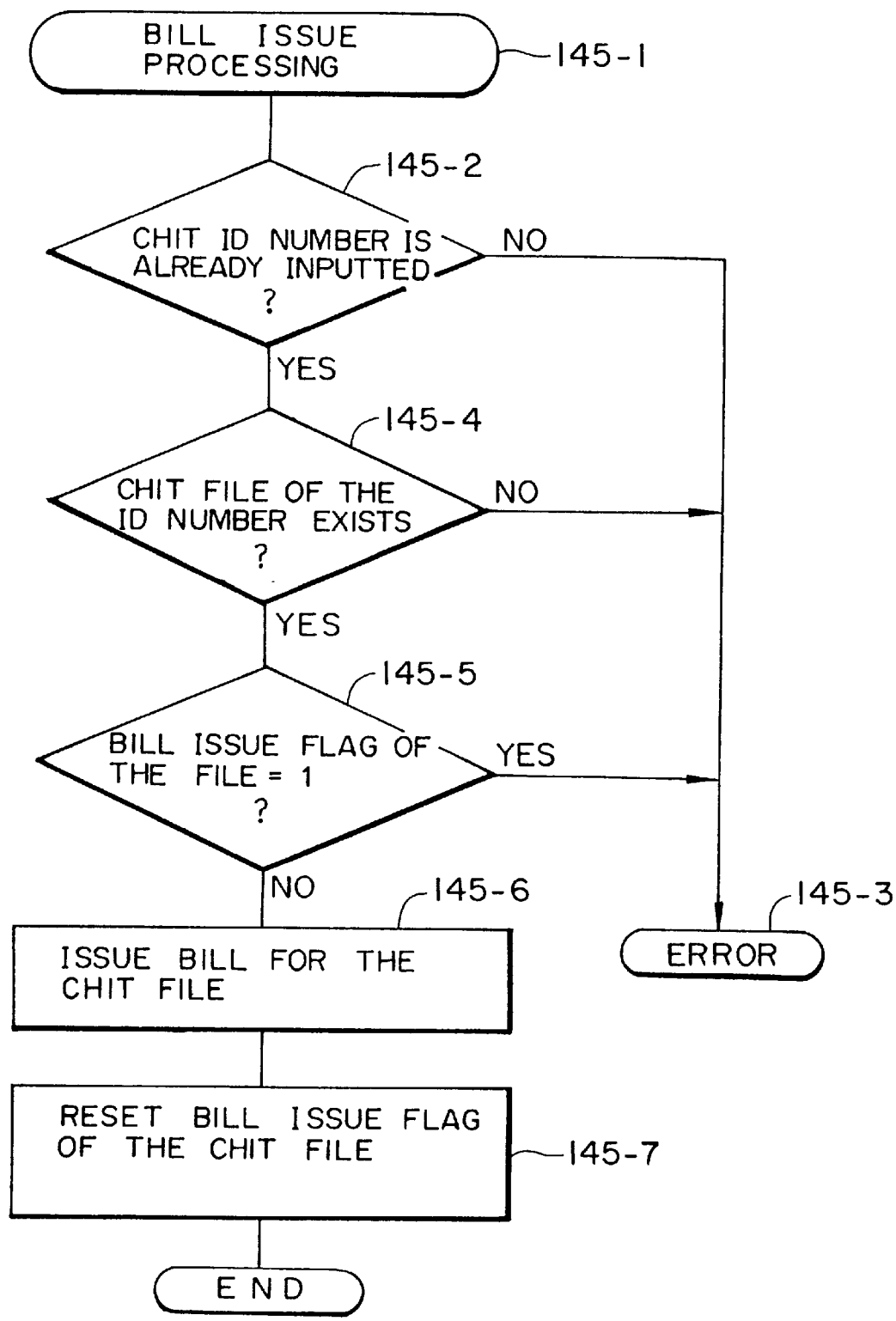
FIG. 45 is a flow chart for illustrating a bill chit issuing processing according to the tenth embodiment.

Next, description will be made of the function of the bill chit issue flag 22-2 when a key for issuing a bill chit is actuated by referring to FIG. 44 and FIG. 45 which shows a flow chart for illustrating a bill chit issuing processing (145-1). The operation control unit is set to the registration mode by means of the mode select switch. Then, the bill chit issuing key is actuated. When this key is actuated without inputting the chit file ID number (step 145-2), the key operation is invalidated and an error message is displayed (step 145-3). Accordingly, after having inputted the chit file ID number (step 145-2), the bill chit issuing key is manipulated. Then, the operation control unit searches the issued chit files stored in the chit file area 2-5 for the file allotted with the same ID number as the inputted one (step 145-4). If the chit file of concern is absent, the bill chit issuing key manipulation is invalidated with a corresponding error message being displayed (step 145-3). If the same file ID number as the input one is found, the bill chit issue flag 22-2 of the relevant file is checked (step 145-5). When the flag 22-2 is set, this means that bill chit has already been issued for the chit file of concern. Accordingly, the bill chit issuing key operation is invalidated and a corresponding error message is displayed on the display device (step 145-3). Unless the bill chit issue flag 22-2 is set, the data of the chit file of concern is outputted to the printer. Thus, the bill chit or receipt as demanded is issued (step 145-6).

Embodiment 11

This embodiment of the invention is directed to an electronic cash register which is imparted with a function for altering or changing an ID number of an issued customer chit file to another ID number.

FIG. 11 shows a structure of the chit file control information storing area provided in the control information storing file 2—2, wherein an address #215 designates a location at which a chit ID number alteration enable flag is set. The data loading in this area (11-6) is performed through the procedure described hereinbefore in conjunction with the second embodiment by reference to the flow chart of FIG. 12.

Figure 48:
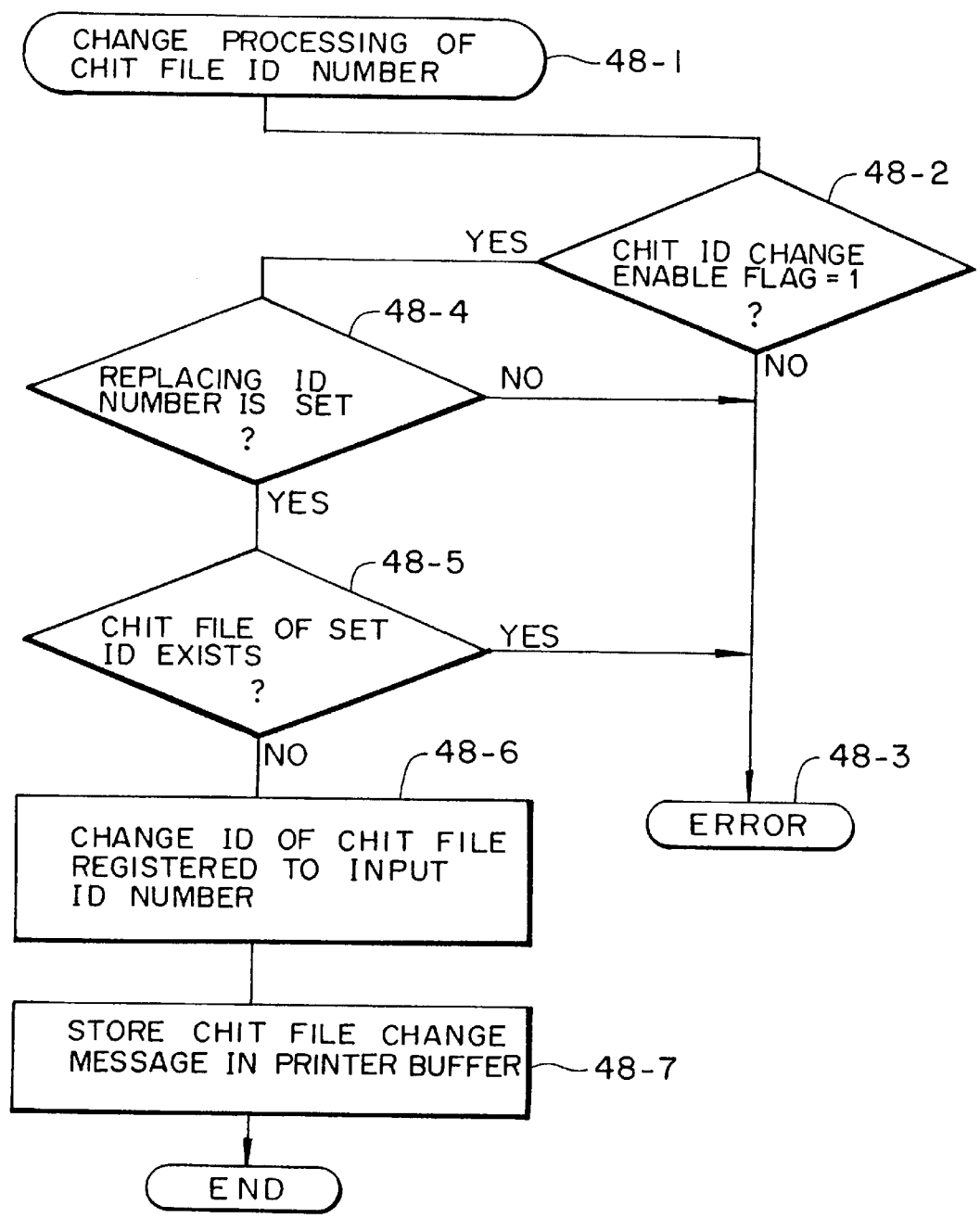
FIG. 48 is a flow chart for illustrating a chit ID number change processing according to the eleventh embodiment.
Figures 49, 50:
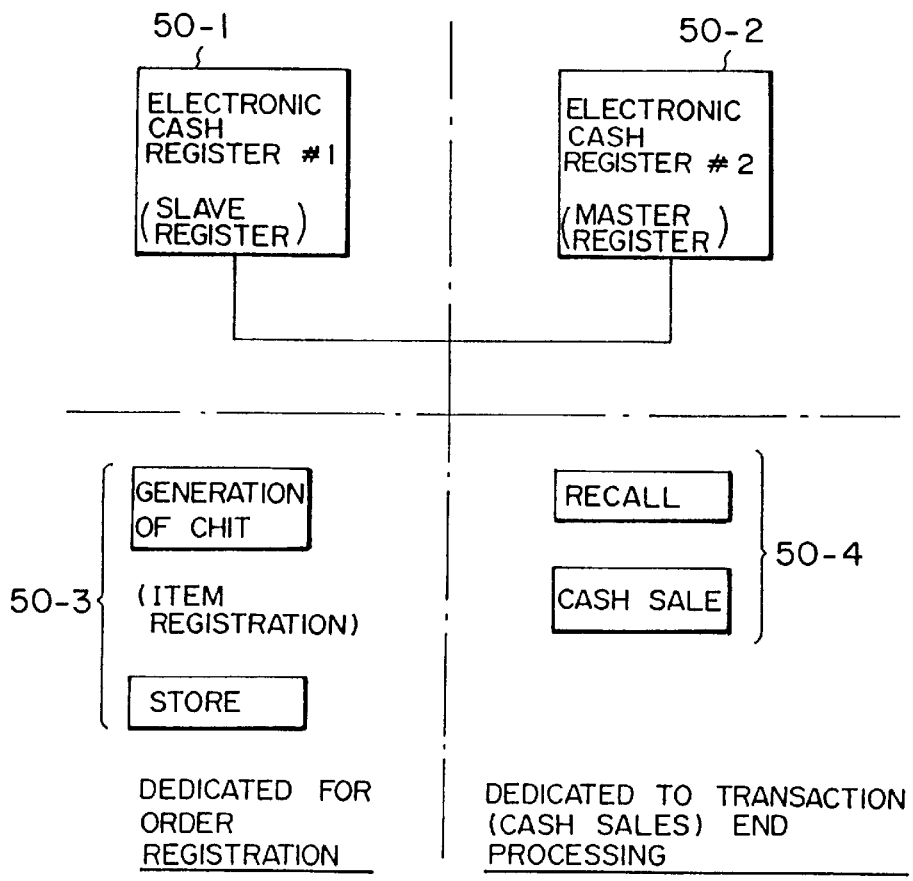
FIG. 49 is a view showing an example of bill chit or receipt generated through a chit file ID number change processing according to the eleventh embodiment.
FIG. 50 is a block diagram showing a cash register system which includes an order registration dedicated register and a transaction settlement dedicated register according to a twelfth embodiment of the present invention.

FIGS. 47 and 48 illustrate, by way of example, key manipulation for changing or altering the file ID number (48-1 of FIG. 48) of a chit undergoing the registration processing to a number as inputted, in the case where the address #211 (11-2) of the chit file control information storing area is set to the manual mode. At first, a chit ID number 125 is inputted. Subsequently, the chit file issuing key is actuated. Then, the chit file #125 is issued through the processing described previously in conjunction with the third embodiment. After registering items "FOOD A" and "FOOD B", a number "128" is inputted. Subsequently, the chit file issuing key is operated. In response thereto, the operation control unit checks the chit ID number alteration enable flag (11-6) (step 48-2 of FIG. 48). Unless this flag is set, the operation of the chit file issuing key is invalidated with a corresponding error message being displayed (step 48-3 of FIG. 48). On the other hand, when the chit ID number alteration enable flag (11-6) is set (step 48-2), the operation control unit checks all the issued chit files (i.e., all the chit files being opened) as to whether there has been issued the file of the ID number identical with the input number (step 48-4). When the file of the same ID number exists (step 48-5), alteration or change of the chit ID number to the input number is inhibited while displaying a corresponding error message (step 48-3). Unless the issued file which is allotted with the ID number same as the inputted one is found (step 48-5), then the processing for altering the file ID number #125 of the chit undergoing the registration processing to the inputted ID number #128 is executed (step 48-6). To this end, the inputted ID number #128 is stored in the relevant chit ID number area 4-1 (step 48-7). Additionally, the chit file ID number is displayed on the display device. Further, a chit file ID number change message "TRANSFER FROM #125" is stored in a buffer memory incorporated in the printer device 1-6 so that a bill chit shown in FIG. 49 is printed out by the printer 1-6 in response to actuation of the store key upon completion of the chit file ID number alteration or change processing.

FIG. 48 shows in a flow chart the chit ID number alteration processing described above.

Embodiment 12

The twelfth embodiment of the invention is concerned with an electronic cash register which is imparted with a function for selecting automatically a chit file allotted with the smallest ID number from those being issued at the time point at which the contents of a customer chit file is to be recalled, whereon the content of the chit file of the smallest ID number is displayed.

FIG. 11 shows a structure of the chit file control information storing area secured in the control information storing file 2—2, wherein an address #216 designates a location at which an automatic recall-key calling mode flag is set. The data loading in this area (11-7) is carried out through the same processing as described previously in conjunction with the second embodiment and shown in the flow chart of FIG. 12.

Figure 51:
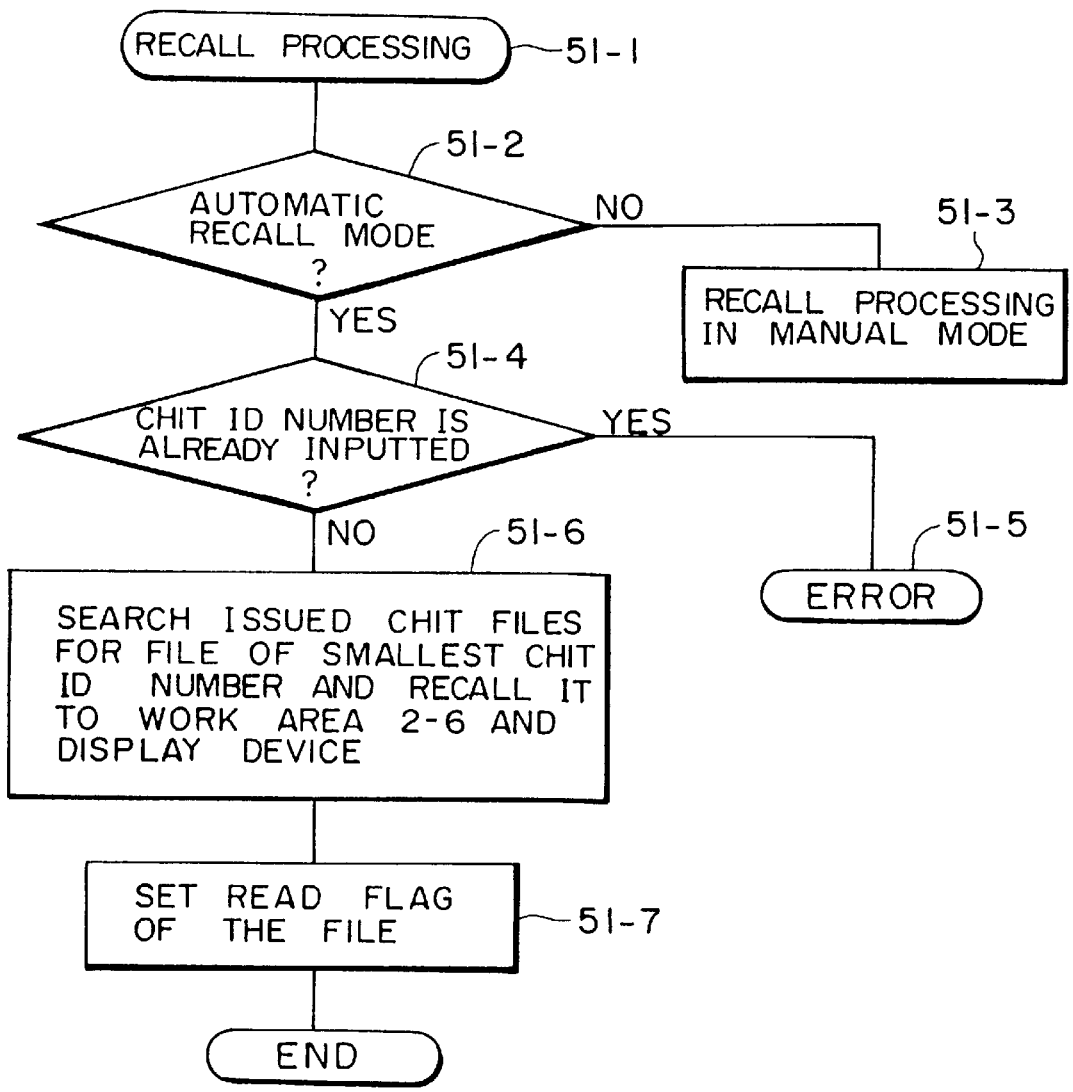
FIG. 51 is a flow chart for illustrating a recall processing in an automatic recall mode according to the twelfth embodiment.

FIG. 51 illustrates in a flow chart a recall processing (51-1) according to the instant embodiment. Referring to the figure, the operation control unit responds to operation of the recall key to decide whether or not the automatic recall-key calling mode flag (11-7) is set (step 51-2). Unless this flag is set, the operation described hereinbefore in conjunction with the fifth embodiment is triggered because the recall processing is effected in the manual mode (step 51-3). When the automatic recall-key calling mode flag is set (step 51-2), it is then checked whether or not the chit ID number has already been inputted (step 51-4). If so, the manipulation of the recall key is invalidated while displaying a corresponding error message (step 51-5). If otherwise, all the chit files being issued and stored in the chit file area 2-5 are searched for finding out the chit file to which no read flag 22-1 is set and which is allotted with the smallest ID number (step 51-6). Subsequently, the read flag 22-1 for the chit file as found is set (step 51-7), whereon the chit data thereof are transferred to the work area 2-6 and at the same time displayed on the display device 1-4.

FIG. 50 is a block diagram showing a crash register system to which the instant embodiment is applied and in which a plurality of electronic cash registers are interconnected via a communication system 1-7. In the figure, two cash registers interconnected are shown only for the illustrative purpose. Referring to FIG. 50, a slave register #1 is destined to serve as an order registering machine and is in charge of executing the processing for issuance of chits, item registration and storing in succession, whereby the chit files are stored in the chit file area 2-5 of the master register #2 which is destined to serve as a machine for executing the totalization/settlement processing. More specifically, the master register #2 executes in succession the automatic recall chit processings shown at 50-4 and closes the individual chit files in the sequence in which they were issued by the slave register #1. The system shown in FIG. 50 is advantageously suited for a shop where the totalization/settlement processings are performed in the order in which the customer orders have been accepted. As one example of such shops, there may be mentioned a so-called drive-through shop.

Embodiment 13

Figure 53:
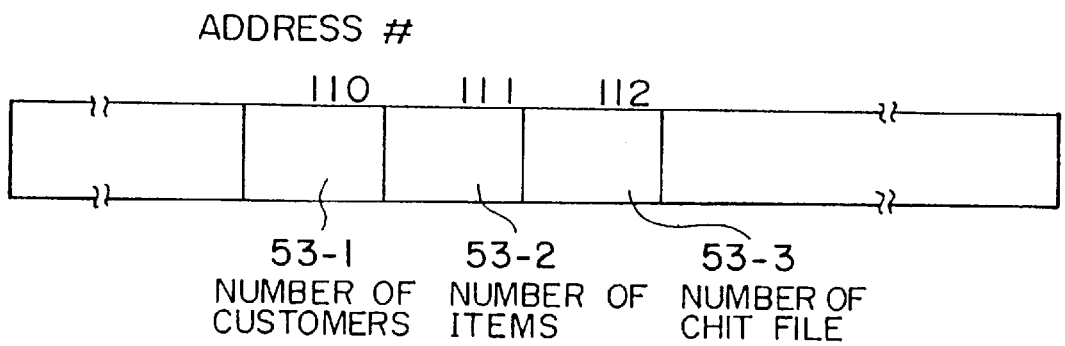
FIG. 53 is a diagram showing a configuration of a chit file constituent factor storing area used in the cash register according to the thirteenth embodiment.

The thirteenth embodiment of the invention is directed to an electronic cash register which is imparted with a function for registering items of articles ordered by a plurality of customers (persons) in a same chit file and thereafter the items are so classified as to issue bill chits separately for each of the customers A chit file constituent data storing area of a structure shown in FIG. 53 is provided in the control information storing file 2—2 of the memory 1-5, wherein an address #110 designates an area for storing the number of customers per chit (i.e., the number of divisions of one chit corresponding to the individual customers, respectively) while an address #111 designates an area for setting the number of items for registration per chit with an address #112 designating an area for storing the number of chit files which can be handled by the cash register (i.e., the number of openable chit files). When the electronic cash register is set to the presetting mode (PRG) with the mode select switch 1-2, a task menu in the presetting mode is displayed, as shown in FIG. 6. Through the same procedure as that shown in the flow chart of FIG. 8, relevant data are stored at the respective addresses in the chit file constituent data storing area.

Figure 52:
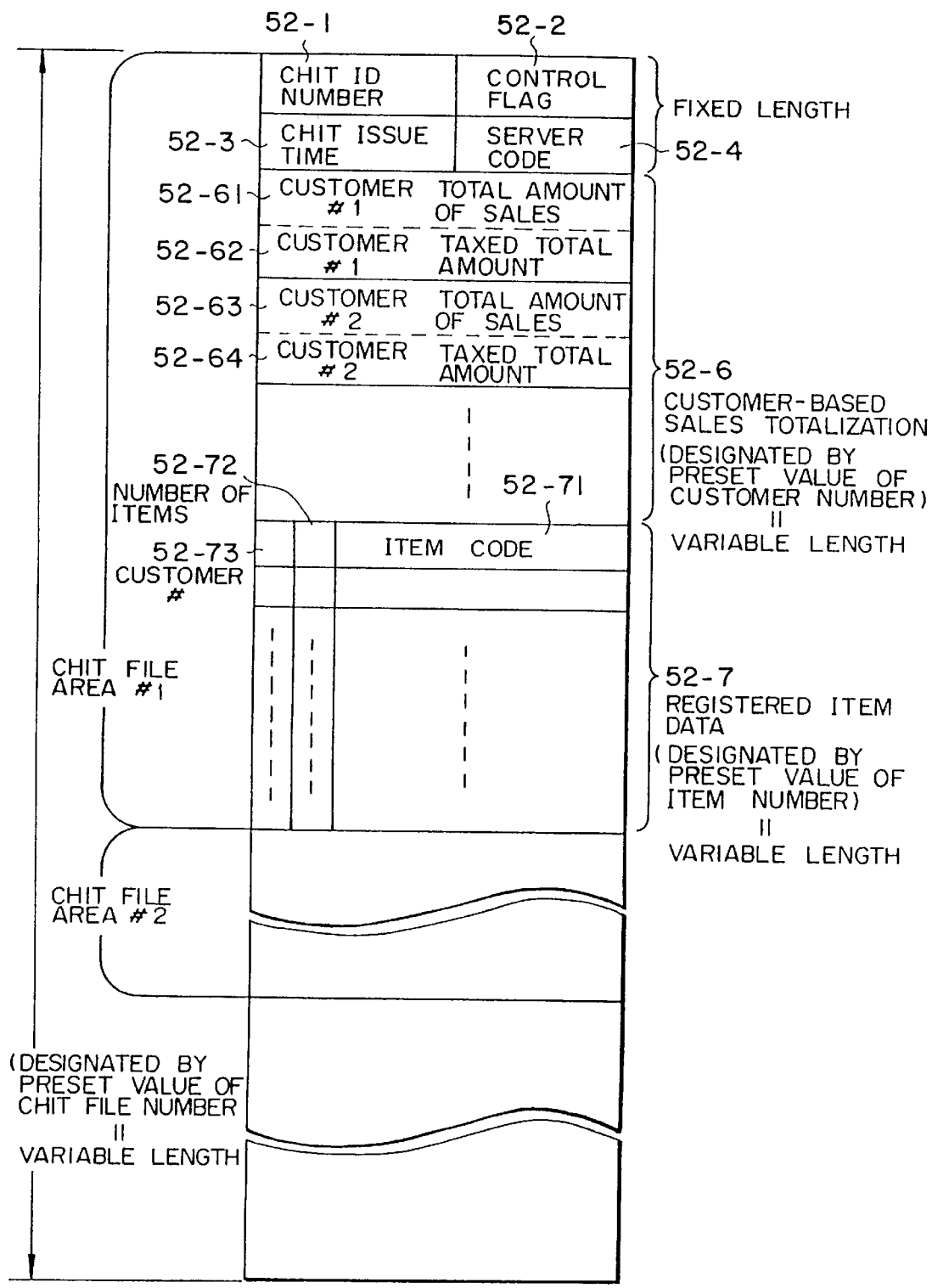
FIG. 52 is a view showing a structure of a chit file area in a cash register according to a thirteenth embodiment of the present invention.

FIG. 52 shows a structure of the chit file area 2-5 in the cash register according to the instant embodiment of the invention. In dependence on the number of customers per chit as stored at the address #110 in the chit file constituent data storing area shown in FIG. 53, the size of a customer-based sales totalizator 52-6 is determined, while the size of the registered item data 52-7 is determined by the number of the registered items per chit file as stored at the address #111. Further, the total number of the chit files placed in the chit file area 2-5 is determined by the number of issued or generated chit files set at the address number #112 which can be handled by the cash register. On these conditions, the structure of the chit file area shown in FIG. 52 is determined.

FIG. 11 shows a structure of the chit file control information storing area provided in the control information storing file 2—2, wherein an address #217 designates a customer ID number keying enforce flag. The data loading in this area (11-8) is performed through the same procedure as described hereinbefore in conjunction with the second embodiment of the invention and shown in the flow chart of FIG. 12.

Figure 54:
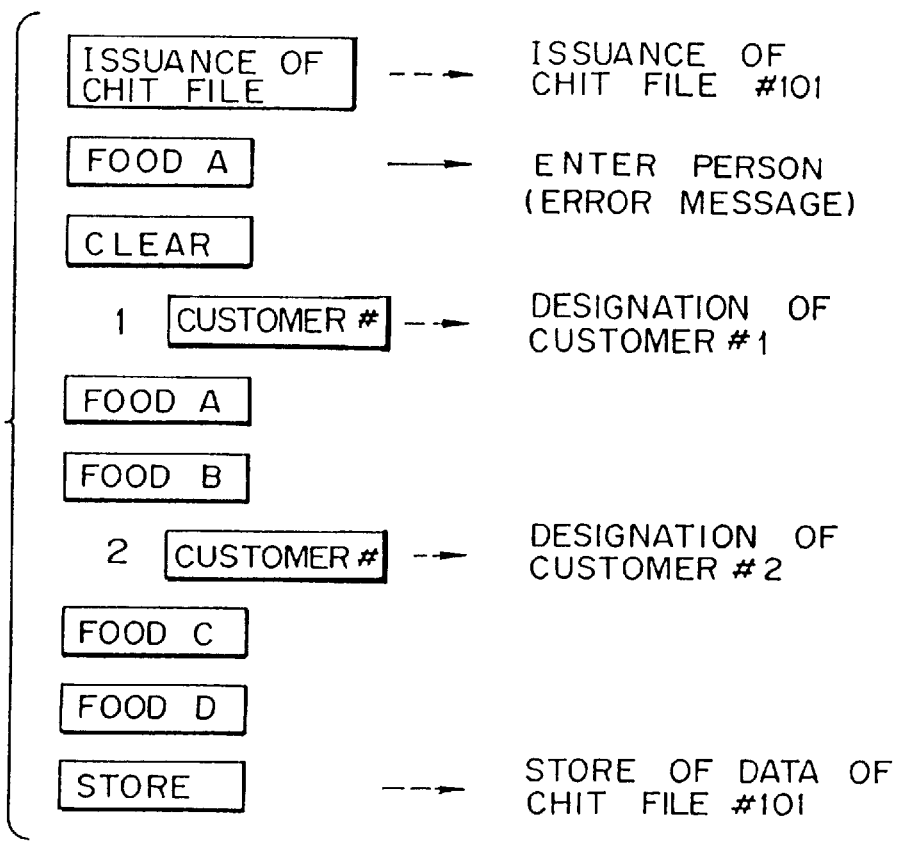
FIG. 54 is a view showing an example of key manipulation for a registration processing by using a customer ID number input key according to the thirteenth embodiment.
Figures 55, 56:
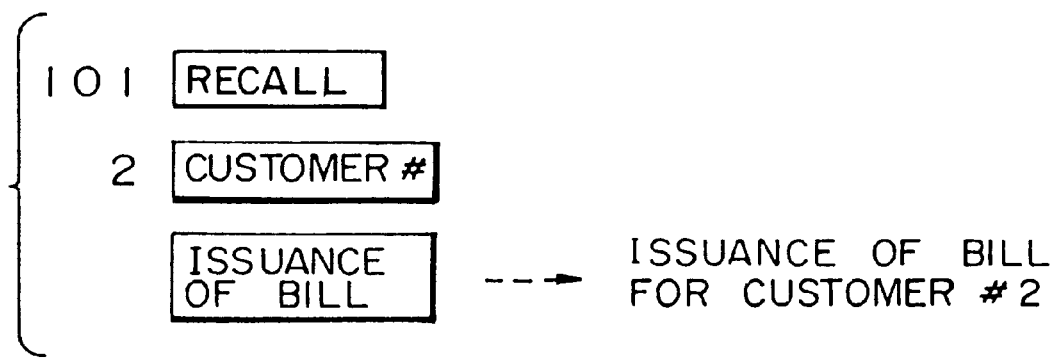
FIG. 55 is a view showing examples of key manipulation for a bill chit issuing processing by using the customer ID number input key according to the thirteenth embodiment.
FIG. 56 is a view showing an example of the bill chit according to the thirteenth embodiment.

Next, description will be made of operations involved in the chit issuing or generating processing in the registration mode of the electronic cash register. FIGS. 54 to 58 illustrate, by way of example, manipulation of the customer ID number key (step 57-6) for the registration processing and the bill chit issuance or generation (57-1 of FIG. 57). Referring to FIG. 54, by actuating the chit file issuing key, a chit file #101 is issued or generated. When the item registering key is actuated (step 57-2) in this state without inputting the customer ID number (step 57-3), the item registering key operation is invalidated and a corresponding error message is displayed (step 57-9). When the customer ID number is first inputted (step 57-3) and then the item registering key is manipulated (step 57-2), relevant item is registered in the same form as the registered item data shown at 52-7 in FIG. 52 (i.e., in the form of an item code accompanied with a relevant customer ID number) (steps 57-4 and 57-5). The number of the customer ID numbers which can be inputted is limited to the capacity of the location of the address #110 (and hence the number of customers per chit) set in the chit file constituent data storing area shown in FIG. 53. The inputting of the customer ID number beyond the above-mentioned limit is invalidated, being accompanied with generation of a corresponding error display. When the store key is actuated after the items have been inputted on a customer-by-customer basis, the registered data are stored in the relevant chit file area in the form shown in FIG. 52. Next, referring to FIG. 55, when the recall key is actuated after entering or inputting the file ID number, the chit file of the file ID number as inputted is transferred from the chit file area 2-5 to the work area 2-6. Subsequently, by actuating the bill chit issuing key in succession to the inputting of the customer ID number (step 58-2), the registered items corresponding to that customer ID number and the sales totalization data of that customer ID number are read out from the item data area 52-7 and the sales totalization data area 45-6 of the relevant chit file to be sent to the printer 1-6, whereby a customer-based bill chit of the structure shown in FIG. 56 is delivered (step 58-3). On the other hand, when the recall key is manipulated after registering the file ID number and then the bill chit issuing key is operated without inputting the customer ID number, a bill chit for the all items registered in the corresponding chit will be issued in a format shown in FIG. 46 without any classification of the items based on the customer ID numbers (step 58-4).

Figure 57:
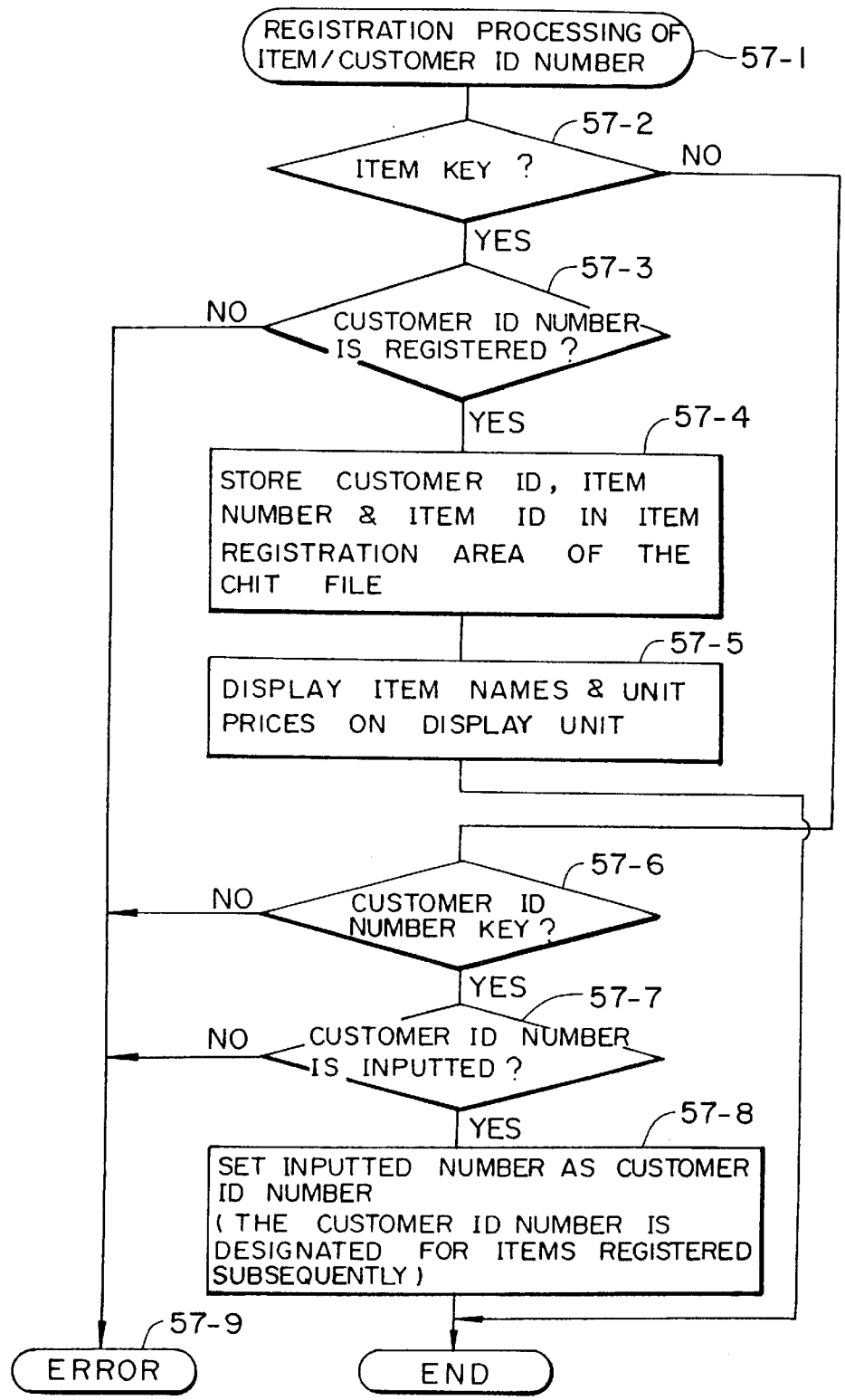
FIG. 57 is a flow chart illustrating a processing for registering items and customer ID numbers in the electronic cash register according to the thirteenth embodiment.

FIG. 57 is a flow chart illustrating the processing for registering items and customer ID number in the electronic cash register according to the thirteenth embodiment.

Figure 58:
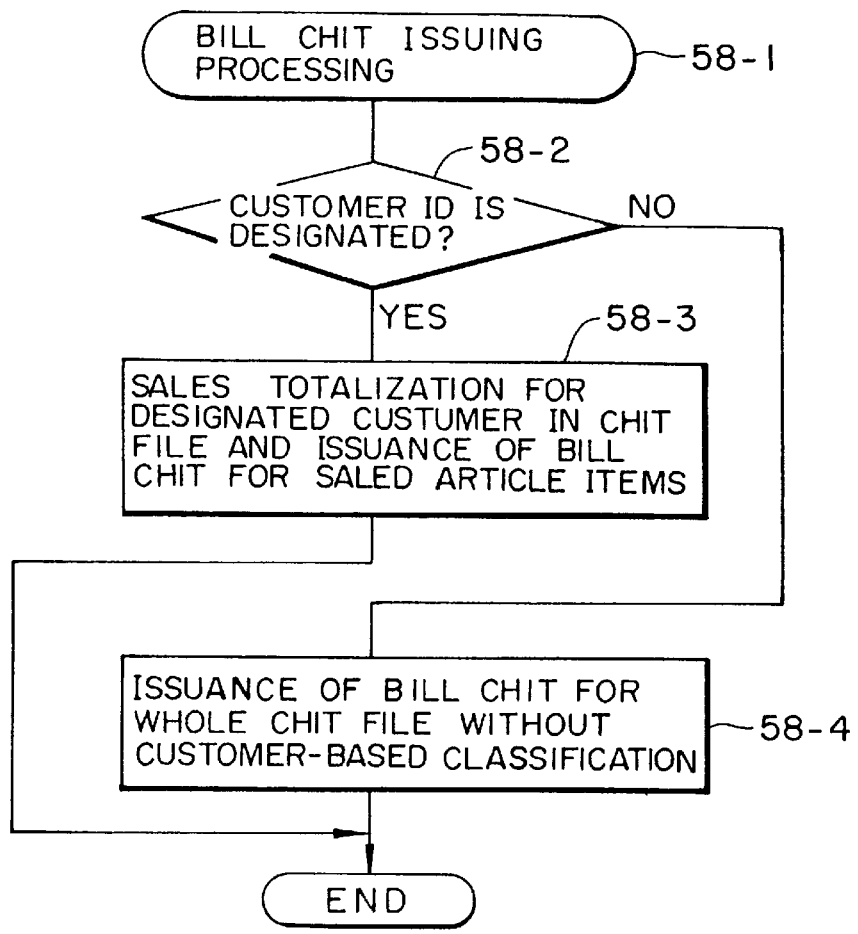
FIG. 58 is a flow chart illustrating a bill chit issuing processing in the thirteenth embodiment according to the thirteenth embodiment.

Further, FIG. 58 is a flow chart illustrating a bill chit issuing processing in the instant embodiment.

Embodiment 14

The fourteenth embodiment of the invention is directed to an electronic cash register imparted with a function for executing a transaction end processing (settlement processing) separately for each of the customers in the case where items for a plurality of customers have been registered in a same chit file.

As in the case of the thirteenth embodiment of the invention, a chit file constituent data storing area of the structure shown in FIG. 53 is secured in the control information storing file 2—2 of the memory 1-5, wherein the number of customers per chit is placed at the address #110, the number of items for registration per chit is placed at the address #111 and the number of openable chit files which can be disposed of by the cash register is placed at the address #112. Through this data loading processing, the chit file area is configured as shown in FIG. 52.

Further, the customer ID number input enforce flag is placed at the address #217 of the chit file control information storing area shown in FIG. 11, as in the case of the thirteenth embodiment.

Figure 59:
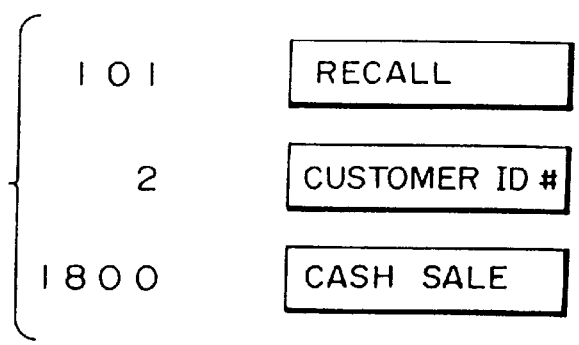
FIG. 59 is a view showing an example of key manipulation for executing a transaction settlement processing by using a customer ID number input key according to a fourteenth embodiment of the present invention.

Now, description will turn to the operations involved in the transaction end processing (settlement processing) effected in the registration mode of the cash register. After executing the registration by using the customer ID number key as described previously by reference to FIG. 54 in conjunction with the thirteenth embodiment, the data for registration shown in FIG. 52 is stored in the chit file having the relevant chit ID number and secured in the chit file area 2-5 shown in FIG. 2. Referring to FIG. 59, when the recall key is actuated after setting the file ID number, the chit file of the relevant chit ID is read out from the chit file area 2-5 to the work area 2-6. In succession, the customer ID number is inputted. Then, the sales totalization data of the customer ID number as inputted is read out from the above-mentioned chit file to be displayed on the display device 1-4. In this state, a cash sale key is operated to effectuate the transaction end processing (settlement processing) for the data being displayed (i.e, the sales totalization data in the chit file for the customer ID number of concern), as a result of which the content of transaction and the total amount of sales are displayed in such a manner as shown in FIG. 60 and at the same time supplied to the printer 1-6 which then issues a bill chit of the structure shown in FIG. 61. The transaction data is sent to a sales totalization data file 2-4, whereon the registered item data corresponding to the customer ID number as stored in the registered item data area 52-7 of the relevant chit file and the corresponding sales totalization data in the customer-based totalization area 52-6 are cleared.

Embodiment 15

With the fifteenth embodiment of the invention, it is contemplated to provide an electronic cash register imparted with such a function that when a number of customers to be registered in one and the same chit file exceeds a preset number of customers per chit, as mentioned in conjunction with the thirteenth embodiment, another chit file area is linked to thereby allow a number of customers exceeding the preset or predetermined customer number to be registered.

FIG. 11 shows a structure of the chit file control information storing area provided in the control information storing file 2—2, wherein an address #217 designates a location where the customer ID number input enforce flag is placed and an address #212 designates a location where a customer number input enforce flag is placed. The data loading in the areas 11-8 and 11-9 is realized through the same procedure described previously in conjunction with the second embodiment and illustrated in the flow chart of FIG. 12.

Figure 62:
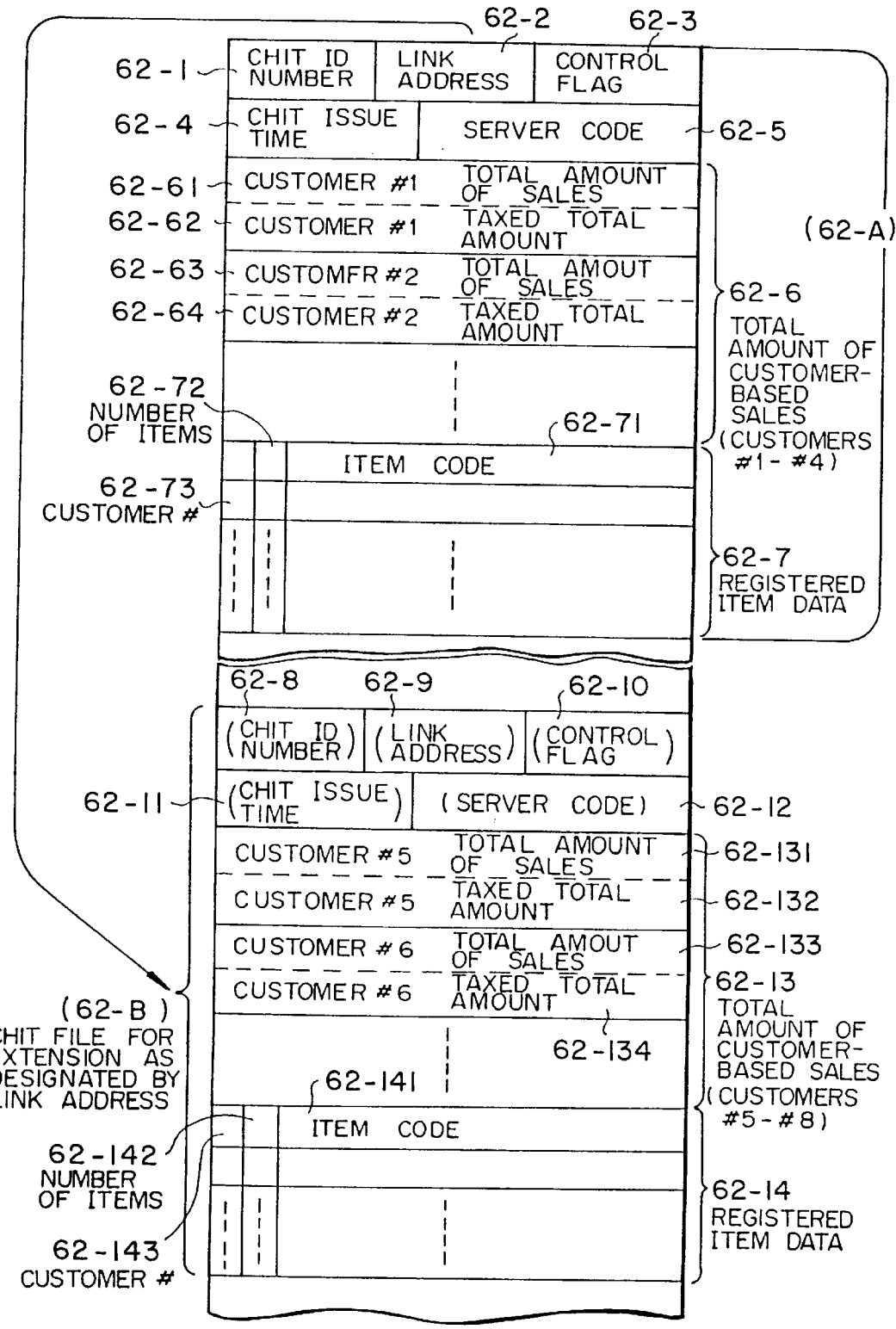
FIG. 62 is a view for illustrating extension of a chit file by using a link address in the electronic cash register according to a fifteenth embodiment of the invention.

FIG. 62 shows a structure of the chit file area 2-5 in the electronic cash register according to the instant embodiment. As in the case of the thirteenth embodiment, there is provided in the control information storing file 2—2 of the memory 1-5 the chit file constituent data storing area of the structure shown in FIG. 53, wherein the number of customers per chit file is placed at the address #110, the number of items for registration per chit file is placed at the address #111, and the number of openable chit files which can be handled by the cash register is placed at the address #112. Through this data load processing, the chit file area is configured in the structure similar to that of the thirteenth embodiment. FIG. 62 shows the structure of the chit file placed at the address #110 on the assumption that the number of customers for each chit file (i.e., per chit file) is equal to four, only for the illustrative purpose, wherein link address areas (62-2, 62-9) are provided for allowing other chit file area to be linked for use. Provision of the link address area in the chit file is a feature characterizing the structure of the chit file used in the instant embodiment of the invention.

Figure 63:
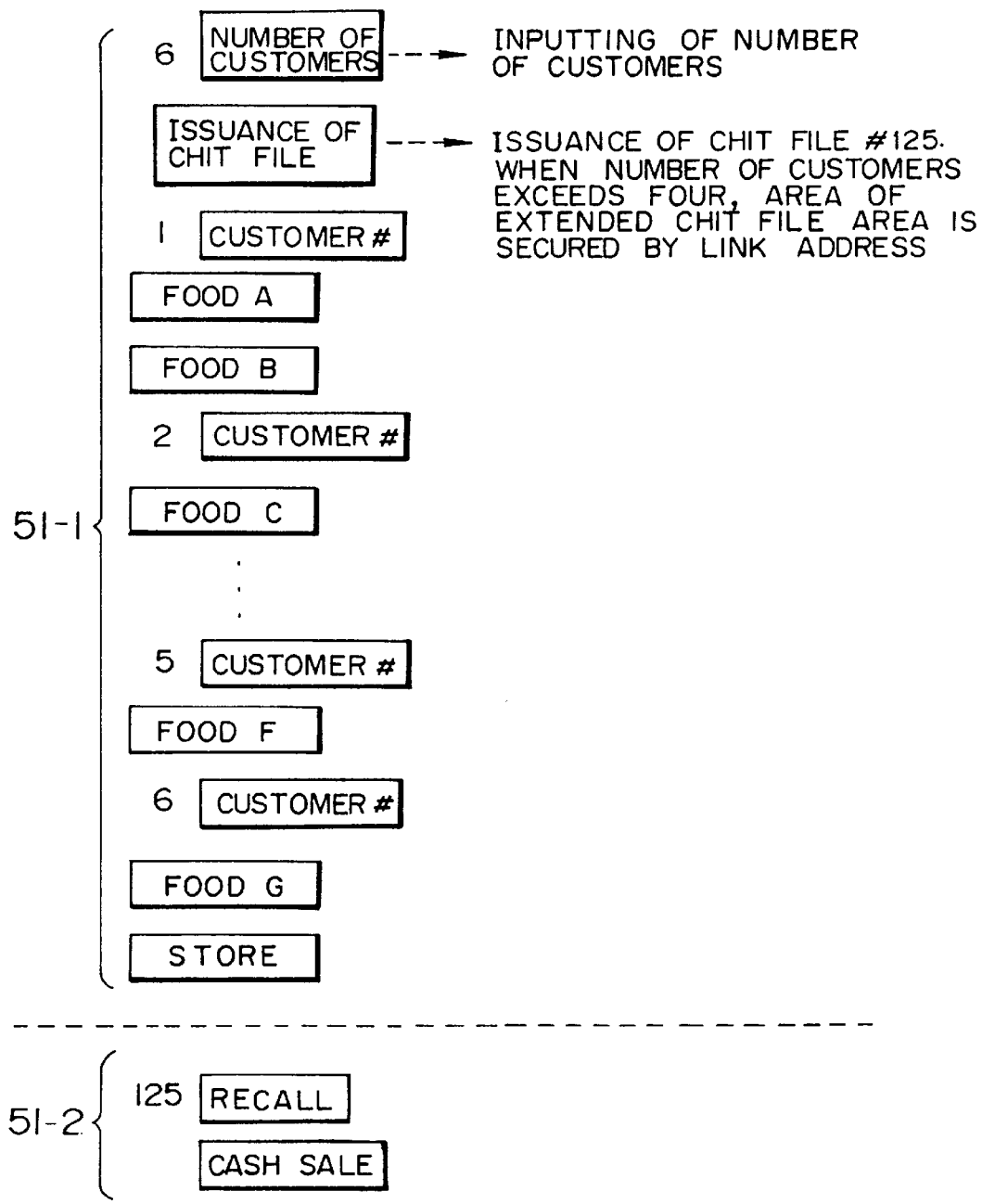
FIG. 63 is a view showing exemplary key manipulations for using an extended chit file in the cash register according to the fifteenth embodiment.

Now, description will be made of the operations involved in the registration processing in the cash register according to the instant embodiment. FIG. 63 shows exemplary key manipulations. In a step 63-1, the number of customers for a chit file of concern is inputted through a customer number registering key provided in the keyboard 1—1. In a case of manipulation of the chit issuing key without inputting the customer number, the key manipulation is invalidated and a corresponding error message is displayed. When the chit file issuing key is actuated after inputting the number of customers, a chit file #125 is generated. In that case, however, there is a possibility that the number of customers as inputted may exceed the customer number set for one chit file as placed at the address #110 of the chit file constituent data storing area. By taking into account this possibility, link address information for securing another chit file area to be linked as an extended file is stored in the link address area 62-2 of the opened chit file. In the case of the example illustrated in FIG. 63, it is assumed that the number of customers is six while the customer number predetermined for one chit file is four. Accordingly, a chit file area (62-B) is secured as an extended file in addition to the chit file area (62-A), and the link address information for the chit file area (62-B) is stored in the link address area 62-2 of the opened chit file.

Next, description will turn to the registration of items or articles. Manipulation of the item registering key without inputting the customer ID number is invalidated with a corresponding error message being displayed. By actuating the item registering key after inputting the customer ID number, the items are registered in the same form as the registered item data 62-7 (i.e., in the form in which the item code is affixed with the customer ID number). Any number of the customer ID numbers can be inputted so long as the predetermined limit is not exceeded. When this limit is exceeded, the inputting of the customer ID number beyond the predetermined limit is invalidated and a corresponding error message is displayed. After registration of the items as classified on a customer-by-customer basis, the store key is actuated. Then, the registered data are stored in the chit file allotted with a corresponding chit file ID number and secured in the chit file area in the form illustrated in FIG. 62.

In a step 63-2, the recall key is operated after inputting the chit file ID number. Then, the chit file (62-A) of the chit ID number as inputted is read out to the work area 2-6. At this stage, the link address area (62-2) of the chit file (62-A) is checked. When no link address information is found in the link address area (62-2), the chit file data mentioned above is displayed on the display device 1-4 as a single chit file. On the other hand, when the link address information is resident in the link address area (62-2), the data of the extended chit file (62-B) determined on the basis of the link address information is read out into the work area 2-6, whereon the chit data of both areas (62-A, 62-B) are displayed on the display device 1-4. In this manner, by referencing the information of the link address area (62-2), the chit file to which the extended chit file (62-B) is linked can be recalled.

The bill chit issuing processing after the recalling of the chit file(s) is executed in the similar manner as in the case of the thirteenth embodiment. In that case, when an extended chit file (62-B) is linked to a chit file (62-A) of concern, the area for storing data of the customer-based sales totalization data (62-13) and the registered item data (62-14) is used as the extended area, as described above. In this conjunction, it should be noted that the area(s) of the basic chit file (62-A) is used for storing the data of the chit ID number (62-1), the control flag (62-3), the chit issue time (62-4), the server code (62-5) and so forth. In other words, the area of the extended chit file (62-B) is not used for storing these data.

The transaction end or settlement processing after the file recalling is performed through the procedure described previously in conjunction with the fourteenth embodiment. More specifically, when the recall key is operated after inputting the chit file ID number, the chit file of the inputted ID number is transferred to the work area 2-6 from the chit file area 2-5. Further, the extended chit file as linked is also read out into the work area 2-6. Subsequently, a customer ID number is inputted. Then, the sales totalization data corresponding to that customer ID number are extracted from the chit file as well as the extended chit file, if recalled, to be subsequently displayed on the display device 1-4. Now, the cash sale key is actuated to effectuate the transaction end (settlement) processing for the data being displayed (i.e., for the sales totalization data of the customer ID number as inputted), whereon the contents of the transaction and the total amount are displayed on the display device 1-4 and at the same time supplied to the printer for issuing a bill chit. The transaction data is then stored in the sales totalization data file 2-4, while the registered item data and the sales totalization data corresponding to the customer ID number as inputted are cleared, respectively, from the registered item data area 62-7 (inclusive of the area 62-14 in case the extended chit file is linked) and the customer-based sales totalization data area 62-6 (inclusive of the area 50-13 where the extended chit file is linked).

Figure 64:
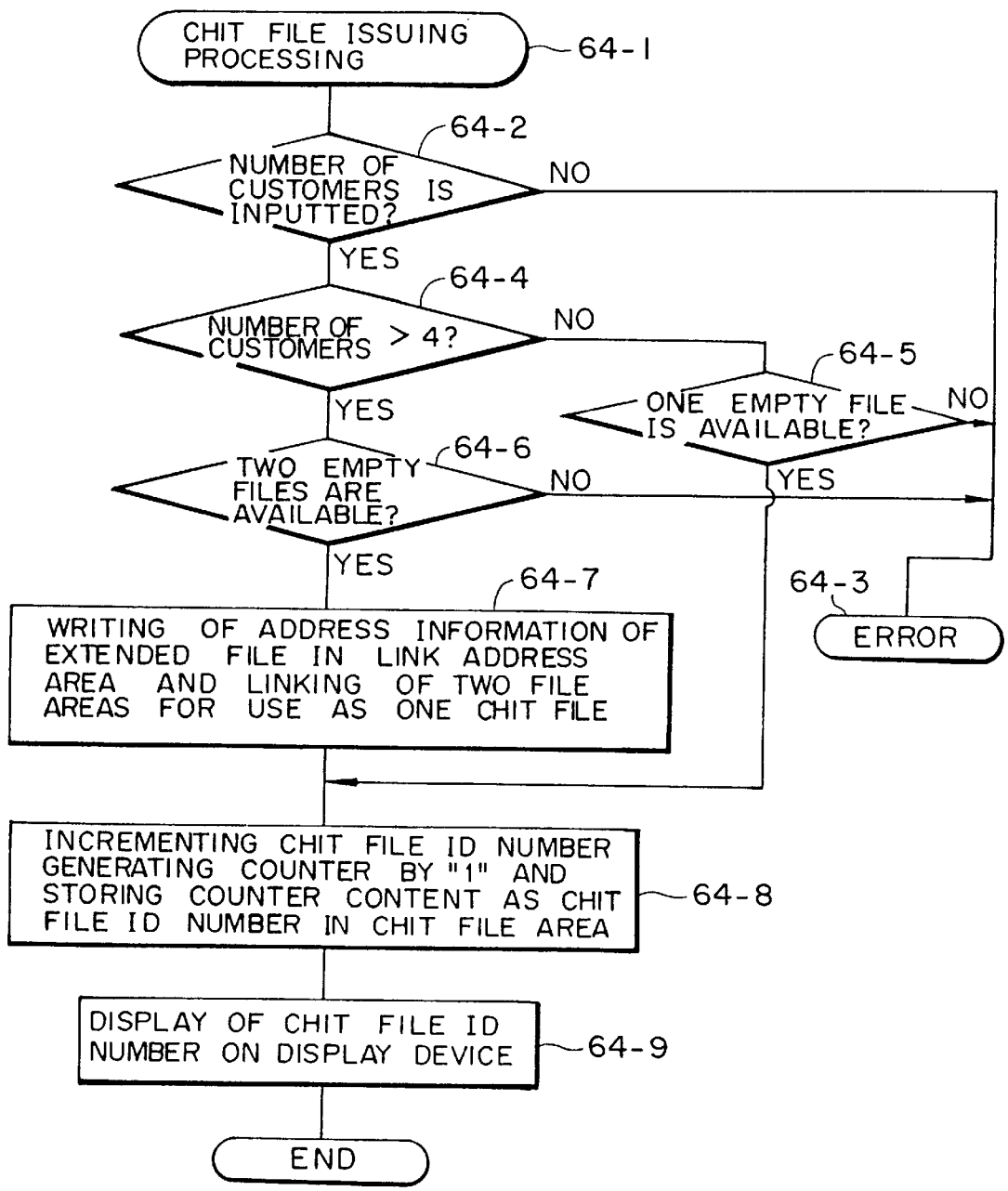
FIG. 64 is a flow chart for illustrating operations involved in the chit issuing processing executed according to the fifteenth embodiment.

FIG. 64 is a flow chart for illustrating operations involved in the chit issuing processing executed in accordance with the instant embodiment in the assumed case where the number of customers per chit is four.

Figure 65:
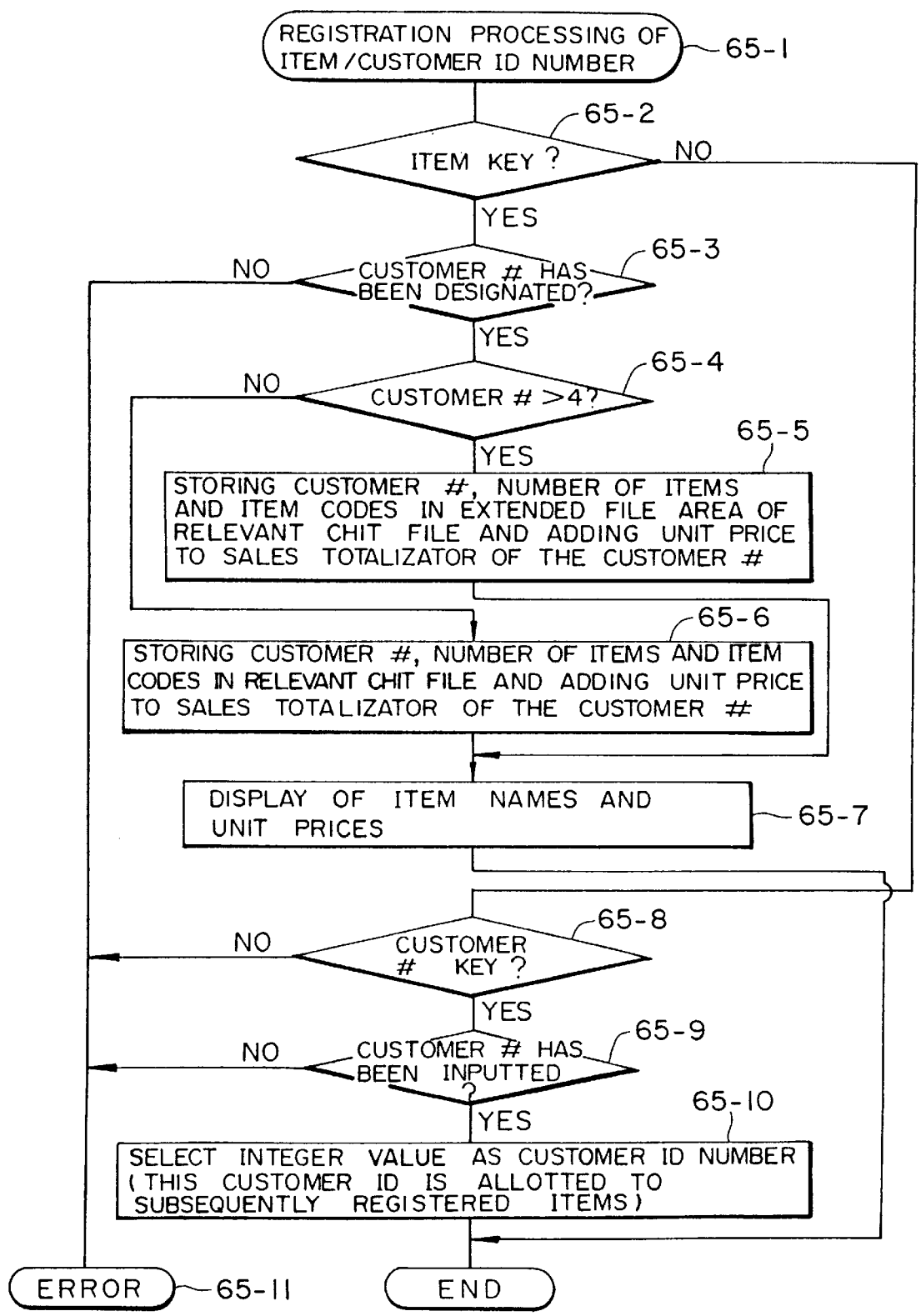
FIG. 65 is a flow chart for illustrating an item and customer ID number registration processing executed in accordance with the fifteenth embodiment.

FIG. 65 is a flow chart illustrating the operation for registration executed in accordance with the instant embodiment in the assumed case where the number of customers per chit is four.

Figure 66:
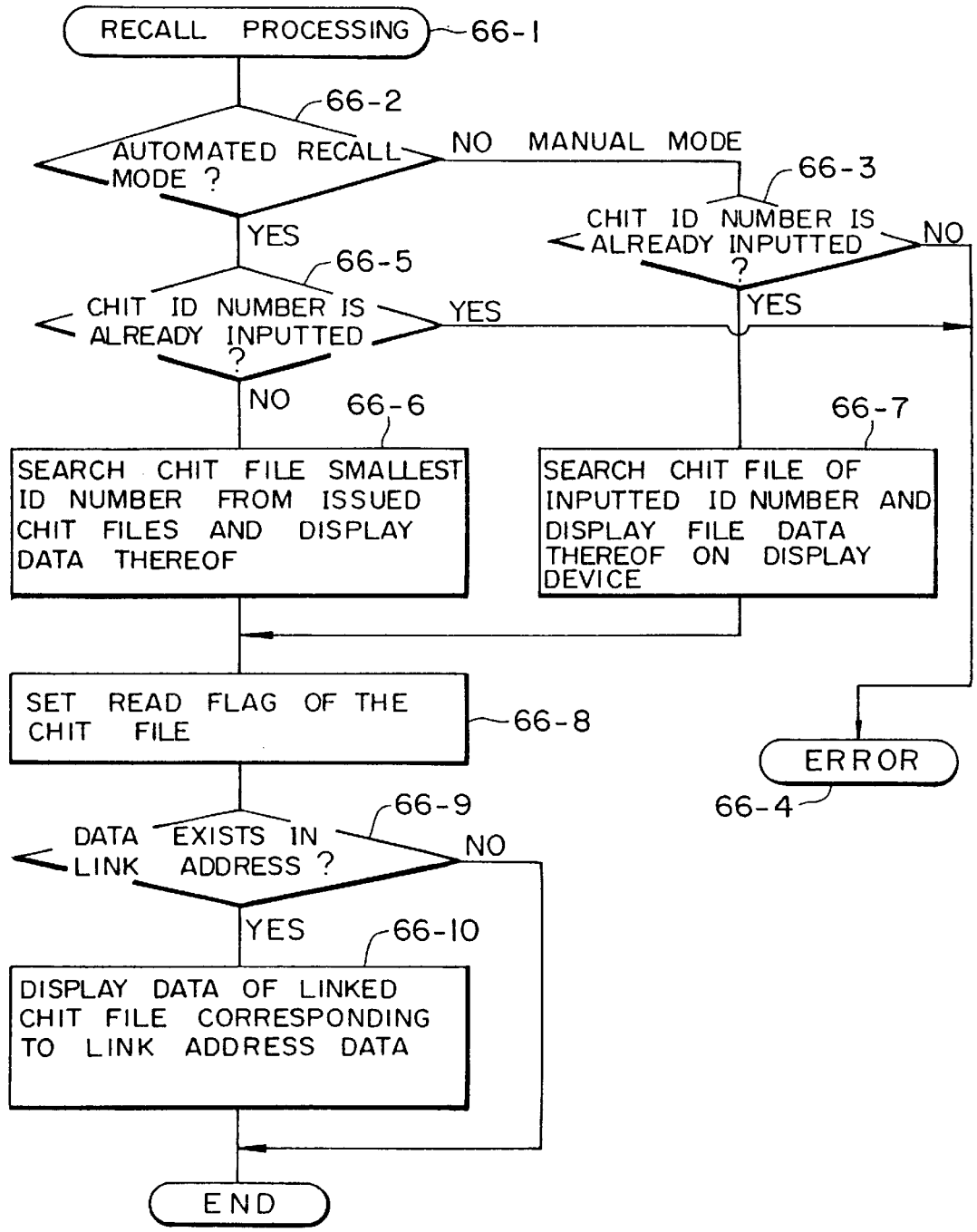
FIG. 66 is a flow chart illustrating operation involved in recall processing executed according to the fifteenth embodiment.

FIG. 66 is a flow chart illustrating operations involved in the recall processing executed in the cash register according to the instant embodiment.

In the above description, it has been assumed that the number of customers is six for the preset per-chit customer number which is equal to four and that one chit file area is linked as the extended file. It should however be noted that there may arise such situation in which a plurality of chit file areas have to be linked although it depends on the number of the customers. In that case, the teachings of the invention incarnated in the instant embodiment can equally be applied by storing the link information for a succeeding extended file in the link information area of a preceding extended file.

Embodiment 16

With the sixteenth embodiment of the invention, it is contemplated to provide an electronic cash register imparted with such a function that when a number of customer order items to be registered in a chit file exceeds the preset or predetermined number of items for registration per chit, as mentioned in conjunction with the first embodiment, another chit file area is linked to thereby allow even a number of items exceeding the preset item number to be registered.

Figure 67:
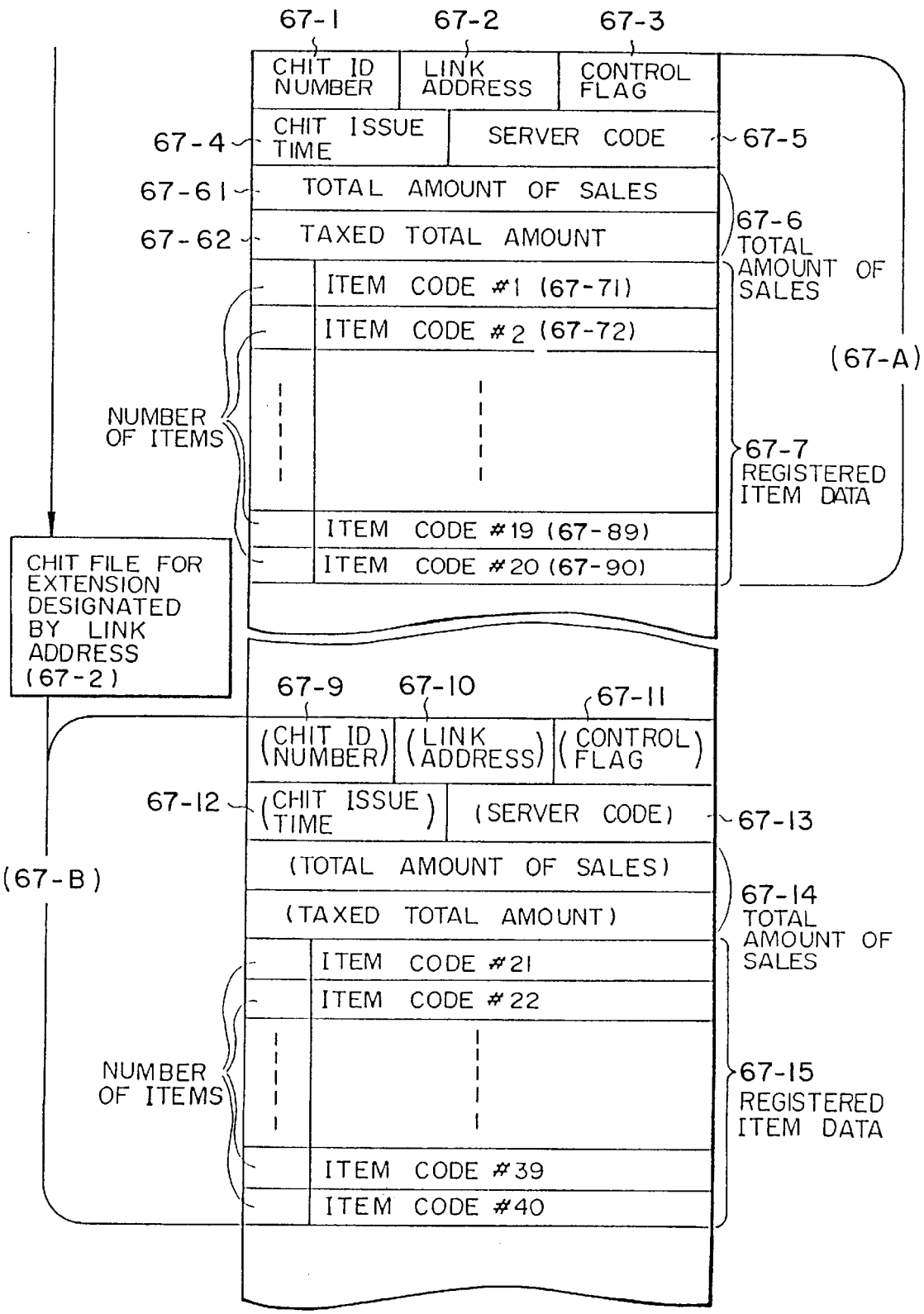
FIG. 67 is a view for illustrating extension of a chit file according to a sixteenth embodiment of the present invention.

FIG. 67 shows a structure of the chit file area 2-5 in the electronic cash register according to the instant embodiment. As in the case of the first embodiment, there is provided in the control information storing file 2—2 of the memory 1-5 the chit file constituent data storing area of the structure shown in FIG. 5, wherein the number of items for registration per chit file is placed at the address #111, and the number of openable chit files which can be handled by the cash register is placed at the address #112. Through this data loading or setting processing, the chit file area is configured in the structure similar to that of the first embodiment. FIG. 67 shows the structure of the chit file placed at the address #111 on the assumption that the number of items for registration per chit file is equal to twenty only for the illustrative purpose, wherein a link address area (67-2, 67-10) is provided in each chit file for allowing another chit file area to be linked for use. Provision and usage of the link address area in the chit file is a feature characterizing the structure of the chit file used in the instant embodiment of the invention.

Now, description will be made of the operations involved in the registration processing in the cash register according to the instant embodiment. FIGS. 68 and 69 show exemplary key manipulations for issuance of the chit file and cash sale. By the key manipulation shown in FIG. 68, a chit file #126 is issued, whereon the items such as "FOOD #1", "FOOD

2", etc. are registered sequentially through similar operations described hereinbefore in conjunction with the first embodiment of the invention. When the number of registered items exceeds the predetermined or preset number of items for registration per chit mentioned above, an empty or unoccupied file area is secured in the chit file area 2-5 through the procedure similar to that taken for issuing the chit file. In this case, however, no chit file ID number is newly imparted but a link file code identifying that the file of concern is a link file for extension is written in the chit file ID number area 67-9. Subsequently, link address information for linking and controlling the file of concern is stored in a link address area 67-2 of the chit file as issued. Since it is assumed in the case of the example illustrated in FIG. 67 that the number of the items for registration per chit file is equal to twenty, the chit file area 67-B is secured as the extended file in addition to the chit file area 67-A at the time point when the number of registered items reaches twenty-one, and the address information of the chit file area 67-B is stored in the link address area 67-2 of the chit file area 67-A. In the registered item data area 67-15 of the extended link file 67-B, the items inputted in succession to the twentieth item are stored. In the case where no empty file is available in the chit file area when the chit issue processing for securing the other chit file area is to be executed at the time point the registered item number reaches twenty-one, it is impossible to link the extended file. Accordingly, registration of the twenty-first item is invalidated and a corresponding error message is displayed.

Next, description will be directed to operations involved in the recall processing. Referring to FIG. 69, the recall key is operated after inputting the chit file ID number. Then, the chit file 67-A of the chit ID number as inputted is read out to the work area 2-6. At this time point, the link address area 67-2 of the chit file 67-A is checked. When no link address information is found in the link address area 67-2, the chit file data mentioned above is displayed on the display device 1-4 as a single chit file. On the other hand, when the link address information is resident in he link address area 67-2, the data of the extended chit file 67-B determined on the basis of the link address information is read out into the work area 2-6, whereon the chit data of both areas 67-A and 67-B are displayed on the display device 1-4. In this manner, by referencing the information of the link address area 67-2, the chit file to which the extended chit file 67-B is linked can be recalled.

Next, operation involved in the transaction end or settlement processing after the file recalling will be described. When the cash sale key is operated in succession to the recall processing described above, the transaction end (settlement) processing for the sales totalization data of the relevant chit file being displayed is executed, whereon the contents of the transaction and the total amount are displayed on the display device 1-4, as shown in FIG. 71, and at the same time supplied to the printer for issuing a bill chit. The transaction data is then stored in the sales totalization data file 2-4, while the chit file data area 67-A (inclusive of the area 5-B when the extended chit file is linked) is cleared.
Embodiment 17

The seventeenth embodiment of the invention is directed to an electronic cash register imparted with a function to perform the recall processings sequentially for a plurality of chits of the respective provisionally closed chit files to thereby issue a bill chit by combining the chit data and a function to perform a transaction settlement processing by combining the chit data.

FIG. 11 shows a structure of the chit file control information storing area provided in the control information storing file 2—2, wherein an address #219 designates a location where a combine enable flag for chit files is placed. The data loading to the area (11-10 in FIG. 11) are realized through the same procedure as described in conjunction with the second embodiment of the invention and illustrated in the flow chart of FIG. 12.

FIGS. 72 to 75 show exemplary chit file key manipulations in the electronic cash register according to the instant embodiment. Through operations similar to those described previously in conjunction with the first and fourteenth embodiments, the chit files #101 and #123 are issued, respectively, and stored in the chit file area 2-5 after registration of the respective items.

FIG. 74 illustrates key manipulations for issuing a bill chit through a processing for combining the chit files #101 and #123. To this end, the chit file #101 is read out to the work area 2-6, which is then followed by recalling of the chit file #123. At this time point, the chit file combine enable flag (11-10) mentioned above is checked. Unless this flag is set, the recall processing of the chit file #128 is inhibited as error. When the combine enable flag (11-10) is set, the chit file #123 is recalled to the work area 2-6. In secession, the bill chit issuing key is manipulated to thereby issue a bill chit of the format shown in FIG. 76 on the basis of the data of the chit files #101 and #123 recalled to the work area 2-6.

Figures 77, 78, 79:
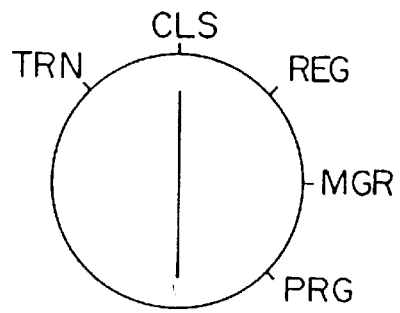
FIG. 77 is a view showing an example of bill chit printed out in the chit-combining cash sale settlement processing according to the seventeenth embodiment.
FIG. 78 is a diagram showing schematically a mode select switch provided in association with a cash register according to an eighteenth embodiment of the invention.
FIG. 79 is a diagram showing a structure of a learning totalizator employed in the cash register according to the eighteenth embodiment.

FIG. 75 illustrates key manipulation for effectuating the cash sale settlement processing by combining the chit files #101 and #123. First, the chit file #101 is recalled to the work area 2-6, which is then followed by recalling of the chit file #123. At this time point, chit file combine enable flag (11-10) is checked. Unless this flag (11-10) is set, the recall processing of the chit file #123 is inhibited as error. On the other hand, when the combine enable flag (11-10) is set, the chit file #123 is recalled to the work area 2-6. In succession, the cash sale key is operated, whereby a bill chit of the format shown in FIG. 77 is issued on the basis of the data of the chit files #101 and #123 resident in the work area 2-6. Upon completion of the cash sale settlement processing, the chit files #101 and #123 are cleared from the chit file area 2-5 with the settlement data being transferred to the sales totalization data file 2-5.
Embodiment 18

The eighteenth embodiment of the invention is directed to an electronic cash register imparted with a function for performing the chit registration processing in a learning mode.

FIG. 78 shows a mode select switch provided in association with the cash register according to the instant embodiment. This mode select switch differs from the one shown in FIG. 3 in that a learning mode (TRN) is additionally provided.

FIG. 79 shows a structure of a learning totalizator provided in the sales totalizing data file 2-5. The totalizator is composed of a number-of-times count area 79-1 and a totalization area 79-2.

Figures 80, 81:
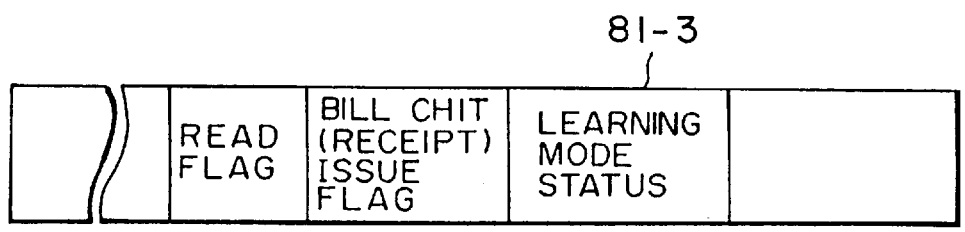
FIG. 80 is a view showing an example of chit file area inspection report printed out by the cash register according to the eighteenth embodiment.
FIG. 81 is a diagram showing a structure of a control flag area 4-2 provided in the chit file according to the eighteenth embodiment.

FIG. 81 shows a structure of a control flag area 4-2 provided in the chit file. This area 4-2 includes additionally a learning mode status 8-3 indicating issuance of the chit in the learning mode designated by the mode select switch.

The learning mode is selected by means of the mode select switch 1—1. Thereafter, manipulation of the chit issuing key activates the processing which is similar to that described hereinbefore in conjunction with the first embodiment for generating a chit file ID number, whereon a chit file of the ID number as generated is secured in the chit file area 2-5. At that time, the chit file generated in the learning mode is loaded with the learning mode status 81-3 from the control flag area 4-2 of the chit file. The chit file having the learning mode status 81-3 set therein can now undergo the recall processing and the transaction settlement processing only provided that the learning mode is designated by the mode select switch 1—1. Further, the totalization data resulting from the chit registration processing performed or the chit file having the learning mode status 81-3 set therein is supplied only to the learning totalizator (FIG. 79) provided in the sales totalization file 2-5 without being added to the other totalizator(s) provided in the file 2-5. The content of the learning totalizator (FIG. 61) is printed on an adjustment report so that the chit registration processing in the learning mode can be confirmed.

Upon issuance of the inspection report for the chit file area 2-5, all the relevant chit files are checked as to whether or not the learning mode status 63-3 is set in the control flag area 4-2, and the data of the chit files having the learning mode status set therein are printed out by affixing a symbol such as "TRNG", as shown in FIG. 80, so that the data can be distinguished from those of the chit file generated in the registration mode (REG).

The settlement bill chit and others issued in the learning mode are printed out together with messages such as "TRNG MODE", "INVALID Bill chit" and the like, for distinction from the bill chit issued in the registration mode (REG).

Embodiment 19

The nineteenth embodiment of the invention is directed to an electronic cash register having a function for performing the chit registration processing by setting previously a learner code indicative of a person or learner in the memory.

Referring to FIG. 11 showing the structure of the chit file control information storing area provided in the control information storing file 2—2, an address #220 indicates a location where the learner code is placed. The data loading in this location (11—11 in FIG. 11) is carried out through the same procedure as described previously in conjunction with the second embodiment and shown in the flow chart of FIG. 12.

Figure 83:
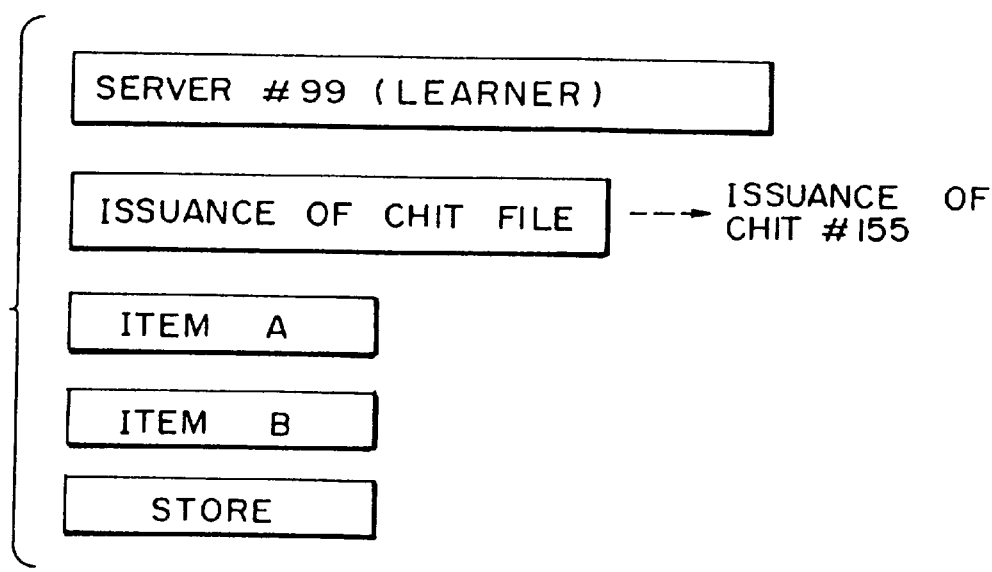
FIG. 83 is a view showing an exemplary key manipulations by a learner according to a nineteenth embodiment of the present invention.
Figure 84:
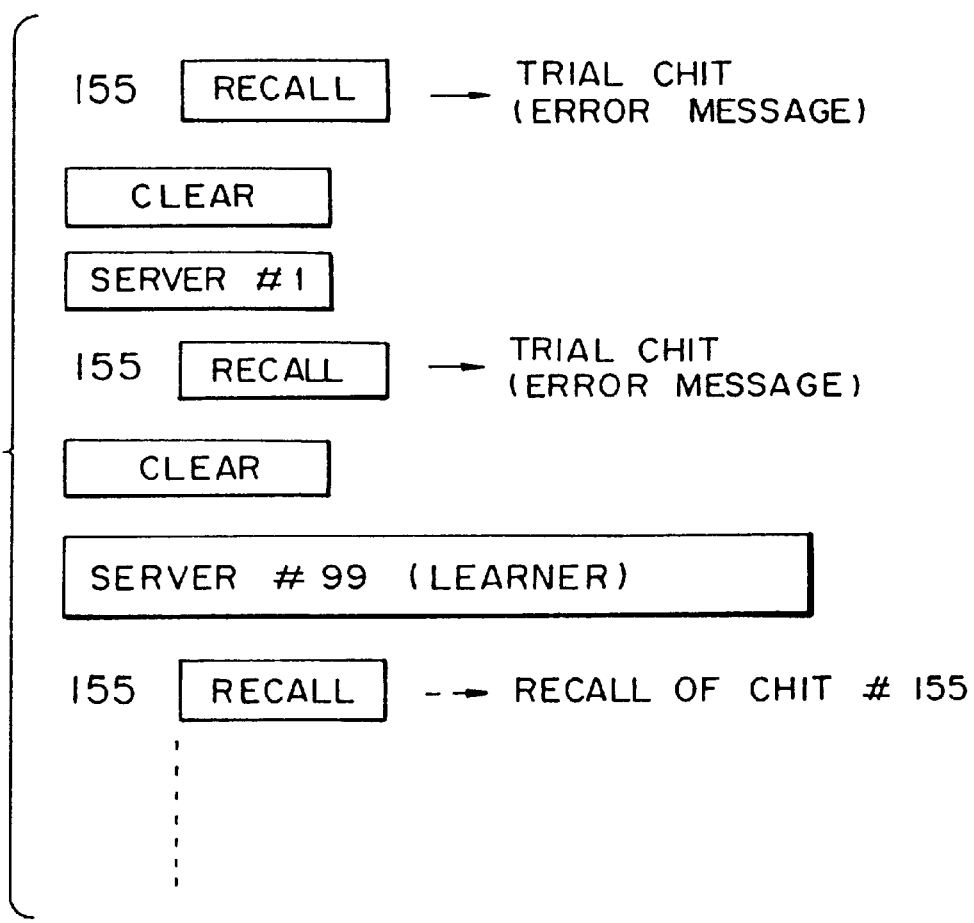
FIG. 84 is a view showing another exemplary key manipulations by a learner according to the nineteenth embodiment.

FIGS. 83 and 84 show exemplary key manipulations in the instant embodiment on the assumption that the learner code 99 is stored in the learner code location or area (11—11) of the control information storing area of the chit file mentioned above. Referring to FIG. 83, after designating the learner code 99, the chit issuing key is actuated. Then, the chit file ID number is generated through the processing similar to that of the first embodiment, whereby a chit file of the generated chit ID number is secured in the chit file area 2-5. At this time point, the chit file generated in the learner code designation mode is loaded with the learning mode status 81-3 (FIG. 81) from the control flag area 4-2. The chit file having the learning mode status 81-3 set therein can undergo the recall processing only when the learner code is designated, as illustrated in FIG. 84. Further, for the chit file having the learning mode status 81-3 set therein, the totalization data resulting from the chit registration processing is added to only the learning totalizator (FIG. 79) provided in the sales totalization data file 2-5 without being supplied to the other totalizator(s) provided in the same file 2-5, as in the case of the eighteenth embodiment. The content of the learning totalizator (FIG. 79) is printed on the adjustment report so that the chit registration processing in the learning mode can be confirmed.

Further, upon issuing an inspection report of the chit file area 2-5, all the relevant chit files are checked as to whether or not the learning status mode is set in the control flag area 4-2, and for the chit files having the learning mode status set therein, the file content is printed together with a symbol such as "TRNG", as shown in FIG. 80, so that the data can be distinguished from those of the chit file issued in the registration (REG) mode, as in the case of the eighteenth embodiment.

Figure 82:
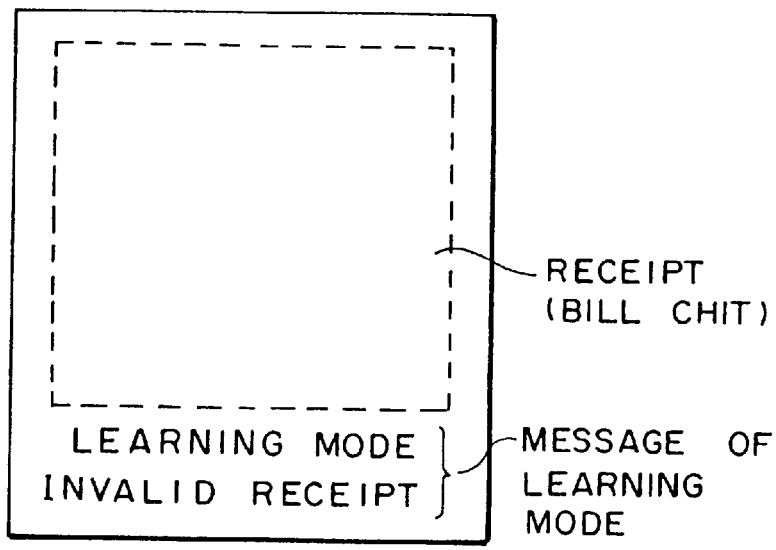
FIG. 82 is a view showing a bill chit or receipt printed out in a learning mode of the cash register according to the eighteenth embodiment.

As in the case of the eighteenth embodiment, the settlement bill chit or the like issued with the learner code being designated is printed out with a message such as "TRNG MODE", "INVALID BILL CHIT" or the like being affixed so that the former can be distinguished from the bill chit issued in the registration (REG) mode, as is illustrated in FIG. 82.

Figure 85:
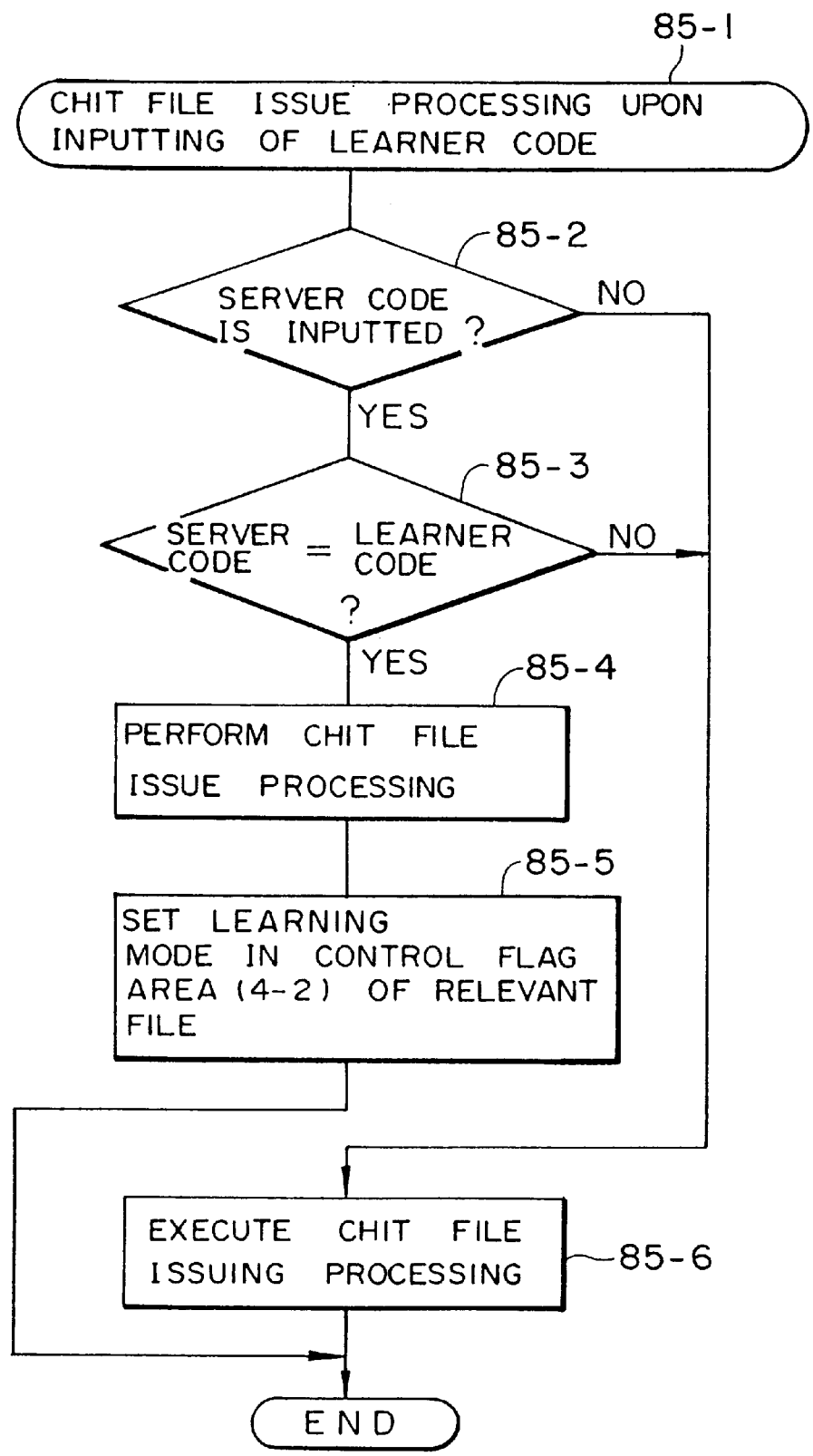
FIG. 85 is a flow chart for illustrating a chit issuing processing in the case where a learner code is designated according to the nineteenth embodiment.

FIG. 85 is a flow chart for illustrating the chit issuing processing in the case where the learner code is designated.

Figure 86:
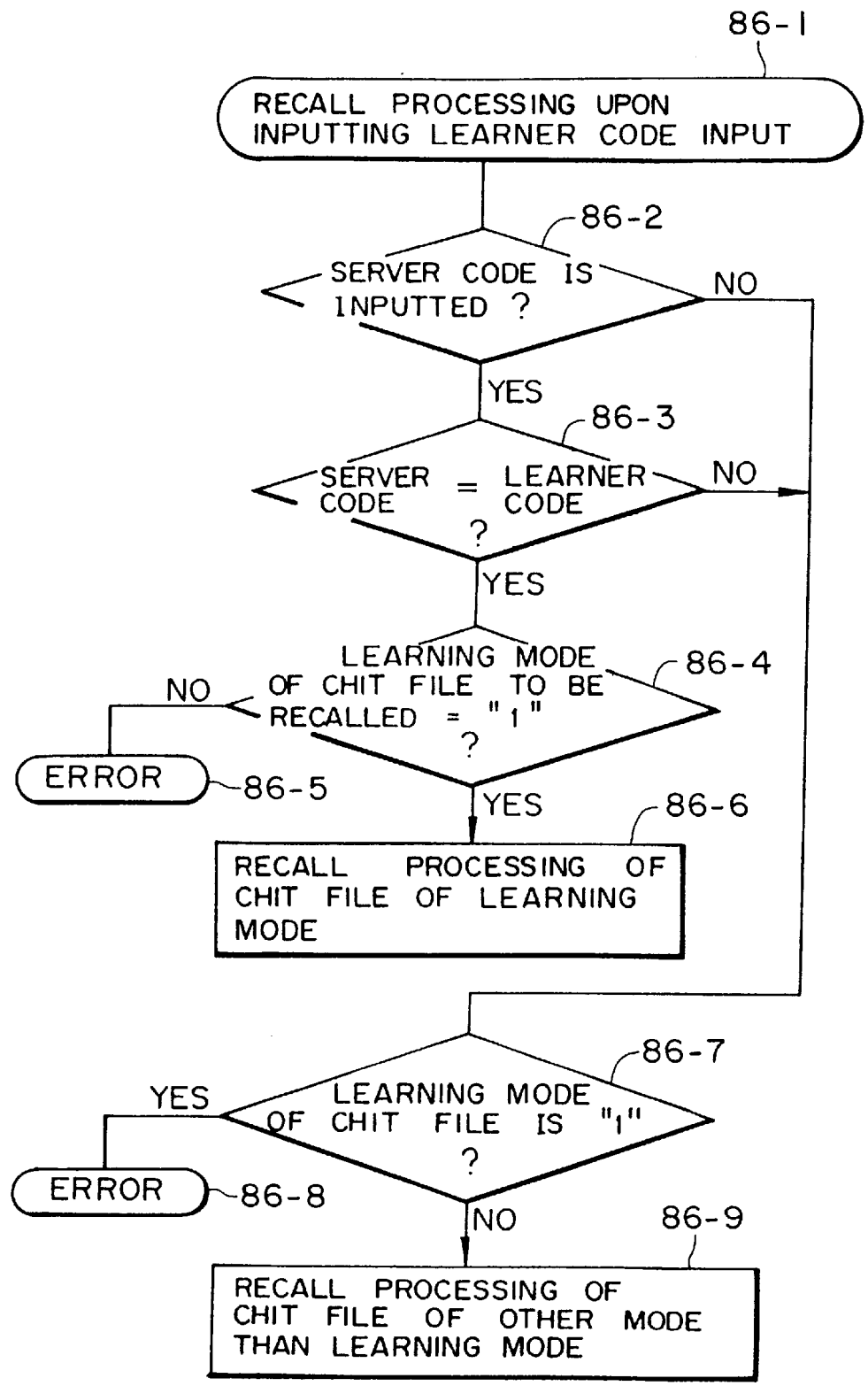
FIG. 86 is a flow chart for illustrating a recall processing in the case where a learner code is designated according to the nineteenth embodiment of the invention.

FIG. 86 is a flow chart for illustrating a recall processing in the case where the learner code is designated.

As will now be understood from the foregoing description of the preferred embodiments of the invention, there can be provided the electronic cash register having functions for registration of customers' orders in the chit files prepared in the memory incorporated in the cash register, provisional closing of the chit file, additional item registration therein, issuance of bill chits and so forth, wherein by changing or modifying the information preset in the cash register, the structure of the chit file as well as the method of processing the same can easily be altered or modified over a wide range so as to conform with business environments of shops in which the electronic cash registers according to the invention are installed. Thus, there is provided an excellent electronic cash register which can execute advantageous functions summarized below and thus can promptly cope with alterations or changes in a management system for a shop typified, for example, by a restaurant.

(1) A function capable of setting the number of article items for registration in one chit and the number of chit files as issued (i.e., the number of openable chits) which can be disposed of by the electronic cash register to thereby allow the structure or configuration of the chit file to be easily altered so as to conform with the business environments of shops promptly and appropriately.

(2) A function for checking a chit file ID (identification) number reset flag set previously in the memory to thereby select an automatic issuing of the customer chit file ID number by manipulating a chit file issuing key starting from a starting number of "1" in the registration processing succeeding to the issuance of an adjustment report or starting from a serial number succeeding to the number generated before issuance of the adjustment report.

(3) A function for setting a customer chit file ID number generation mode to a manual generation mode and invalidating the manipulation of a chit file issuing key which is not accompanied with manual inputting of the ID number of the chit file by displaying a corresponding error message when the chit file ID number generation mode is the manual generation mode, while when the chit file issuing key is manipulated after inputting of a chit file ID number, a chit file of the corresponding ID number is issued provided that the chit file of the same ID number is not issued yet.

(4) A function for storing in the memory a first register number of the associated cash register and a second register ID number of a master electronic cash register which incorporates a memory shared by a plurality of cash registers in a cash register system which includes a plurality of individual cash registers interconnected via communication line, wherein generation of a customer chit file, provisional closing of the chit file, recalling thereof, additional article item registration therein and sales totalization can be effectuated by making access to the memory of the master cash register via a communication facility.

(5) A function for storing a customer chit file having article item registration data and a chit file ID number written therein and ending temporarily the registration processing for the chit file, and a function for recalling the content of a customer chit file closed provisionally in response to actuation of a recall key after inputting the chit ID number to thereby make it possible to register additional article items in the recalled customer chit file, and a function responsive to actuation of the recall key to thereby set in the chit file a flag indicating that data of the chit file is being recalled, for thereby protecting the customer chit file being recalled against access made by other cash register.

(6) A function for allotting the ID number of a chit file cancelled by a cancel key after issuance of the chit file to a customer chit file issued subsequently with priority and printing out a drop-out of an ID number of the cancelled chit file from a sequence of the serial ID numbers for confirmation.

(7) A function for displaying article items registered in the provisionally closed chit file which is recalled for registration of additional customer orders simultaneously with and distinctively from the additional items being currently registered by using different display regions or by affixing a distinction mark for confirmation of the preceding customer order and for reference in inputting a succeeding customer order.

(8) A function for enforcing inputting by a server in charge upon manipulation of the chit file issuing key in accordance with server control information set in the memory and storing a server code in the chit file upon storing thereof to thereby allow the manipulation of the recall key to be validated for recalling of the provisionally closed chit file only when the server who closed provisionally the chit file is the same person as the server who manipulated the recall key, for thereby preventing mishandling of the server-allocated chits.

(9) A function for enforcing the server in charge to manipulate the chit file issuing key on the basis of the server control information set in the memory, wherein when the server in charge of the provisionally closed chit file as recalled is not identical with the server who manipulated the recall key, decision is made that the server who is in charge of the provisionally closed and recalled chit file is replaced by the server who manipulated the recall key, to thereby replace the server ID stored in the chit file by the ID of the replacing server who manipulated the recall key so that transfer of transaction information between the servers can be ascertained on the adjustment report.

(10) A function for issuing a bill chit for a chit file provisionally closed after item registration while confirming whether the bill chit has already been issued, to thereby prevent the bill chit from being issued in duplicate.

(11) A function for changing in a manual chit file issuing mode the ID number of the customer chit file undergoing the registration processing to a given chit ID number except for that of the chit being currently issued.

(12) A function for responding to the manipulation of a recall key for recalling the customer chit file closed provisionally to thereby invalidate the manipulation of the recall key and display a corresponding error message when the recall key is manipulated after inputting of a chit file ID number in the automatic recall mode, while when the recall key is manipulated without being accompanied with the inputting of the chit ID number, the content of the customer chit file having a smallest file ID number of all the issued chit files stored in the memory is recalled on the display device. The cash register having this function is suited to a shop (e.g., drive-through shop) in which the customer order chits sequentially undergo the totalization processing.

(13) A function for setting in the cash register as factors determining the structure of the chit file a number of customers per chit (a number of divisions of one chit file corresponding to different customers, respectively), a number of article items for registration per chit file, a number of chit files to be issued (a number of openable chit files) which can be disposed of by the cash register, to thereby realize appropriately a chit file structure suited for the business environment of a shop in which the cash register is installed, so that the article items can be registered distinctively on a customer-by-customer basis with a plurality of customer orders being registered in a same chit file, while bill chits are issued separately on a customer-by-customer basis.

(14) A function for setting in the cash register as factors determining the structure of the chit file a number of customers per chit (a number of divisions of one chit file corresponding to different customers, respectively), a number of article items for registration per chit file, a number of chit files to be issued (a number of openable chit files) which can be disposed of by the cash register, to thereby realize appropriately the chit file structure suited for the business environment of the shop in which the cash register is installed, so that the article items can be registered distinctively on a customer-by-customer basis with a plurality of customer orders being registered in a same chit file and that the transaction end processing (transaction settlement processing) is performed separately from one to another customer.

(15) A function for inputting a number of customers capable of being handled with a chit file upon generation thereof, and when a number of customers as inputted exceeds the preset customer number per chit mentioned in the paragraph (13), another chit file area is additionally secured to be linked as an extended file of which link address is stored at an area provided in the chit file, so that a number of customers which exceeds the preset per-chit customer number can be disposed of by the cash register.

(16) A function for storing in a link address area an address information of other empty chit file for using the linked file as an extended file when number of items to be registered in a chit file as issued exceeds a preset per-chit number of items to be registered, so that a number of items which exceeds a preset number of items for registration per chit can be disposed of by the cash register.

(17) A function for performing recall processings sequentially for a plurality of chit files closed provisionally to thereby issue a bill chit by totalizing (combining) the data of the plural chit files, and a function for performing transaction settlement processing by totalizing (combining) the chit data.

(18) A function for setting the electronic cash register to a learning mode, wherein the chit file which is issued in the learning mode is enabled to undergo a recall processing and a transaction settlement processing only in the learning mode, while totalization data resulting from the chit registration processing performed on the chit file in the learning mode is added to only a learning totalizator of a totalization file, so that the chit registration processing in the registration mode can be distinguished from the chit registration processing in the learning mode, and the status of the chit registration processing in the learning mode can be confirmed by printing out data of the learning totalizator in the form of a report.

(19) A function for setting in the memory a learner code identifying a person in charge of learning, so that the chit file issued after the inputting of the learner code is enabled to undergo the recall processing and the transaction settlement processing only after the inputting of the learner code while totalization data resulting from the chit registration processing performed on the chit file is added to only a learning totalizator of a totalization file without being added to the ordinary sales totalization file, that the chit registration processing effected by a learner can be distinguished from the chit registration processing performed by other servers, and that the chit registration processing in the learning mode can be confirmed by printing out data of the learning totalizator in the form of a report. By virtue of this function the learning operation can be performed without changing the mode from the registration mode.

(20) A function for setting in the register a maximum customer number per chit (corresponding to a number of divisions of a chit file allocated to different customers, respectively), a maximum item number which can be registered in one chit and a maximum number of chit files as issued (a number of openable chits) which can be handled by the cash register as structural factors for the chit file, so that a structure of the chit file can be made suitable for the business environment in a shop or restaurant. Further, a function can be ensured for changing the preset control data to thereby modify the issuance of a chit file, storing (provisional closing), and recalling thereof as well as issuance of a bill chit so that chit file functions suited for business environments of various shops such as restaurants can be selected easily, promptly and conveniently from wide varieties of functions.

What we claim is:

1. An electronic cash register system, comprising chit file issuing key means for receiving a user command to open a first chit file and to assign an identification number to the first chit file;

item key means for receiving a user command to register items of articles on sale;

transaction end key means for receiving a user command to calculate a total amount of the items registered and to complete a transaction involving the items;

numerical key means for receiving a user input of numerical values concerning the transaction;

operation control means, responsive to operations of the chit file issuing key means, the item key means, the transaction and key means and the numerical key means, for opening the first chit file, registering the items, calculating the total amount and completing the transaction;

mode switch means for selectively designating operation modes of said operation control means;

memory means for storing said first chit file, input data of names of the items, unit prices of the items and total amount of the transaction, said memory means comprising means for performing data transfer with said operation control means; and output means for delivering output data of said operation control means to at least one of a display means and a printer means;

said operation control means comprising:

structural factor setting means, responsive to a setting of said operation control means to a presetting mode by said mode switch means, for setting a number of said items for registration in said first chit file and a number of further chit files to be generated, in addition to said first chit file, which can be disposed of by said electronic cash register system as structural factors which determine a structure of said first chit file and of said further chit files;

chit file generating means, responsive to setting of said operation control means to a registration mode designated by said mode switch means, for securing in said memory means an area for the first chit file of the structure determined by said structural factors in response to actuation of said chit file issuing key means while allotting automatically the identification number to said first chit file by using serial number counter means;

item registering means for registering said items in said first chit file by manipulating said item key means; and totalization means responsive to actuation of said transaction end key means for calculating the total amount of the items registered in said first chit file and outputting the total amount to said output means while clearing the first chit file from said memory means wherein said operation control means further comprises:

means, responsive to the setting of said operation control means to the presetting mode by said mode switch means, for setting a chit file identification number reset flag in said memory means;

means, responsive to setting of said operation control means to an adjustment mode by said mode switch means, for issuing an adjustment report containing sales totalization data;

means for checking the chit file identification number reset flag upon issuance of said adjustment report to reset said serial number counter means when said reset flag is set, to thereby allow automatic issuance of the identification number by manipulating said chit file issuing key means to be started from a starting number of "1" in registration processing succeeding to issuance of said adjustment report, while unless said flag is set, said serial number counter means is left intact, to thereby allow the automatic issuing of the identification number in the succeeding registration processing to be started from a serial number succeeding to a number contained in said serial number counter means before the issuance of said adjustment report.

2. An electronic cash register system according to claim 1, wherein said operation control means further comprises:

means, responsive to the setting of said operation control means to the presetting mode by said mode switch means, for setting information indicative of a manual generation mode of the identification number in said memory means; and means for checking said information as to whether said manual generation mode is set upon issuing said first chit file in the registration mode of said operation control means to thereby invalidate manipulation of the chit file issuing key means which is not accompanied by manual inputting of the identification number of the first chit file and to display a first corresponding error message when said manual generation mode is set, while when said chit file issuing key means is manipulated after inputting of the identification number, previously existing chit files issued and stored in said memory means before said issuing of said first chit file are checked as to whether any of said previously existing chit files having an identification number equal to the inputted one exists, and if so, to thereby inhibit issuance of the first chit file with the inputted identification number and display a second corresponding error message, while otherwise, an area for the first chit file having the inputted identification number is secured in said memory means.

3. An electronic cash register system according to claim 1, further comprising:

communication means for interconnecting said electronic cash register to a plurality of further electronic cash registers and for transferring the first chit file to said plurality of further electronic cash registers; and wherein said operation control means further comprises:

means, responsive to the setting of said operation control means to said presetting mode by said mode switch means, for storing in the memory means a first register identification number of the electronic cash register and a second register identification number of a master electronic cash register which incorporates a customer chit file memory shared by said electronic cash register and said plurality of further electronic cash registers, said master cash register being one of said electronic cash register and said plurality of further electronic cash registers;

means for storing in the customer chit file memory the structural factors for said electronic cash register and further structural factors for each of said plurality of further electronic cash registers, wherein when the chit file issuing key means is manipulated in the registration mode of said operation control means as designated by said mode switch means, a first decision is made as to whether or not the second register identification number is equal to the first register identification number, to thereby secure the area for said first chit file in the memory means and allotting automatically the identification number to said first chit file by using said serial number counter means for thereby allowing the items to be registered in said first chit file when the first decision yields an affirmative answer, while when said decision results in a negative answer, a command for issuing the first chit file is sent to the master electronic cash register via said communication means to secure an area for a second chit file in the customer chit file memory with a second identification number being automatically allotted to said second chit file by using a serial number counter means of said master cash register, for thereby allowing the items to be registered in said second chit file stored in the customer chit file memory;

decision making means for making a second decision as to whether or not the second register identification number is equal to the first register identification number in processings activated by manipulation of store key means and recall key means; and means, responsive to said second decision made by said decision making means, for controlling the operation control means to operate on the first chit file when said decision results in affirmation, and for controlling the operation control means to operate on the second chit file via said communication means when said second decision results in negation.

4. An electronic cash register system according to claim 1, further comprising:

means, responsive to setting of said operation control means to the preset mode by said mode switch means, for setting a chit file combine enable flag in the memory;

recall means for performing recall processings sequentially for a plurality of provisionally closed chit files to issue a bill chit by totalizing data of said plurality of previously closed chit files; and means for performing transaction settlement processing in accordance with said data totalized by said recall means.

5. An electronic cash register system according to claim 1, further comprising:

means for setting the electronic cash register to a learning mode designated by said mode switch means; and means for controlling the operation control means, when a learning mode status flag is set to a learning chit file issued in said learning mode, to perform recall and transaction settlement processing on the learning chit file to which said learning mode status is set and transaction settlement processing only in said learning mode, while totalization data resulting from registration processing performed on the learning chit file is added to only a learning totalizator of a totalization file;

whereby chit registration processing in the registration mode can be distinguished from chit registration processing in the learning mode, and status of the chit registration processing in the learning mode can be confirmed by printing out or alternatively displaying data of said learning totalizator in the form of a report.

6. An electronic cash register system according to claim 2, wherein said operation control means further comprises:

means, responsive to the setting of said operation control means to said presetting mode by said mode select switch means, for setting in said memory means a chit identification number change enable flag; and means for checking upon executing the registration processing in the manual generation mode, when said chit file issuing key means is manipulated and an additional identification number is input after registration of article items in the first chit file or after the additional identification number is inputted for the first chit file in response to the actuation of said recall key, all the previously existing chit files stored in the memory means as to whether or not said additional identification number has been allocated, wherein when the additional identification number is allocated, manipulation of said chit file issuing key is invalidated and a corresponding third error message is displayed, while unless the additional identification number is allocated, the identification number of the first chit file is changed to said additional identification number.

7. An electronic cash register system according to claim 3, further comprising:

store key means for receiving a user input for provisionally closing the second chit file;

recall key means for receiving a user input for recalling the second chit file for registering additional article items in the second chit file; and wherein said operation control means further comprises:

means, responsive to a setting of said operation control means to the registration mode by said mode switch means, for storing the second chit file and the second identification number in the customer chit file memory in response to manipulation of said store key means and provisionally closing the second chit file;

means for inputting the second identification number and subsequently recalling the second chit file closed provisionally in response to actuation of said recall key means, to thereby make it possible to register the additional article items in said second chit file; and means, responsive to the recalling of the second chit file in response to actuation of said recall key means, for setting in said second chit file a read flag indicating that said second chit file is being recalled, for thereby inhibiting recall processing for the second chit file in which said read flag is set, whereby the second chit file being recalled is protected against access from one of said plurality of further electronic cash registers.

8. An electronic cash register system according to claim 3, further comprising:

cancel key means for canceling issuance of the second chit file;

a file area provided in said master cash register for storing a canceled chit identification number file which contains the second identification number of the second chit file whose issuance is cancelled in response to actuation of said cancel key means;

means, responsive to setting of said operation control means to the registration mode by said mode switch means, for securing an area for a third chit file in the customer chit file memory of said master cash register in response to actuation of the chit file issuing key means and checking said file area storing the second identification number of the cancelled second chit file to thereby allocate the second identification number of the cancelled second chit file to said third chit file issued upon manipulation of said chit file issuing key means, if said cancelled second identification number exists; and means for allotting a third identification number to said third chit file by using said serial number counter means when no second identification number of the cancelled second chit file exists in said file area;

wherein the second identification number of the second chit file cancelled by said cancel key means is allotted to the third chit file as issued by manipulating said chit file issuing key means with preference over the third identification number output by said serial number counter means; and means for outputting the cancelled chit identification number file on a report to thereby allow drop-out of the second identification number of the cancelled second chit file from a sequence of serial identification numbers to be confirmed.

9. An electronic cash register system according to claim 7, further comprising:

key means for displaying the items in the provisionally closed second chit file for confirmation of the items;

means, responsive to actuation of the recall key means, for recalling the provisionally closed second chit file to thereby allow additional items to be registered in the second chit file in response to actuation of the item key means; and means, responsive to manipulation of said key means, for displaying the items in the provisionally closed chit file distinctively from the additional items by using different display regions or by affixing a distinction mark.

10. An electronic cash register system according to claim 7, further comprising:

server key means for receiving an input of server information for designating a person who is a server in charge of registration of the second chit file;

means, responsive to setting of said operation control means to said preset mode designated by said mode switch means, for the storing server information in said memory means;

means, responsive to setting of said operation control means to the registration mode by said mode switch means, for controlling the chit file generating means to invalidate manipulation of said chit file issuing key without being accompanied with inputting of the server information and displaying a corresponding first error message when a server information input enforce function flag is set, while storing the server information in the second chit file upon manipulation of the chit file issuing key after inputting of the server information; and means, responsive to the recalling of the provisionally closed second chit file in the registration mode of said operation control means (i) for invalidating manipulation of the recall key means which is not accompanied with inputting of additional server information when said server control information input enforce function flag and a server compare function flag are set and outputting a corresponding second error message, and (ii) comparing, when the recall key means is manipulated after inputting of the additional server information, the server information stored in the second chit file with the additional server information inputted upon manipulation of the recall key means, to thereby recall the provisionally closed second chit file when said comparing results in affirmation while invalidating the manipulation of the recall key means and outputting an error message when said comparing results in negation.

11. An electronic cash register system according to claim 7, wherein said operation control means further comprises:

means for preparing a server-based totalization file in the memory means for totalizing the registered items as classified on a server-by-server basis;

means for controlling the operation control means so that, when a server information input enforce flag and a server shift enable flag are set in said memory means, upon issuing the second chit file through the registration processing, server information identifying a first server in charge of said second chit file is inputted and then the chit file issuing key means is manipulated for storing said server information in said second chit file; and means for controlling the operation control means so that, when the server information stored in said second chit file is not identical with additional server information inputted upon operation of said recall key means, a decision is made that the first server who is in charge of said second chit file is replaced by a second server who manipulated said recall key means, to thereby replace the server information stored in said second chit file by the additional server information, and a total of registrations in said second chit file closed provisionally is stored in a transfer-out totalizator prepared in a server-based totalization file corresponding to said first server as well as in a transfer-in totalizator prepared in a server-based totalization file of said second server, data of said transfer-in totalizator and said transfer-out totalizator being outputted to at least one of said display means and printer means so that sales information transferred upon shift from the first server to the second server can be read out.

12. An electronic cash register system according to claim 7, further comprising:

bill chit issuing key means for issuing a bill chit for said second chit file;

printer means for printing out said bill chit;

an issued bill identification flag provided in said second chit file; and means, responsive to the setting of said operation control means to the registration mode by said mode switch means, for checking the issued bill identification flag of the second chit file provisionally closed after item registration in response to actuation of said bill issuing key means, wherein when said issued bill identification flag is set, the bill chit is inhibited from being issued and a corresponding bill chit error message is displayed, while unless said issued bill identification flag is set, the bill chit for the items registered in said second chit file is issued and the issued bill identification flag is set for said second chit file, whereby said bill chit is prevented from being issued in duplicate.

13. An electronic cash register system according to claim 7, wherein:

said customer chit file memory stores a plurality of previous chit files, each of said plurality of previous chit files having a previous chit file identification number; and said operation control means further comprises:

means, responsive to the setting of said operation control means to said presetting mode by said mode switch means, for placing in said memory means information indicating that recalling of the chit file activated by said recall key means is to be effected in an automatic recall mode; and means, responsive to the setting of said operation control means to the registration mode by said mode switch means and responsive to manipulation of said recall key means, for invalidating the manipulation of said recall key means and displaying a corresponding recall error message when said recall key means is manipulated after inputting of the identification number in said automatic recall mode, while when said recall key means is manipulated without being accompanied with the inputting of the identification number, the one of the plurality of previous chit files having a smallest said previous chit file identification number of all the plurality of previous chit files is recalled to be displayed on said display means.

14. An electronic cash register system according to claim 10, further comprising:

means, responsive to the setting of said operation control means to the presetting mode by said mode switch means, for setting in the memory means a learner code identifying a person in charge of learning;

means for controlling the operation control means, when a learning mode status flag is set to a learning chit file issued after inputting of learner code in said registration mode, to perform recall and transaction settlement processing on the learning chit file only after inputting of said learner code, while totalization data resulting from the chit registration processing performed on the learning chit file is added to only a learning totalizator of a totalization file.

15. An electronic cash register, comprising:

means for storing chit files;

chit file constituent data setting means for setting in said register a maximum customer number per one of said chit files, a maximum number of items which can be registered per one of said chit files and a maximum number of said chit files as issued which can be handled by the electronic cash register;

chit issuance control means for setting control information concerning issuance, storing and recalling of the chit files and control information of bill chits based on said chit files; and means for performing registration, chit issuance, transaction settlement and issuance of an adjustment report on said chit files in accordance with respective set data by referencing said control information.

* * * * *